US011805426B2

(12) United States Patent
Wang et al.

(10) Patent No.: US 11,805,426 B2
(45) Date of Patent: Oct. 31, 2023

(54) TECHNIQUES FOR SIDELINK REFERENCE BEAMS

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Junyi Li, Franklin Park, NJ (US); Sony Akkarakaran, Poway, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 17/238,139

(22) Filed: Apr. 22, 2021

(65) Prior Publication Data

US 2022/0345901 A1   Oct. 27, 2022

(51) Int. Cl.
*H04W 16/28* (2009.01)
*H04W 24/10* (2009.01)
*H04W 72/02* (2009.01)
*H04W 72/044* (2023.01)
*H04W 92/18* (2009.01)

(52) U.S. Cl.
CPC .......... *H04W 16/28* (2013.01); *H04W 24/10* (2013.01); *H04W 72/02* (2013.01); *H04W 72/046* (2013.01); *H04W 92/18* (2013.01)

(58) Field of Classification Search
CPC ..... H04W 72/02; H04W 16/28; H04W 24/10; H04W 72/046; H04B 7/088; H04B 7/0695
See application file for complete search history.

(56) References Cited

U.S. PATENT DOCUMENTS

| 2020/0008261 | A1  | 1/2020  | Islam et al. |
| 2020/0028544 | A1  | 1/2020  | Bengtsson et al. |
| 2020/0322774 | A1  | 10/2020 | Vargas et al. |
| 2021/0250919 | A1  | 8/2021  | Wang et al. |
| 2022/0201716 | A1* | 6/2022  | Yi ................. H04W 72/1263 |

(Continued)

FOREIGN PATENT DOCUMENTS

| WO | WO-2019036578 A1 | 2/2019 |
| WO | WO-2021080868 A1 | 4/2021 |

OTHER PUBLICATIONS

Partial International Search Report—PCT/US2022/071778—ISA/EPO—dated Jul. 18, 2022.

(Continued)

*Primary Examiner* — Anez C Ebrahim
(74) *Attorney, Agent, or Firm* — Holland & Hart LLP

(57) ABSTRACT

Methods, systems, and devices for wireless communications are described. A first user equipment (UE) (e.g., Tx UE) may transmit or receive a first control message indicating a sidelink beam measurement configuration for performing a sidelink beam sweep procedure using a set of transmit beams. The first UE may select a subset of transmit beams from the set of transmit beams for the sidelink beam sweep procedure based on one or more parameters associated with the sidelink beam measurement configuration. The first UE may then transmit, to a second UE (e.g., Rx UE) during the sidelink beam sweep procedure, a set of sidelink reference signals using respective transmit beams of the subset of transmit beams.

28 Claims, 14 Drawing Sheets

(56) References Cited

U.S. PATENT DOCUMENTS

| | | | |
|---|---|---|---|
| 2022/0232542 A1* | 7/2022 | Back | H04L 27/2607 |
| 2022/0399917 A1* | 12/2022 | Shin | H04L 1/1858 |
| 2023/0027932 A1 | 1/2023 | Wesslén et al. | |
| 2023/0029048 A1 | 1/2023 | Hahn, III et al. | |

OTHER PUBLICATIONS

International Search Report and Written Opinion—PCT/US2022/071778—ISA/EPO—Oct. 11, 2022.
Zhang Z., et al., "Fast Beam Tracking Discontinuous Reception for D2D-Based UAV MmWave Communication", IEEE Access, vol. 7, Aug. 9, 2019 (Aug. 9, 2019), pp. 110487-110498, Aug. 22, 2019, XP011741655, DOI: 10.1109/ACCESS.2019.2934151, Section II, figure 1, Section III.A, figure 2, col. 1, last paragraph.

* cited by examiner

TECHNIQUES FOR SIDELINK REFERENCE BEAMS

FIELD OF TECHNOLOGY

The following relates to wireless communications, including techniques for sidelink reference beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless communication devices (e.g., UEs, base stations) may perform beam management procedures in order to select beams which will be used for wireless communications. For example, sidelink beam sweep procedures may be performed between UEs to determine which transmit and receive beams should be used for sidelink communications between the respective UEs. However, conventional beam management techniques are deficient.

SUMMARY

The described techniques relate to improved methods, systems, devices, and apparatuses that support techniques for sidelink reference beams. Generally, aspects of the present disclosure provide techniques for determining a timing of sidelink beam sweep procedures, and for determining subsets of transmit beams which are to be used for performing sidelink beam sweep procedures. In particular, aspects of the present disclosure provide techniques for selecting subsets of transmit beams from a set of transmit beams at a transmitting user equipment (UE) which are to be used for sidelink beam sweep procedures. Moreover, additional aspects of the present disclosure provide techniques for determining a periodicity of sidelink beam sweep procedures (e.g., periodic sidelink beam sweep procedures) based on a discontinuous reception (DRX) cycle at a receiving UE, and techniques for triggering aperiodic sidelink beam sweep procedures.

A method for wireless communication at a first UE is described. The method may include transmitting or receiving a first control message indicating a sidelink beam measurement configuration for performing a sidelink beam sweep procedure using a set of multiple transmit beams, selecting a subset of transmit beams from the set of multiple transmit beams for the sidelink beam sweep procedure based on one or more parameters associated with the sidelink beam measurement configuration, and transmitting, to a second UE during the sidelink beam sweep procedure, a set of multiple sidelink reference signals using respective transmit beams of the subset of transmit beams.

An apparatus for wireless communication at a first UE is described. The apparatus may include a processor, memory coupled with the processor, and instructions stored in the memory. The instructions may be executable by the processor to cause the apparatus to transmit or receive a first control message indicating a sidelink beam measurement configuration for performing a sidelink beam sweep procedure using a set of multiple transmit beams, select a subset of transmit beams from the set of multiple transmit beams for the sidelink beam sweep procedure based on one or more parameters associated with the sidelink beam measurement configuration, and transmit, to a second UE during the sidelink beam sweep procedure, a set of multiple sidelink reference signals using respective transmit beams of the subset of transmit beams.

Another apparatus for wireless communication at a first UE is described. The apparatus may include means for transmitting or receiving a first control message indicating a sidelink beam measurement configuration for performing a sidelink beam sweep procedure using a set of multiple transmit beams, means for selecting a subset of transmit beams from the set of multiple transmit beams for the sidelink beam sweep procedure based on one or more parameters associated with the sidelink beam measurement configuration, and means for transmitting, to a second UE during the sidelink beam sweep procedure, a set of multiple sidelink reference signals using respective transmit beams of the subset of transmit beams.

A non-transitory computer-readable medium storing code for wireless communication at a first UE is described. The code may include instructions executable by a processor to transmit or receive a first control message indicating a sidelink beam measurement configuration for performing a sidelink beam sweep procedure using a set of multiple transmit beams, select a subset of transmit beams from the set of multiple transmit beams for the sidelink beam sweep procedure based on one or more parameters associated with the sidelink beam measurement configuration, and transmit, to a second UE during the sidelink beam sweep procedure, a set of multiple sidelink reference signals using respective transmit beams of the subset of transmit beams.

In some examples of the method, apparatuses, and non-transitory computer-readable medium described herein, selecting the subset of transmit beams may include operations, features, means, or instructions for transmitting or receiving a second control message indicating the subset of transmit beams which may be to be used during the sidelink beam sweep procedure, where transmitting the set of multiple sidelink reference signals may be based on the second control message.

In some examples of the method, apparatuses, and non-transitory computer-readable medium described herein, transmitting the set of multiple sidelink reference signals using the respective transmit beams of the subset of transmit beams may include operations, features, means, or instructions for transmitting the set of multiple sidelink reference signals using the respective transmit beams of the subset of transmit beams during a subset of transmission time intervals (TTIs) of the set of multiple TTIs which correspond to the subset of transmit beams.

In some examples of the method, apparatuses, and non-transitory computer-readable medium described herein, transmitting the set of multiple sidelink reference signals may include operations, features, means, or instructions for transmitting a first sidelink reference signal of the set of multiple sidelink reference signals using a first transmit beam of the subset of transmit beams in a first TTI that differs from a second transmission time internal configured by the sidelink beam measurement configuration for reference signal transmission using the first transmit beam.

In some examples of the method, apparatuses, and non-transitory computer-readable medium described herein, transmitting the set of multiple sidelink reference signals may include operations, features, means, or instructions for transmitting a second sidelink reference signal of the set of multiple sidelink reference signals using a second transmit beam of the subset of transmit beams in a second TTI that occurs immediately after the first TTI.

In some examples of the method, apparatuses, and non-transitory computer-readable medium described herein, transmitting the set of multiple sidelink reference signals may include operations, features, means, or instructions for transmitting a first sidelink reference signal of the set of multiple sidelink reference signals using a first transmit beam of the subset of transmit beams in a first TTI of the set of multiple TTIs configured by the sidelink beam measurement configuration for reference signal transmission using the first transmit beam.

In some examples of the method, apparatuses, and non-transitory computer-readable medium described herein, transmitting the set of multiple sidelink reference signals may include operations, features, means, or instructions for transmitting a second sidelink reference signal of the set of multiple sidelink reference signals using a second transmit beam of the subset of transmit beams in a second TTI of the set of multiple TTIs configured by the sidelink beam measurement configuration for reference signal transmission using the first transmit beam.

In some examples of the method, apparatuses, and non-transitory computer-readable medium described herein, the sidelink beam measurement configuration indicates a set of multiple TTIs during which a respective transmit beam of the set of multiple transmit beams may be to be used to transmit a respective sidelink reference signal during the sidelink beam sweep procedure and the method, apparatuses, and non-transitory computer-readable medium may include further operations, features, means, or instructions for transmitting or receiving one or more messages during at least one TTI of the remaining subset of TTIs, refraining from transmitting sidelink reference signals during at least one TTI of the remaining subset of TTIs, or both.

In some examples of the method, apparatuses, and non-transitory computer-readable medium described herein, selecting the subset of transmit beams may include operations, features, means, or instructions for selecting the subset of transmit beams from the set of multiple transmit beams based on a beam measurement report associated with communications between the first UE and the second UE.

In some examples of the method, apparatuses, and non-transitory computer-readable medium described herein, the one or more parameters include a beam measurement report associated with communications between the first UE and the second UE, a geographical position of the first UE, the second UE, or both, a mobility state of the first UE, the second UE, or both, a beam correlation between two or more transmit beams of the set of multiple transmit beams, or any combination thereof.

In some examples of the method, apparatuses, and non-transitory computer-readable medium described herein,
selecting the subset of transmit beams may include operations, features, means, or instructions for selecting the subset of transmit beams from the set of multiple transmit beams based on a first geographical position of the first UE, a second geographical position of the second UE, a first mobility state of the first UE, a second mobility state of the second UE, or any combination thereof.

In some examples of the method, apparatuses, and non-transitory computer-readable medium described herein, selecting the subset of transmit beams may include operations, features, means, or instructions for selecting the subset of transmit beams from the set of multiple transmit beams based on a beam correlation between a first transmit beam of the subset of transmit beams and a second transmit beam of the subset of transmit beams, where transmitting the set of multiple sidelink reference signals using the respective transmit beams of the subset of transmit beams includes transmitting a first sidelink reference signal using the first transmit beam concurrently with transmitting a second sidelink reference signal using the second transmit beam.

Some examples of the method, apparatuses, and non-transitory computer-readable medium described herein may further include operations, features, means, or instructions for receiving, from the second UE based on transmitting the first set of multiple sidelink reference signals, control signaling including an indication of one or more transmit beams of the subset of transmit beams and transmitting, to the second UE, a sidelink message to the second UE using the one or more transmit beams based on the control signaling.

In some examples of the method, apparatuses, and non-transitory computer-readable medium described herein, transmitting or receiving the first control message indicating the sidelink beam measurement configuration may include operations, features, means, or instructions for communicating the first control message indicating the sidelink beam measurement configuration with the second UE, a base station, or both.

A method for wireless communication at a second UE is described. The method may include transmitting or receiving a first control message indicating a sidelink beam measurement configuration for performing a sidelink beam sweep procedure using a set of multiple transmit beams, identifying a subset of transmit beams from the set of multiple transmit beams for the sidelink beam sweep procedure based on one or more parameters associated with the sidelink beam measurement configuration, and receiving, from a first UE during the sidelink beam sweep procedure, a set of multiple sidelink reference signals associated with respective transmit beams of the subset of transmit beams.

An apparatus for wireless communication at a second UE is described. The apparatus may include a processor, memory coupled with the processor, and instructions stored in the memory. The instructions may be executable by the processor to cause the apparatus to transmit or receive a first control message indicating a sidelink beam measurement configuration for performing a sidelink beam sweep procedure using a set of multiple transmit beams, identify a subset of transmit beams from the set of multiple transmit beams for the sidelink beam sweep procedure based on one or more parameters associated with the sidelink beam measurement configuration, and receive, from a first UE during the sidelink beam sweep procedure, a set of multiple sidelink reference signals associated with respective transmit beams of the subset of transmit beams.

Another apparatus for wireless communication at a second UE is described. The apparatus may include means for transmitting or receiving a first control message indicating a sidelink beam measurement configuration for performing a sidelink beam sweep procedure using a set of multiple transmit beams, means for identifying a subset of transmit beams from the set of multiple transmit beams for the sidelink beam sweep procedure based on one or more parameters associated with the sidelink beam measurement configuration, and means for receiving, from a first UE during the sidelink beam sweep procedure, a set of multiple sidelink reference signals associated with respective transmit beams of the subset of transmit beams.

A non-transitory computer-readable medium storing code for wireless communication at a second UE is described. The code may include instructions executable by a processor to transmit or receive a first control message indicating a sidelink beam measurement configuration for performing a sidelink beam sweep procedure using a set of multiple transmit beams, identify a subset of transmit beams from the set of multiple transmit beams for the sidelink beam sweep procedure based on one or more parameters associated with the sidelink beam measurement configuration, and receive, from a first UE during the sidelink beam sweep procedure, a set of multiple sidelink reference signals associated with respective transmit beams of the subset of transmit beams.

In some examples of the method, apparatuses, and non-transitory computer-readable medium described herein, identifying the subset of transmit beams may include operations, features, means, or instructions for transmitting or receiving a second control message indicating the subset of transmit beams which may be to be used during the sidelink beam sweep procedure, where receiving the set of multiple sidelink reference signals may be based on the second control message.

In some examples of the method, apparatuses, and non-transitory computer-readable medium described herein, receiving the set of multiple sidelink reference signals associated with the respective transmit beams of the subset of transmit beams may include operations, features, means, or instructions for receiving the set of multiple sidelink reference signals associated with the respective transmit beams of the subset of transmit beams during a subset of TTIs of the set of multiple TTIs which correspond to the subset of transmit beams.

A method for wireless communication at a first UE is described. The method may include transmitting or receiving, based on a first periodicity of a set of multiple active durations of a DRX cycle of a second UE, a first control message indicating a second periodicity of sidelink beam sweep occasions for performing sidelink beam sweep procedures using a set of multiple transmit beams and transmitting, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity.

An apparatus for wireless communication at a first UE is described. The apparatus may include a processor, memory coupled with the processor, and instructions stored in the memory. The instructions may be executable by the processor to cause the apparatus to transmit or receive, based on a first periodicity of a set of multiple active durations of a DRX cycle of a second UE, a first control message indicating a second periodicity of sidelink beam sweep occasions for performing sidelink beam sweep procedures using a set of multiple transmit beams and transmit, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity.

Another apparatus for wireless communication at a first UE is described. The apparatus may include means for transmitting or receiving, based on a first periodicity of a set of multiple active durations of a DRX cycle of a second UE, a first control message indicating a second periodicity of sidelink beam sweep occasions for performing sidelink beam sweep procedures using a set of multiple transmit beams and means for transmitting, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity.

A non-transitory computer-readable medium storing code for wireless communication at a first UE is described. The code may include instructions executable by a processor to transmit or receive, based on a first periodicity of a set of multiple active durations of a DRX cycle of a second UE, a first control message indicating a second periodicity of sidelink beam sweep occasions for performing sidelink beam sweep procedures using a set of multiple transmit beams and transmit, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity.

Some examples of the method, apparatuses, and non-transitory computer-readable medium described herein may further include operations, features, means, or instructions for receiving, from the second UE based on transmitting the set of multiple sidelink reference signals, a beam measurement report indicating one or more transmit beams of the set of multiple transmit beams and transmitting, to the second UE using the one or more transmit beams, a sidelink message during at least the first active duration of the set of multiple active durations.

Some examples of the method, apparatuses, and non-transitory computer-readable medium described herein may further include operations, features, means, or instructions for receiving a second control message indicating the first periodicity of the set of multiple active durations of the DRX cycle of the second UE.

Some examples of the method, apparatuses, and non-transitory computer-readable medium described herein may further include operations, features, means, or instructions for transmitting or receiving an aperiodic beam measurement request and transmitting, to the second UE using the set of multiple transmit beams and based on the aperiodic beam measurement request, a second set of multiple sidelink reference signals during a second sidelink beam sweep procedure performed within a second beam sweep occasion that does not coincide with the second periodicity of beam sweep occasions.

In some examples of the method, apparatuses, and non-transitory computer-readable medium described herein, transmitting or receiving the aperiodic beam measurement request may include operations, features, means, or instructions for transmitting or receiving a beam measurement reporting including the aperiodic beam measurement request and indicating a subset of transmit beams of the set of multiple transmit beams, where transmitting the second set of multiple sidelink reference signals includes and transmitting, to the second UE using the subset of transmit beams, the second set of multiple sidelink reference signals during the second sidelink beam sweep procedure.

In some examples of the method, apparatuses, and non-transitory computer-readable medium described herein, transmitting or receiving the aperiodic beam measurement request may include operations, features, means, or instructions for transmitting or receiving the aperiodic beam measurement request based on a first change in a first mobility state of the first UE, a second change in a second mobility state of the second UE, a third change in a first geographical position of the first UE, a fourth change in a second geographical position of the second UE, or any combination thereof.

Some examples of the method, apparatuses, and non-transitory computer-readable medium described herein may further include operations, features, means, or instructions for transmitting or receiving control signaling indicating a requested periodicity for the second periodicity of beam sweep occasions, where the periodicity indicated in the first control message includes the requested periodicity or a different periodicity.

In some examples of the method, apparatuses, and non-transitory computer-readable medium described herein, the second periodicity of the sidelink beam sweep occasions includes an integer multiple of active durations of the DRX cycle of the second UE.

In some examples of the method, apparatuses, and non-transitory computer-readable medium described herein, transmitting or receiving the first control message indicating the second periodicity may include operations, features, means, or instructions for communicating the first control message indicating of the second periodicity with the second UE, a base station, or both.

In some examples of the method, apparatuses, and non-transitory computer-readable medium described herein, the first set of multiple sidelink reference signals include unicast transmissions, groupcast transmissions, or both, and and the first set of multiple sidelink reference signals include synchronization signal block messages, channel state information reference signals, or both.

A method for wireless communication at a second UE is described. The method may include transmitting or receiving, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE and receiving, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity.

An apparatus for wireless communication at a second UE is described. The apparatus may include a processor, memory coupled with the processor, and instructions stored in the memory. The instructions may be executable by the processor to cause the apparatus to transmit or receive, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE and receive, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity.

Another apparatus for wireless communication at a second UE is described. The apparatus may include means for transmitting or receiving, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE and means for receiving, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity.

A non-transitory computer-readable medium storing code for wireless communication at a second UE is described. The code may include instructions executable by a processor to transmit or receive, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE and receive, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity.

Some examples of the method, apparatuses, and non-transitory computer-readable medium described herein may further include operations, features, means, or instructions for transmitting, to the first UE based on receiving the set of multiple sidelink reference signals, a beam measurement report indicating one or more transmit beams of the set of multiple transmit beams and receiving, from the first UE using the one or more transmit beams, a sidelink message during at least the first active duration of the set of multiple active durations.

Some examples of the method, apparatuses, and non-transitory computer-readable medium described herein may further include operations, features, means, or instructions for transmitting, to the first UE, an aperiodic beam measurement request based on a change in between a first reference signal received power of the set of multiple sidelink reference signals received during the first beam sweep occasion and a second reference signal received power of a second set of multiple sidelink reference signals received during a second beam sweep occasion satisfying a threshold and receiving, from the first UE and based on the aperiodic beam measurement request, a third set of multiple sidelink reference signals during a third sidelink beam sweep procedure performed within a third beam sweep occasion that does not coincide with the second periodicity of beam sweep occasions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleavers, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
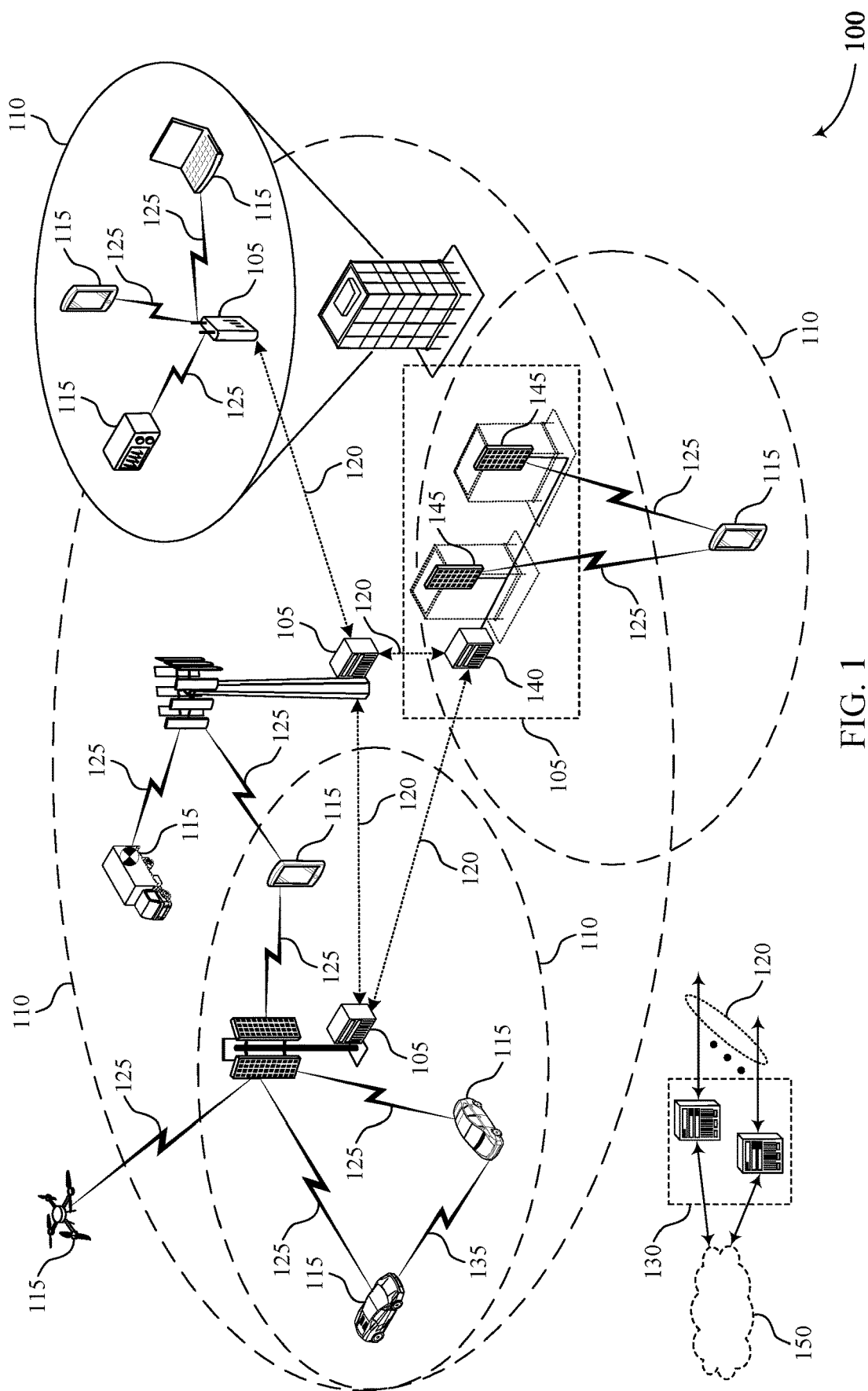
FIG. 1 illustrates an example of a wireless communications system that supports techniques for sidelink reference beams in accordance with aspects of the present disclosure.

In some wireless communications systems, wireless communication devices (e.g., user equipments (UEs), base stations) may perform beam management procedures in order to select beams which will be used for wireless communications. For example, a first UE (e.g., transmitter (Tx) UE) may perform a beam sweep procedure with a second UE (e.g., receiver (Rx) UE) during which the first UE transmits sidelink reference signals by sweeping through a set of transmit beams in order to determine which transmit beam(s) should be used for communications with the second UE. When performing sidelink beam sweep procedures, some transmit beams may be ill-suited for sidelink communications. Moreover, discontinuous reception (DRX) cycles at Rx UEs may further complicate sidelink beam sweep procedures, as the Rx UE may be unable to perform the sidelink beam sweep procedures during inactive intervals of the DRX cycle.

Aspects of the present disclosure provide techniques for determining a timing and subsets of transmit beams for performing sidelink beam sweep procedures between UEs. In particular, aspects of the present disclosure provide techniques for selecting subsets of transmit beams from a set of transmit beams at a Tx UE which are to be used for sidelink beam sweep procedures. For example, a Tx UE may select a subset of transmit beams from a set of transmit beams at the Tx UE which will be used for a sidelink beam sweep procedure with an Rx UE based on a sidelink beam measurement configuration. The sidelink beam measurement configuration may be configured at the Tx UE via radio resource control (RRC) signaling from a base station, negotiated with the Rx UE, or both. The Tx UE may determine subsets of time slots (e.g., transmission time intervals (TTIs)) for the sidelink beam sweep procedure which are to be used for the respective subset of transmit beams based on the beam measurement configuration, and may transmit sidelink reference signals to the second UE during the sidelink beam sweep procedure.

Additional or alternative aspects of the present disclosure provide techniques for determining a periodicity of sidelink beam sweep procedures (e.g., periodic sidelink beam sweep procedures) based on a DRX cycle at an Rx UE, and techniques for triggering aperiodic sidelink beam sweep procedures. For example, a Tx UE may negotiate and/or be configured with a sidelink beam sweep procedure which indicates a periodicity of beam sweep occasions for performing sidelink beam sweep procedures with an Rx UE. The sidelink beam measurement configuration may be configured at the Tx UE via RRC signaling from a base station, negotiated with the Rx UE, or both. The periodicity of beam sweep occasions may be based on a DRX cycle at the Rx UE (e.g., periodicity of active durations of the DRX cycle at the Rx UE). Subsequently, the Tx UE may transmit sidelink reference signals based on the periodicity of beam sweep occasions, and may receive a beam measurement report from the Rx UE which indicates which one or more transmit beams the Tx UE is to use for subsequent transmissions (e.g., during an active duration following the beam monitoring occasion), a measurement, such as a reference signal received power (RSRP) measurement, of one or more transmit beams swept during the beam sweep procedure, or both. In some aspects, the Tx UE, the Rx UE, and/or a base station may transmit a beam measurement request to trigger aperiodic sidelink beam sweep procedures which are not included in the periodic beam sweep occasions configured via the sidelink beam sweep procedure. Aperiodic sidelink beam sweep procedures may be triggered based on changes in a measured RSRP of one or more sidelink references signals, changing positions/mobility states of one or both of the Tx and Rx UEs, or any combination thereof.

Aspects of the disclosure are initially described in the context of wireless communications systems. Additional aspects of the disclosure are described in the context of example resource configurations and example process flows. Aspects of the disclosure are further illustrated by and described with reference to apparatus diagrams, system diagrams, and flowcharts that relate to techniques for sidelink reference beams.

FIG. 1 illustrates an example of a wireless communications system 100 that supports techniques for sidelink reference beams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The base stations 105 and the UEs 115 of the wireless communications system 100 may support techniques for determining a timing and subsets of transmit beams for performing sidelink beam sweep procedures between UEs 115. In particular, the wireless communications system may support techniques for selecting subsets of transmit beams from a set of transmit beams at a Tx UE 115 which are to be used for sidelink beam sweep procedures. For example, a Tx UE 115 may select a subset of transmit beams from a set of transmit beams at the Tx UE 115 which will be used for a sidelink beam sweep procedure with a second UE 115 (e.g., Rx UE 115) based on a sidelink beam measurement configuration. The sidelink beam measurement configuration may be configured at the Tx UE 115 via RRC signaling from a base station 105, negotiated with the Rx UE 115, or both. The Tx UE 115 may determine subsets of time slots (e.g., TTIs) for the sidelink beam sweep procedure which are to be used for the respective subset of transmit beams based on the beam measurement configuration, and may transmit sidelink reference signals to the second UE 115 during the sidelink beam sweep procedure.

Additionally, or alternatively, the wireless communications system 100 may support techniques for determining a periodicity of sidelink beam sweep procedures (e.g., periodic sidelink beam sweep procedures) based on a DRX cycle at an Rx UE 115, and techniques for triggering aperiodic sidelink beam sweep procedures. For example, a Tx UE 115 of the wireless communications system 100 may negotiate and/or be configured with a sidelink beam sweep procedure which indicates a periodicity of beam sweep occasions for performing sidelink beam sweep procedures with an Rx UE 115. The sidelink beam measurement configuration may be configured at the Tx UE 115 via RRC signaling from a base station 105, negotiated with the Rx UE 115, or both. The periodicity of beam sweep occasions may be based on a DRX cycle at the Rx UE 115 (e.g., periodicity of active durations of the DRX cycle at the Rx UE 115). Subsequently, the Tx UE 115 may transmit sidelink reference signals based on the periodicity of beam sweep occasions, and may receive a beam measurement report from the Rx UE 115 which indicates which transmit beams the Tx UE is to use for subsequent transmissions. In some aspects, the Tx UE 115, the Rx UE 115, and/or a base station 105 may transmit a beam measurement request to trigger aperiodic sidelink beam sweep procedures which are not included in the periodic beam sweep occasions configured via the sidelink beam sweep procedure. Aperiodic sidelink beam sweep procedures may be triggered based on changes in an RSRP of sidelink references signals, changing positions/mobility states of the Tx and Rx UEs 115, or any combination thereof.

Techniques described herein may provide for improved sidelink beam sweep procedures between UEs 115 for selecting beams which are to be used for sidelink communications. In particular, techniques described herein may enable UEs 115 to perform sidelink beam sweep procedures using a subset of configured transmit beams, which may expedite sidelink beam sweep procedures, reduce power consumption at the UEs 115, and improve resource utilization within the wireless communications system 100. Additionally, techniques described herein may enable sidelink beam sweep procedure to be performed in accordance with DRX cycles at the respective UEs 115, which may improve an efficiency of DRX cycles at the UEs 115, improve power savings at the UEs 115, and result in more efficient beam selection for sidelink communications.

Figure 2:
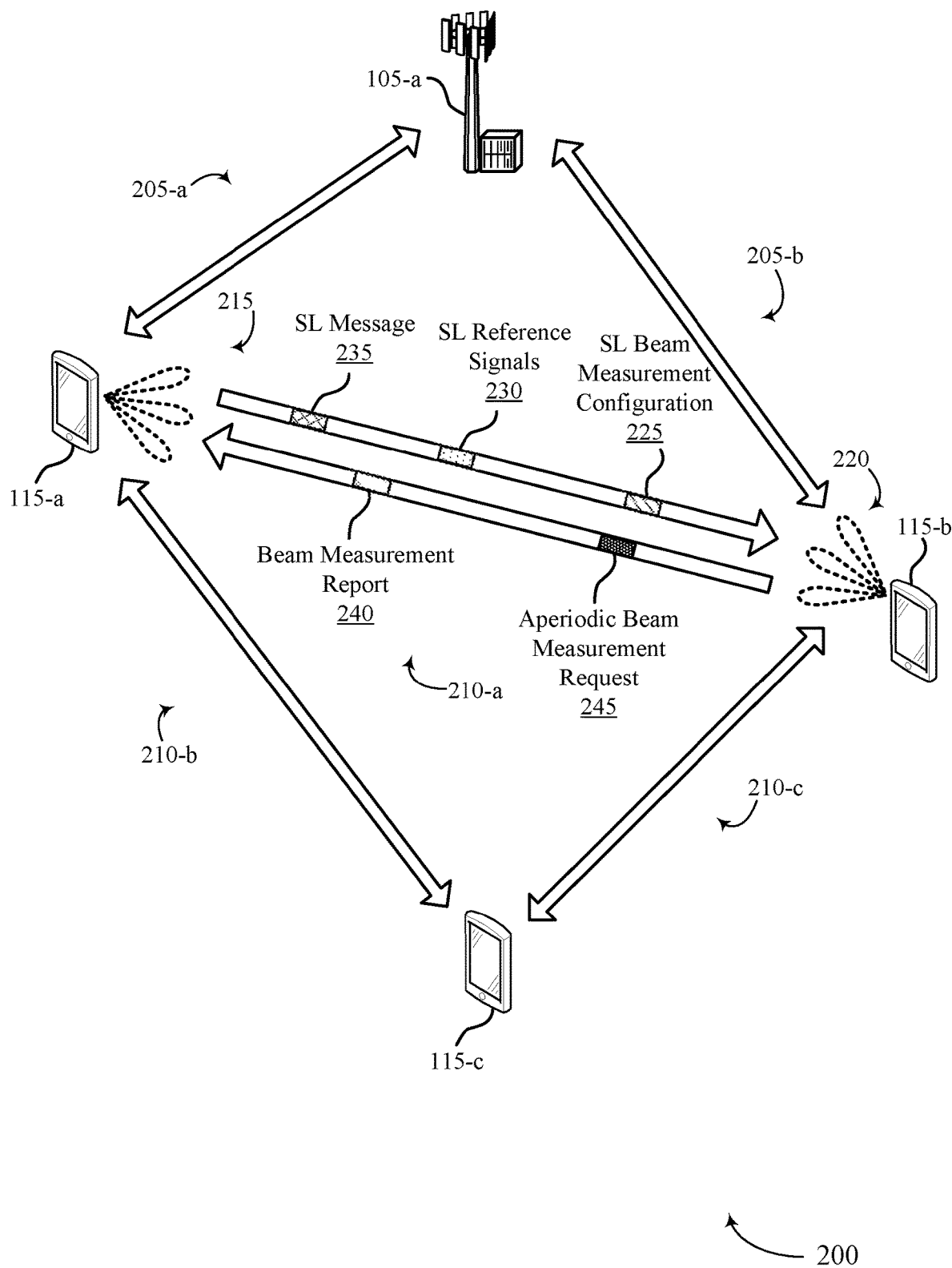
FIG. 2 illustrates an example of a wireless communications system that supports techniques for sidelink reference beams in accordance with aspects of the present disclosure.

FIG. 2 illustrates an example of a wireless communications system 200 that supports techniques for sidelink reference beams in accordance with aspects of the present disclosure. Aspects of the wireless communications system 200 may implement, or be implemented by, aspects of the wireless communications system 100. In particular, the wireless communications system 200 may support techniques for improved sidelink beam sweep procedures.

The wireless communications system 200 may include a base station 105-a, a first UE 115-a, a second UE 115-b, and a third UE 115-c, which may be examples of base stations 105 and UEs 115 described with reference to FIG. 1. In some aspects, the UEs 115 may communicate with the base station 105-a using communication links 205 (e.g., communication links 205-a, 205-b), which may be examples of an NR or LTE link between the base station 105-a and the respective UEs 115. In some aspects, communication links 205 may include examples of access links (e.g., Uu links) which may include bi-directional links that enable both uplink and downlink communication. For example, the first UE 115-a may transmit uplink signals, such as uplink control signals or uplink data signals, to the base station 105-a using a communication link 205-a, and the base station 105-a may transmit downlink signals, such as downlink control signals or downlink data signals, to the UE 115-a using the communication link 205-a.

In some aspects, the first UE 115-a, the second UE 115-b, and the third UE 115-c may communicate with one another using communication links 210-a, 210-b, 210-c, which may be examples of sidelink communication links or PC5 links. For example, the first UE 115-a may communicate with the second UE 115-b and the third UE 115-c via communication links 210-a and 210-b, respectively.

In some aspects, the communication links 210-a, 210-b, 210-c between the respective UEs 115 (e.g., sidelink communication links) may be included within a sidelink network of the wireless communications system 200. The sidelink network (e.g., sidelink network including the communication links 210-a, 210-b, 210-c) may be configured to operate in a "Mode 1" and/or a "Mode 2." While operating in Mode 1, the sidelink network (e.g., communication links 210-a, 210-b, 210-c) may be managed (e.g., coordinated) by the base station 105-a. In this regard, during Mode 1 operation, the base station 105-a may manage resource allocation over the communication links 210-a, 210-b, 210-c, and may allocate sets of resources within the communication links 210-a, 210-b, 210-c to the respective UEs 115-a, 115-b, and 115-c via the communication links 205-a, 205-b and/or other communication links 205 between the base station 105-a and the respective UEs 115. In some cases, the base station 105-a may allocate sets of sidelink resources to the respective UEs 115 during Mode 1 operation via RRC signaling, downlink control information (DCI) messages (e.g., DCI 3_0), or both. During Mode 1 operation, the base station 105-a may allocate sidelink resources via dynamic grants, configured grants (e.g., type 1 configured grants, type 2 configured grants), or both. Within Mode 1 operation, a modulation and coding scheme (MCS) used for communications over the communication links 210-a, 210-b, 210-c (e.g., sidelink communication links 210-a, 210-b, 210-c) may be left up to the respective UEs 115, within limits which are pre-configured at the UEs 115 and/or signaled by the base station 105-a.

Comparatively, while operating in Mode 2, the sidelink network (e.g., communication links 210-a, 210-b, 210-c) may not be managed (e.g., may not be coordinated) by the base station 105-a. Without coordination or management of the resources of the sidelink network during the Mode 2 operation, the UEs 115 may be configured to monitor the sidelink network (e.g., monitor sidelink communication links 210-a, 210-b, 210-c), and determine sets of sidelink resources which are available for transmission of sidelink messages via the sidelink communication links 210-a, 210-b, 210-c. For example, the first UE 115-a may "autonomously" determine sidelink resources which are to be used within the communication links 210-a, 210-b, 210-c by monitoring the communication links 210-a, 210-b, 210-c (e.g., perform channel sensing), and blindly decoding all physical sidelink shared channels (PSSCHs) within the communication links 210-a, 210-b, 210-c to identify sidelink resources which have been reserved by other UEs 115 (e.g., second UE 115-b, third UE 115-c). Subsequently, the first UE 115-a may report available sidelink resources to the upper layer, and may transmit a sidelink communication (e.g., sidelink control information (SCI)) which reserves a set of sidelink resources for a sidelink communication to be performed (e.g., transmitted, received) at the first UE 115-a. In this regard, Mode 2 operation of the sidelink network including the communication links 210-a, 210-b, 210-c may follow contention-based access procedures in which the various UEs 115 to "compete" for the use of the sidelink network, including the communication links 210-a, 210-b, 210-c.

While wireless communications system 200 is shown and described as including a base station 105-a and UEs 115, these wireless devices are provided solely by way of example. The signaling and other operations performed by the base station 105-a and the UEs 115 of the wireless communications system 200 may be performed by any wireless device, including IAB nodes, CPEs, repeater nodes, relay nodes, intelligent reflective surface (IRS) nodes, and the like. For example, in some cases, the operations/signaling performed by the UE 115-a may be performed by an IAB node, a CPE, or both. Similarly, in some cases, the operations/signaling performed by the base station 105-a may be performed by an IAB node.

In some aspects, the UE 115-a and the base station 105-a may communicate with one another using one or more beams, one or more carriers, one or more communications links, or any combination thereof. For example, as shown in FIG. 2, the first UE 115-a may be configured to generate a set of transmit beams 215 via one or more antenna modules and/or one or more antenna subarrays, where the transmit beams 215 may facilitate wireless communications with second UE 115-b via the communication link 210-a. Similarly, the second UE 115-b, may be configured to generate a set of receive beams 220 via one or more antenna modules and/or one or more antenna subarrays. In this regard, the first UE 115-a may be configured to transmit sidelink messages to the second UE 115-b via the set of transmit beams 215, and the second UE 115-b may be configured to receive the sidelink messages from the first UE 115-a via the set of receive beams 220.

In some aspects, the transmit beams 215 may be referred to as reference beams (e.g., synchronization signal block (SSB) beams, CSI-RS beams). In some aspects, the first UE 115-a (e.g., Tx UE 115-a) may be configured to transmit sidelink reference signals over the sidelink communication link 210-a using the transmit beams 215 (e.g., reference beams), where the second UE 115-b (e.g., Rx UE 115-b) performs measurements on the reference beams (e.g., measurements on reference signals transmitted using the reference beams/transmit beams 215). In some aspects, reference beams (e.g., transmit beams 215) may include common reference beams and UE-specific reference beams. As it is used herein, the term "UE-specific reference beams" may refer to reference beams which are dedicated to a specific to a specific UE 115 (e.g., second UE 115-b). As such, UE-specific reference beams may include unicast transmissions, groupcast transmissions where the group of UEs 115 receiving the groupcast transmission have coordinated active durations (e.g., coordinated ON durations), or both.

The UEs 115 may include one or more antenna modules, where each antenna module includes an antenna array including a set of antenna elements (e.g., 4×4 array of antenna elements). The UEs 115 may be configured to perform beamforming (e.g., beamforming on the sidelink communication links 210) and beam switching procedures using the one or more antenna modules, antenna arrays, and antenna elements at the respective UEs 115.

Beam management procedures may be required for efficient beamforming, during which the respective UEs 115 select which beams will be used for communications. For example, as noted previously herein, the first UE 115-a may perform a beam sweep procedure with the second UE 115-b during which the first UE 115-a transmits sidelink reference signals by sweeping through the set of transmit beams 215 (e.g., switching between the set of transmit beams 215) in order to determine which transmit beam(s) 215 should be used for communications with the second UE 115-b. Similarly, during the beam sweep procedure, the second UE 15-b may be configured to perform measurements on the received reference signals and sweep through the set of receive beams 220 in order to determine which receive beam(s) 220 should be used for communications with the first UE 115-a. In some cases, coordination between the first UE 115-a and the second UE 115-b regarding the sidelink beam sweep procedure (e.g., resources for the beam sweep procedure, which transmit beams 215/receive beams 220 are to be used) may be performed via signaling between the first UE 115-a and the second UE 115-b via sidelink communication link 210-a, via configuration from the base station 105-a via communication links 205-a, 205-b, or both. In some aspects, sidelink beam sweep procedures and/or reference beams (e.g., transmit beams 215) used for the sidelink beam sweep procedures may be periodic or aperiodic.

When performing sidelink beam sweep procedures, some transmit beams 215 from the set of transmit beams 215 at the first UE 115-a may be ill-suited for sidelink communications. For example, a given transmit beam 215 may be ill-suited for communications with the second UE 115-b depending on network conditions, relative positions of the first UE 115-a and the second UE 115-b, mobility states of the first UE 115-*a* and the second UE 115-*b* (e.g., movement of UEs 115, speed of UEs 115, direction of movement), and the like. In such cases, sweeping through the full set of transmit beams 215 may be unnecessary and time consuming, as only a subset of the transmit beams 215 may be viable candidates for sidelink communications with the second UE 115-*b*. In other words, the first UE 115-*a* (e.g., Tx UE 115-*a*) may not need to sweep through all the transmit beams 215 (e.g., reference beams) during a beam sweep procedure, and may only need to sweep through a subset of the transmit beams 215. However, some wireless communications systems do not provide signaling or other configurations which enable Tx UEs 115 (e.g., first UE 115-*a*) to select subsets of transmit beams 215 which will be used during sidelink beam sweep procedures.

Additionally, DRX cycles at the respective UEs 115 may further complicate sidelink beam sweep procedures. DRX cycles at the respective UEs 115 may include active durations and inactive durations, where the respective UEs 115 may be configured to communicate during the active durations, and "sleep," or otherwise enter a lower-power mode of operation, during the inactive durations. As such, DRX cycles may enable the UEs 115 to save power (e.g., reduce power consumption) during the inactive durations. However, in cases where the second UE 115-*b* (e.g., Rx UE 115-*b*) is configured with a DRX cycle, the second UE 115-*b* may be unable to perform sidelink beam sweep procedures (e.g., receive reference signals for sidelink beam sweep procedures) during inactive durations of the DRX cycle.

Accordingly, the base station 105-*a* and the UEs 115 of the wireless communications system 200 may support techniques improved sidelink beam sweep procedures. In particular, the base station 105-*a* and the UEs 115 of the wireless communications system 200 may support techniques for selecting subsets of transmit beams for performing sidelink beam sweep procedures between UEs 115, and for determining a relative timing of reference signals which are transmitted using the selected subset of transmit beams. Additionally, the base station 105-*a* and the UEs 115 of the wireless communications system 200 may support techniques for determining a periodicity of sidelink beam sweep procedures (e.g., periodic sidelink beam sweep procedures) based on a DRX cycle at an Rx UE 115 (e.g., second UE 115-*b*), and for triggering aperiodic sidelink beam sweep procedures.

For example, the first UE 115-*a* may transmit and/or receive a first control message indicating a sidelink beam measurement configuration 225 for performing sidelink beam sweep procedures using a set of transmit beams 215 at the first UE 115-*a*. The control message indicating the sidelink beam measurement configuration 225 may include an RRC message (e.g., Layer 3 (L3) signaling), a MAC-CE (e.g., Layer 2 (L2) signaling), a DCI message (e.g., Layer 1 (L1) signaling), an SCI message, or any combination thereof.

The control message indicating the sidelink beam measurement configuration 225 may be transmitted to the UEs 115-*a*, 115-*b* from the base station 105-*a* (e.g., configured by the base station 105-*a*), negotiated between the UEs 115-*a*, 115-*b*, determined based on a preconfigured algorithm, or any combination thereof. For example, in some cases, the base station 105-*a* may transmit RRC messages indicating the sidelink beam measurement configuration 225 to the first UE 115-*a* and the second UE 115-*b*. By way of another example, the first UE 115-*a* may be configured (e.g., via the base station 105-*a*) and/or pre-configured with the sidelink beam measurement configuration 225, and may transmit the control message indicating the sidelink beam measurement configuration 225 to the second UE 115-*b*.

As will be described in further detail herein with respect to FIG. 3, the sidelink beam measurement configuration 225 may indicate a set of TTIs during which respective transmit beams 215 of the set of transmit beams 215 at the first UE 115-*a* are to be used to transmit respective sidelink reference signals 230 during sidelink beam sweep procedures. In other words, the first UE 115-*a* (e.g., Tx UE 115-*a*) and the second UE 115-*b* (e.g., Rx UE 115-*b*) may have an agreement on which transmit beams 215 will be used in each TTI of a sidelink beam sweep procedure.

For example, in cases where the first UE 115-*a* is configured with five transmit beams 215, the sidelink beam measurement configuration 225 may indicate five TTIs, where the five respective transmit beams 215 are to be used to transmit sidelink reference signals 230 during the five respective TTIs during the sidelink beam sweep procedures. In some cases, the sidelink beam measurement configuration 225 may indicate whether selected subsets of transmit beams 215 are to be used during corresponding TTIs of a sidelink beam sweep procedure, during different TTIs of a sidelink beam sweep procedure, or both.

In some aspects, the sidelink beam measurement configuration 225 may indicate, or may be associated with, one or more parameters for selecting/identifying transmit beams 215 of the first UE 115-*a* which will be used for sidelink beam sweep procedures between the first UE 115-*a* and the second UE 115-*b*. In this regard, the sidelink beam measurement configuration 225 may indicate a set of parameters or other rules which are to be used select/identify transmit beams 215 which will be used for sidelink beam sweep procedures between the UEs 115-*a*, 115-*b*.

Parameters associated with the sidelink beam measurement configuration 225 may include beam measurement reports 240, geographical positions of the UEs 115-*a*, 115-*b*, mobility states of the UEs 115-*a*, 115-*b*, beam correlations between transmit beams 215, pre-configured algorithms for selecting transmit beams 215, or any combination thereof. As it is used herein, the term "mobility state" may refer to whether or not a UE 115 is moving or not, a speed/acceleration of the respective UE 115, a direction of movement of the respective UE 115, and the like.

For example, a first sidelink beam measurement configuration 225 may configure the UEs 115-*a*, 115-*b* with an algorithm for selecting subsets of transmit beams 215 based on latest measurement results (e.g., beam measurement reports 240) associated with sidelink communications between the respective UEs 115-*a*, 115-*b*. By way of another example, a second sidelink beam measurement configuration 225 may configure the UEs 115-*a*, 115-*b* to select/identify subsets of transmit beams 215 based on geographical positions and mobility states of the respective UEs 115-*a*, 115-*b*.

In this regard, the sidelink beam measurement configuration may configure/instruct the first UE 115-*a* and the second UE 115-*b* to select/identify a subset of transmit beams 215 of a set of transmit beams 215 which will be used for sidelink beam sweep procedures. The sidelink beam measurement configuration 225 may configure the UEs 115-*a*, 115-*b* to select the subset of transmit beams 215 based on a latest beam measurement report 240 associated with sidelink communications between the respective UEs 115, based on geographical positions (e.g., locations) of the respective UEs 115, mobility states (e.g., whether UEs 115 are moving, speed of UEs 115, etc.), beam correlations between transmit beams 215, and the like.

In some cases, the base station 105-*a* may transmit a control message indicating a subset of transmit beams 215 of the set of transmit beams 215 of the first UE 115-*a* which are to be used for a beam sweep procedure between the first UE 115-*a* and the second UE 115-*b*. In this regard, base station 105-*a* may dynamically indicate a subset of transmit beams 215 which are to be swept across by the first UE 115-*a* during the sidelink beam sweep procedure. For example, the base station 105-*a* may configure the first UE 115-*a* with a set of transmit beams 215 (e.g., reference beams) via the sidelink beam measurement configuration 225 signaled via L3 signaling (e.g., RRC message), and may subsequently dynamically select/indicate a subset of the transmit beams 215 (e.g., subset of reference beams) which are to be used for a sidelink beam sweep procedure via L1 signaling (e.g., MAC-CE) and/or L2 signaling (e.g., DCI message).

Additionally, or alternatively, the first UE 115-*a* may select a subset of transmit beams 215 from the set of transmit beams 215 at the first UE 115-*a* for a sidelink beam sweep procedure based on the sidelink beam measurement configuration 225. Similarly, the second UE 115-*b* may identify a subset of transmit beams 215 from the set of transmit beams 215 the first UE 115-*a* which will be used for a sidelink beam sweep procedure based on the sidelink beam measurement configuration 225. In this regard, the first UE 115-*a* and the second UE 115-*b* may select/identify which transmit beams 215 from a set of transmit beams 215 configured at the first UE 115-*a* will be swept across during a sidelink beam sweep procedure between the UEs 115-*a*, 115-*b*.

For example, the first UE 115-*a* and the second UE 115-*b* may select/identify the subset of transmit beams 215 based on a preconfigured algorithm which generates the same subset of transmit beams 215 at each of the first UE 115-*a* and the second UE 115-*b*. For instance, the sidelink beam measurement configuration 225 may configure the UEs 115-*a*, 115-*b* with a preconfigured algorithm which results in the same subset of transmit beams 215 at the respective UEs 115-*a*, 115-*a* based on a beam measurement report 240 (e.g., latest beam measurement report 240). In this regard, in some cases, the UEs 115 may select/identify the subset of transmit beams 215 which will be used based on a latest beam measurement report 240 associated with sidelink communications between the respective UEs 115.

Moreover, the first UE 115-*a* and the second UE 115-*b* may be configured to select/identify the subset of transmit beams 215 based on (e.g., using) one or more parameters of the sidelink beam measurement configuration 225. In particular, geographical positions, mobility states, and/or beam correlations may enable the UEs 115-*a*, 115-*b* to identify and/or select subsets of transmit beams 215 which will be used for a sidelink beam sweep procedure between the respective UEs 115-*a*, 115-*b*.

For example, depending on a first geographical position (e.g., location) of the first UE 115-*a* relative to a second geographical position of the second UE 115-*b*, only a subset of transmit beams 215 of a set of transmit beams 215 configured at the first UE 115-*a* may be viable candidates for communications between the UEs 115-*a*, 115-*b*. For instance, if the first UE 115-*a* and the second UE 115-*b* are static (e.g., constant geographical positions), transmit beams 215 with beam directions correlating to the respective geographical positions may be selected/identified for the sidelink beam sweep procedure. As such, identifying geographical positions of the respective UE 115-*a*, 115-*b* may enable the UEs 115-*a*, 115-*b* to select/identify a subset of transmit beams 215 which will be swept across during a sidelink beam sweep procedure.

Additionally, mobility states of the respective UEs 115-*a*, 115-*b* may affect which transmit beams 215 and/or a quantity of transmit beams 215 which will be swept across during a sidelink beam sweep procedure. In particular, if the first UE 115-*a* and/or the second UE 115-*b* exhibits a high mobility state (e.g., fast movement, changing directions), wider transmit beams 215 and/or larger quantities of transmit beams 215 may be selected for the sidelink beam sweep procedure in order to identify the most efficient/reliable transmit beams 215 for sidelink communications. Moreover, beam correlations between transmit beams 215 may be used to select subsets of transmit beams 215 which will be used for the sidelink beam sweep procedure. In particular, if the first UE 115-*a* is capable of performing multi-beam transmissions and/or full-duplex communications (e.g., transmitting and receiving communications simultaneously), the subset of transmit beams 215 may be selected/identified such that the selected transmit beams 215 do not significantly interference with one another. As such, the subset of transmit beams 215 may be selected/identified based on beam correlations/interferences such that interference at the first UE 115-*a* which is attributable to communications performed using the selected transmit beams 215 is reduced or eliminated.

In some cases, the subset of transmit beams 215 which are selected/identified may be signaled to other wireless devices of the wireless communications system 200. In particular, the subset of transmit beams 215 which will be used for a sidelink beam sweep procedure may be indicated to respective wireless devices of the wireless communications system 200 via signaling between the first UE 115-*a* and the second UE 115-*b* via communication link 210-*a*, via signaling from the base station 105-*a* (e.g., communication links 205-*a*, 205-*b*), via relay communication devices (e.g., via the third UE 115-*c*), and the like.

Upon selecting/identifying the subset of transmit beams 215, the first UE 115-*a* may transmit, to the second UE 115-*b*, a set of sidelink reference signals 230 using the selected subset of transmit beams 215 during a first sidelink beam sweep procedure. In other words, the first UE 115-*a* may transmit the first subset of sidelink reference signals 230 by sweeping across the first set of transmit beams 215. As such, the first UE 115-*a* may transmit at least one sidelink reference signal 230 using each transmit beam 215 of the first subset of transmit beams 215 during the sidelink beam sweep procedure.

As will be discussed in further detail herein with respect to FIG. 3, the first UE 115-*a* may transmit the set of sidelink reference signals 230 within original time slots (e.g., original TTIs) which correspond to the selected subset of transmit beams 215, within new time slots (e.g., new TTIs) which do not correspond to the selected subset of transmit beams 215, or both. In some cases, the sidelink beam measurement configuration 225 may indicate whether sidelink reference signals 230 are to be transmitted within original time slots or new time slots during the sidelink beam sweep procedure.

In response to receiving the sidelink reference signals 230 during the sidelink beam sweep procedure, the second UE 115-*b* may transmit control signaling (e.g., control message) including an indication of one or more transmit beams 215 from the first subset of transmit beams 215. In other words, the second UE 115-*b* may indicate one or more preferred or non-preferred transmit beams 215 which were used during the sidelink beam sweep procedure. For example, the second UE 115-a may indicate one or more transmit beams 215 of the subset of transmit beams 215 which were used during the sidelink beam sweep procedure which exhibit the best performance (e.g., highest RSRP, highest RSRQ). In some aspects, the control message may indicate measurements (e.g., RSRP, RSRQ, SNR, SINR, CQI) associated with each of the respective transmit beams 215 used during the first beam sweep procedure.

Subsequently, the first UE 115-a may perform communications using the one or more transmit beams 215 which were indicated by the second UE 115-b. For example, in cases where the second UE 115-b indicates a preferred transmit beam 215, the first UE 115-a may transmit subsequent sidelink messages 235 using the preferred transmit beam 215.

By enabling the first UE 115-a to select a subset of transmit beams 215 which will be used for sidelink beam sweep procedures, techniques described herein may enable the first UE 115-a to sweep through fewer transmit beams 215 during each sidelink beam sweep procedure. As such, techniques described herein may reduce a time required for sidelink beam sweep procedures, and may improve resource utilization associated with sidelink beam sweep procedures.

Additionally, or alternatively, the wireless communications system 200 may support techniques which enable sidelink beam sweep procedures to be performed in accordance with DRX cycles at the respective UEs 115, and techniques for triggering aperiodic sidelink beam sweep procedures.

For example, the second UE 115-b may be configured with a DRX cycle including a set of active durations (e.g., ON durations) and a set of inactive durations (e.g., OFF durations). The first UE 115-a may receive a control message indicating a first periodicity of a set of active durations of a DRX cycle at a second UE 115-b. The first UE 115-a may receive the control message indicating the first periodicity from the second UE 115-b, via the base station 105-a, or both. Additionally, or alternatively, the first UE 115-a may be pre-configured with information associated with the DRX cycle at the second UE 115-b.

In some cases, the first UE 115-a and the second UE 115-b may negotiate a second periodicity of beam sweep occasions for performing sidelink beam sweep procedures between the first UE 115-a and the second UE 115-b (e.g., via the PC5 interface). In some cases, the first UE 115-a and the second UE 115-b may negotiate the second periodicity based on the first periodicity of the DRX cycle at the second UE 115-b. For example, the first UE 115-a may transmit, to the second UE 115-b, control signaling (e.g., L3 signaling, RRC message) indicating a requested periodicity for beam sweep occasions, and may subsequently receive, from the second UE 115-b, an indication of the requested periodicity or a different periodicity. Conversely, by way of another example, the first UE 115-a may receive, from the second UE 115-b, control signaling indicating (e.g., L3 signaling, RRC message) a requested periodicity for beam sweep occasions, and may subsequently transmit, to the second UE 115-b, an indication of the requested periodicity or a different periodicity. In this regard, the first UE 115-a and the second UE 115-b may negotiate the configuration for the sidelink beam sweep procedures (e.g., second periodicity of the beam sweep occasions) via signaling over the PC5 interface (e.g., communication link 210-a).

In some aspects, the first UE 115-a may transmit or receive a control message indicating the second periodicity of the beam sweep occasions for performing sidelink beam sweep procedures using the set of transmit beams 215 (e.g., reference beams) at the first UE 115-a. The first UE 115-a may transmit/receive the control message indicating the second periodicity based on transmitting/receiving the first periodicity of the DRX cycle at the second UE 115-b, negotiating the second periodicity of the beam sweep occasions, or both. For example, in some cases, the second periodicity of the sidelink beam sweep occasions may include an integer multiple of active durations of the DRX cycle of the second UE 115-b. For instance, the second periodicity may configure beam sweep occasions every other active duration of the DRX cycle, every third active duration, and the like.

The first UE 115-a may transmit the control message indicating the second periodicity to the second UE 115-b via the PC5 interface (e.g., communication link 210-a), to the base station 105-a via a Uu interface (e.g., communication link 205-a), or both. Conversely, the first UE 115-a may receive the control message indicating the second periodicity from the second UE 115-b via the PC5 interface, from the base station 105-a via a Uu interface, or both. For instance, the base station 105-a may transmit, to the first UE 115-a and/or the second UE 115-b, control signaling indicating a configuration for UE-specific beam measurement via sidelink beam sweep procedures (e.g., second periodicity of the beam sweep occasions) between the respective UEs 115-b, 115-b. The control signaling from the base station which configures the sidelink beam sweep procedures (e.g., second periodicity of the beam sweep occasions) may include L1 signaling (e.g., DCI message), L2 signaling (e.g., MAC-CE), L3 signaling (e.g., RRC message), or any combination thereof.

In some aspects, the first UE 115-a may transmit, to the second UE 115-b, a first set of sidelink reference signals 230 using the set of transmit beams 215 of the first UE 115-a during a first sidelink beam sweep procedure performed within a first beam sweep occasion. In other words, the first UE 115-a may transmit the first subset of sidelink reference signals 230 by sweeping across at least a subset of the set of transmit beams 215 of the first UE 115-a. The second UE 115-b may be configured to perform measurements on the received sidelink reference signals 230 and/or sweep across at least a subset of receive beams 220 at the second UE 115-b. In some cases, the first beam sweep occasion may correspond to a first active duration of the set of active durations of the DRX cycle at the second UE 115-b. In particular, the first UE 115-a may transmit the sidelink reference signals 230 during the first sidelink beam sweep procedure just before the first active duration (e.g., first ON duration) of the second UE 115-b.

The first UE 115-d may transmit the sidelink reference signals 230 during the first sidelink beam sweep procedure based on the first periodicity of the active durations of the DRX cycle at the second UE 115-b, negotiating the second periodicity of beam sweep occasions, transmitting/receiving the indication of the second periodicity of the beam sweep occasions, or any combination thereof. As noted previously herein, the sidelink reference signals 230 transmitted during the first sidelink beam sweep procedure may include UE-specific reference signals. Accordingly, the sidelink reference signals 230 transmitted during the first sidelink beam sweep procedure may include unicast transmissions, groupcast transmissions, SSB messages, CSI-RSs, or any combination thereof.

In some implementations, the first UE 115-a may receive, from the second UE 115-b, a beam measurement report 240 (e.g., control signaling) indicating one or more transmit beams 215 from the set of transmit beams 215 used during the first sidelink beam sweep procedure. In other words, the second UE 115-*b* may indicate one or more preferred or non-preferred transmit beams 215 which were used during the first sidelink beam sweep procedure. For example, the second UE 115-*b* may indicate one or more transmit beams 215 of the set of transmit beams 215 which were used during the first sidelink beam sweep procedure which exhibit the best performance (e.g., highest RSRP, highest RSRQ). In some aspects, the beam measurement report 240 may indicate measurements (e.g., RSRP, RSRQ, SNR, SINR, CQI) associated with each of the respective transmit beams 215 used during the first sidelink beam sweep procedure.

In some implementations, the beam measurement report 240 may indicate one or more receive beams 220 used by the second UE 115-*b* during the first sidelink beam sweep procedure. In particular, the second beam measurement report 240 may indicate one or more receive beams 220 of the set of receive beams 220 at the second UE 115-*b* which were used during the first sidelink beam sweep procedure which exhibit the best performance (e.g., highest RSRP, highest RSRQ).

In some aspects, the first UE 115-*a* may transmit, to the second UE 115-*b*, a sidelink message 235 using the one or more transmit beams 215 indicated via the beam measurement report 240. In particular, the first UE 115-*a* may transmit sidelink messages 235 within at least the first active duration of the DRX cycle at the second UE 115-*b* using the one or more transmit beams 215 indicated in the beam measurement report 240.

For example, in cases where the first sidelink beam sweep procedure is performed during/prior to a first active duration of the DRX cycle at the second UE 115-*b*, the first UE 115-*a* may transmit sidelink messages 235 to the second UE 115-*b* during the first active duration using the one or more transmit beams 215 indicated by the second UE 115-*b* in the beam measurement report 240. In cases where the first beam sweep procedure is performed prior to the first active duration of the DRX cycle, the second UE 1115-*b* may be configured "wake up," or may otherwise be configured to perform wireless communications, during the first sidelink beam sweep procedure which is prior to the first active duration. In some cases, the one or more transmit beams 215 indicated in the beam measurement report 240 may be used for additional active durations at the second UE 115-*b*. For example, in some cases, the second periodicity may configure beam sweep occasions every other active duration (e.g., first active duration, third active duration, fifth active duration) of the DRX cycle at the second UE 115-*b*. In this example, the first UE 115-*a* may transmit sidelink messages 235 to the second UE 115-*b* using the one or more transmit beams 215 indicated in the beam measurement report 240 during the second active duration, as the next beam sweep procedure may not be performed until during/just prior to the third active duration.

In some cases, the first UE 115-*a* and the second UE 115-*b* may exhibit beam correspondence in which a channel between the first UE 115-*a* and the second UE 115-*b* is the same no matter the direction of the communications. That is, if beam correspondence exists, transmit beams 215 used by the first UE 115-*a* to transmit sidelink messages 235 to the second UE 115-*b* may also be used by the second UE 115-*b* to transmit sidelink messages 235 to the first UE 115-*a*. Similarly, if beam correspondence exists, receive beams 220 used by the second UE 115-*b* to receive sidelink messages 235 from the first UE 115-*a* may also be used by the first UE 115-*a* to receive sidelink messages 235 from the second UE 115-*b*. In this regard, if beam correspondence exists, sidelink beam sweep procedures may be performed in only one direction (e.g., from the first UE 115-*a* to the second UE 115-*b*), as either UE 115-*a*, 115-*b* could be considered a Tx UE 115 and/or an Rx UE 115, and transmit beams 215 may also be used as receive beams 220 (and vice versa). Accordingly, if beam correspondence exists, the sidelink beam sweep procedures may be used to determine both the transmit and receive beams which are to be used for sidelink communications by both the first UE 115-*a* and the second UE 115-*b*.

Conversely, if beam correspondence does not exist, the channel between the UEs 115-*b* is different depending on the direction of communications. That is, if beam correspondence does not exist, the sidelink beam sweep procedures (e.g., sidelink beam sweep procedures during which sidelink reference signals 230 are transmitted from the first UE 115-*a* to the second UE 115-*b*) may only be used to determine transmit beams 215 at the first UE 115-*a*, and the receive beams 220 at the second UE 115-*b*. As such, if beam correspondence does not exist, reverse sidelink beam sweep procedures (e.g., sidelink beam sweep procedures during which the second UE 115-*b* transmits sidelink reference signals 230 to the first UE 115-*a*) may be used to determine receive beams 220 at the first UE 115-*a* and transmit beams 215 at the second UE 115-*b*.

In some aspects, the first UE 115-*a*, the second UE 115-*b*, the base station 105-*a*, or any combination thereof, may identify changes in geographical positions of the respective UEs 115, changes in mobility states of the respective UEs 115, or any combination thereof. The UEs 115-*b*, 115-*b* may be configured to identify changes in geographical positions and/or changes in mobility states based on internal global positioning satellite (GPS) modules, signaling from the UEs 115-*b*, 115-*b*, signaling from the base station 105-*a*, the beam measurement report 240, or any combination thereof.

In some aspects, changes in geographical positions of the UEs 115, changes in mobility states of the UEs 115, or both, may be used to trigger aperiodic sidelink beam sweep procedures between the respective UEs 115. In particular, the changes to geographical positions and/or mobility states of the UEs 115 may suggest that new transmit/receive beams at the respective UEs 115 may be required to maintain efficient and reliable sidelink communications, and may thereby be used to trigger aperiodic sidelink beam sweep procedures within beam sweep occasions which do not coincide with the second periodicity of beam sweep occasions.

Additionally, or alternatively, significant changes in measurements performed at the second UE 115-*b* may be used to trigger aperiodic sidelink beam sweep procedures. In particular, changes in RSRPs, RSRQs, SNRs, SINRs, CQIs, or other measurements which satisfy a threshold (e.g., are larger than a threshold) may be used to trigger aperiodic sidelink beam sweep procedures within beam sweep occasions which do not coincide with the second periodicity of beam sweep occasions. For example, the second UE 115-*b* may determine a first RSRP ($RSRP_1$) associated with a first sidelink message 235 received during a first active duration of the DRX cycle, and may determine a second RSRP ($RSRP_2$) associated with a second sidelink message 235 received during a second active duration. In this example, the second UE 115-*b* may determine that a change in RSRPs between the first and second sidelink messages 235 satisfies a threshold RSRP (e.g., $(RSRP_1 - RSRP_2) \geq RSRP_{Thresh}$). In this example, the change in RSRPs satisfying the threshold may indicate that the transmit/receive beams used for the respective sidelink messages 235 exhibit degrading performance, which may indicate that a new sidelink beam sweep procedure (e.g., aperiodic sidelink beam sweep procedure) may be beneficial.

As such, the first UE 115-*a*, the second UE 115-*b*, the base station 105-*a*, or any combination thereof, may transmit and/or receive an aperiodic beam measurement request 245 (e.g., request for an aperiodic sidelink beam sweep procedure). In some aspects, the UEs 115-*b*, 115-*b* and/or the base station 105-*a* may transmit/receive the aperiodic beam measurement request 245 based on identifying the change in a geographical position of the first UE 115-*a* and/or second UE 115-*b*, identifying the change in a mobility state of the first UE 115-*a* and/or second UE 115-*b*, or both. Additionally, or alternatively, the second UE 115-*b* may transmit the aperiodic beam measurement request 245 based on identifying a change in measurements associated with sidelink communications received from the first UE 115-*a* (e.g., based on identifying that change in RSRP satisfies a threshold).

In some aspects, the aperiodic beam measurement request 245 may be transmitted/received via a beam measurement report 240. For example, in some cases, the second beam measurement report 240 may include an aperiodic beam measurement request 245. In this regard, the beam measurement report 240 may trigger an aperiodic sidelink beam sweep procedure, and may additionally or alternatively indicate a subset of transmit beams 215 which are to be used for the aperiodic sidelink beam sweep procedure.

The aperiodic sidelink beam measurement request may be transmitted/received between the UEs 115-*b*, 115-*b* via a PC5 interface (e.g., communication link 210-*a*) between the respective UEs 115-*a*, 115-*b*. Moreover, in some cases, the base station 105-*a* or another wireless device (e.g., third UE 115-*c*) may relay the aperiodic beam measurement request 245 between the respective UEs 115. For example, the second UE 115-*b* may transmit the aperiodic beam measurement request 245 to the base station 105-*a*, and the base station 105-*a* may forward, or relay, the aperiodic beam measurement request 245 to the first UE 115-*a*. By way of another example, the third UE 115-*c* may forward, or relay, the aperiodic beam measurement request between the UEs 115-*a*, 115-*b*, from the base station 105-*a* to the UEs 115-*a*, 115-*b*, or any combination thereof. Additionally, or alternatively, the base station 105-*a* may transmit the aperiodic beam measurement request 245 to the first UE 115-*a* and/or the second UE 115-*b* via Uu interfaces with the respective UEs 115-*b*, 115-*b* (e.g., via communication links 205-*a*, 205-*b*).

Subsequently, the first UE 115-*a* and the second UE 115-*b* may perform an aperiodic sidelink beam seep procedure based on (e.g., in response to) the aperiodic beam measurement request 245. In some cases, the aperiodic sidelink beam sweep procedure may be performed within/just prior to an active duration of the DRX cycle at the second UE 115-*b* which immediately follows an active duration during which the aperiodic beam measurement request 245 was transmitted. For instance, if the aperiodic beam measurement request 245 was transmitted/received during a fourth active duration of the DRX cycle at the second UE 115-*b*, the aperiodic sidelink beam sweep procedure may be performed before, or just prior to, a fifth active duration of the DRX cycle. In cases where the aperiodic beam measurement request 245 is included within a beam measurement report 240 which indicates a subset of transmit beams, the first UE 115-*a* may transmit the sidelink reference signals during the aperiodic beam sweep procedure using the indicated subset of transmit beams. Subsequently, the second UE 115-*b* may transmit a third beam measurement report 240 in response to the aperiodic sidelink beam sweep procedure. Moreover, the first UE 115-*a* may transmit sidelink messages 235 using the transmit beams 215 indicated in the second beam measurement report 240 during at least the active duration in which the aperiodic sidelink beam sweep procedure was performed.

Techniques described herein may provide for improved sidelink beam sweep procedures between UEs 115 for selecting beams which are to be used for sidelink communications. In particular, techniques described herein may enable UEs 115 to perform sidelink beam sweep procedures using a subset of configured transmit beams, which may expedite sidelink beam sweep procedures, reduce power consumption at the UEs 115, and improve resource utilization within the wireless communications system 100. Additionally, techniques described herein may enable sidelink beam sweep procedure to be performed in accordance with DRX cycles at the respective UEs 115, which may improve an efficiency of DRX cycles at the UEs 115, improve power savings at the UEs 115, and result in more efficient beam selection for sidelink communications.

Figure 3:
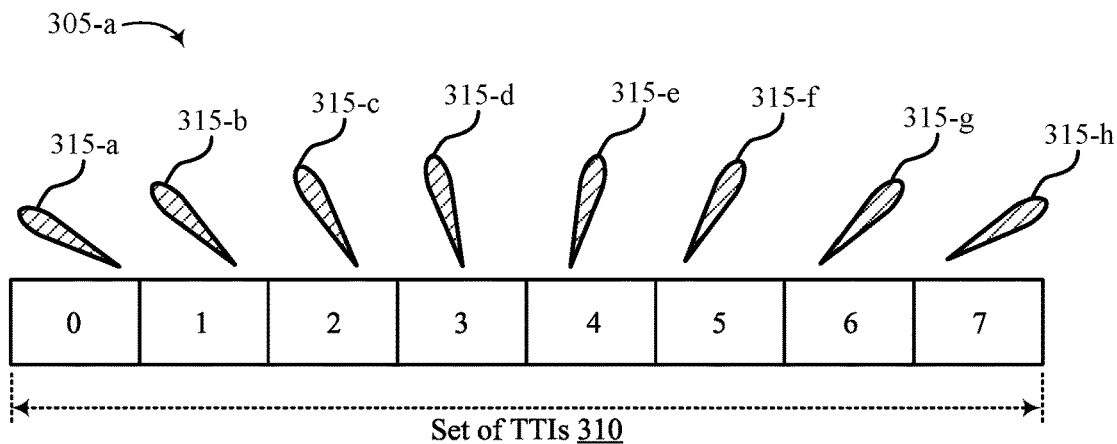
FIG. 3 illustrates an example of a resource configuration that supports techniques for sidelink reference beams in accordance with aspects of the present disclosure.
Figure 3:
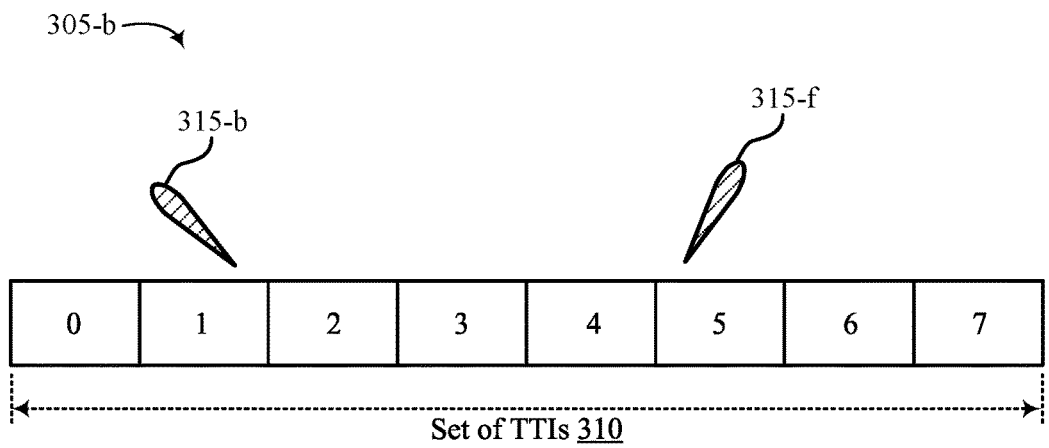
Figure 3:
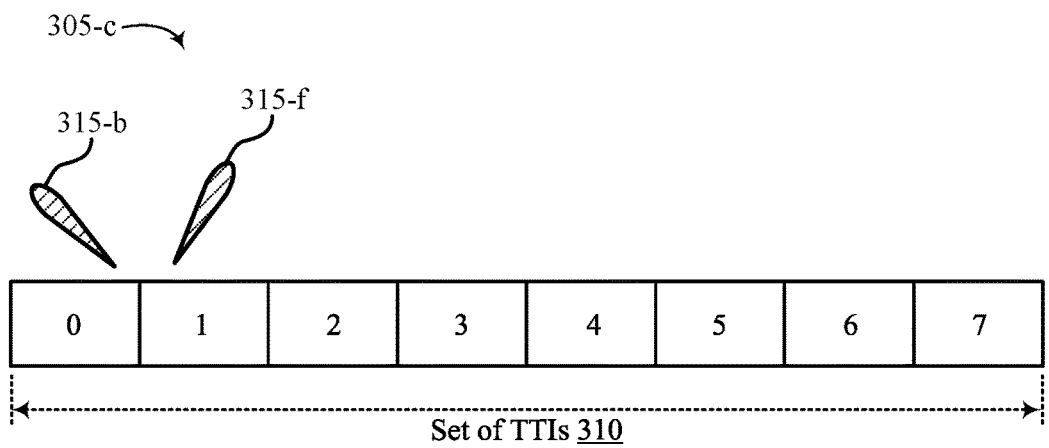

FIG. 3 illustrates an example of a resource configuration 300 that supports techniques for sidelink reference beams in accordance with aspects of the present disclosure. Aspects of the resource configuration 300 may implement, or be implemented by, aspects of the wireless communications system 100, wireless communications system 200, or both.

As noted previously herein, in some cases, a Tx UE 115 (e.g., first UE 115-*a* FIG. 1) and an Rx UE 115 (e.g., second UE 115-*b* in FIG. 2) may have an agreement on which transmit beams (e.g., reference beams) of the Tx UE 115 which will be used in each TTI of a sidelink beam sweep procedure between the first UE 115-*a* and the second UE 115-*b*. In some cases, a sidelink beam measurement configuration may indicate a set of TTIs during which respective transmit beams of the Tx UE 115 are to be used to transmit respective sidelink reference signals during a sidelink beam sweep procedure.

For example, referring to a first resource allocation scheme 305-*a* illustrated in FIG. 3, a Tx UE 115 may be configured with a set of eight transmit beams 315-*a*, 315-*b*, 315-*c*, 315-*d*, 315-*e*, 3154, 315-*g*, 315-*h* (e.g., eight reference beams). In this example, a sidelink beam measurement configuration may indicate a set of TTIs 310 during which respective transmit beams 315 are to be used to transmit sidelink reference signals during a sidelink beam sweep procedure performed during the set of TTIs 310. In other words, the sidelink beam measurement configuration may indicate that a first transmit beam 315-*a* is to be used during a first TTI 310 (e.g., TTI 0) of the sidelink beam sweep procedure, and a second transmit beam 315-*b* is to be used during a second TTI 310 (e.g., TTI 1) of the sidelink beam sweep procedure. In this regard, each transmit beam 315 may correspond to a TTI 310 of a sidelink beam sweep procedure. The TTIs 310 of the sidelink beam sweep procedure may include slots sets of slots, symbols, sets of symbols, or some other time interval.

Upon selecting a subset of transmit beams 315 of the subset of transmit beams 315 which are to be used for a beam sweep procedure, the selected transmit beams 315 may be used to transmit sidelink reference signals within the original TTIs 310 (e.g., original time slots) corresponding to the selected transmit beams 315, within different/new TTIs 310 (e.g., TTIs 310 which do not correspond to the selected transmit beams 315), or both. In some aspects, the sidelink beam measurement configuration may indicate whether selected transmit beams 315 are to be used in their original TTIs 310 and/or within different TTIs 310.

For example, referring to a second resource allocation scheme 305-b, the base station 105, the Tx UE 115, the Rx UE 115, or any combination thereof, may select to perform a sidelink beam sweep procedure using a second transmit beam 315-b and a sixth transmit beam 315-f of the set of transmit beams 315 configured at the Tx UE 115. In this example, the selected transmit beams 315-b, 315-f may be used to transmit sidelink reference signals in their original time slots. In other words, the second transmit beam 315-b may be used to transmit sidelink reference signal(s) during a second TTI 310 (e.g., TTI 1) of a sidelink beam sweep procedure, and the sixth transmit beam 315-f may be used to transmit sidelink reference signal(s) during a sixth TTI 310 (e.g., TTI 5) of the sidelink beam sweep procedure, where the other TTIs 310 (e.g., TTIs 0, 2, 3, 4, 6, and 7) are skipped for the sidelink beam sweep procedure. In this regard, the selected transmit beams 315-b, 315-f may be used to transmit sidelink reference signals during TTIs 310 (e.g., TTI 1, TTI 5) which correspond to the selected transmit beams 315-b, 315-f.

Continuing with reference to the second resource allocation scheme 305-b, the Tx UE 115 may be configured to skip TTIs 310 which do not correspond to the selected transmit beams 310-b, 310-f during the sidelink beam sweep procedure. In other words, the Tx UE 115 may be configured to refrain from transmitting sidelink reference signals during the TTIs 310 which do not correspond to the selected transmit beams 315-b, 315-f. For instance, the T UE 115 may refrain from transmitting sidelink reference signals during TTIs 0, 2, 3, 4, 6, and 7. Additionally, or alternatively, the Tx UE 115 may be configured to perform other communications (e.g., communications which are not associated with the sidelink beam sweep procedure) within the TTIs 310 which do not correspond to the selected transmit beams 310-b, 310-f. For example, the Tx UE 115 may be configured to transmit/receive sidelink data messages with the Rx UE 115 during TTIs 0, 2, 3, 4, 6, and 7. By way of another example, the Tx UE 115 may be configured to transmit uplink messages to a base station 105 and/or receive downlink messages from a base station 105 during TTIs 0, 2, 3, 4, 6, and 7.

In additional or alternative implementations, the Tx UE 115 may be configured to transmit sidelink reference signals during TTIs 310 which do not correspond to the selected transmit beams 315. For example, referring to a third resource allocation scheme 305-c, the base station 105, Tx UE 115, and/or Rx UE 115 may again select to perform a sidelink beam sweep procedure using a second transmit beam 315-b and a sixth transmit beam 315-f of the set of transmit beams 315 configured at the Tx UE 115. In this example, the selected transmit beams 315-b, 315-f may be used to transmit sidelink reference signals in new (e.g., different) time slots. For instance, as shown in FIG. 3, the second transmit beam 315-b (which originally corresponds to a second TTI 310 (TTI 1)) may be used to transmit sidelink reference signal(s) during a first TTI 310 (e.g., TTI 0) of a sidelink beam sweep procedure. Similarly, the sixth transmit beam 315-f (which originally corresponds to a sixth TTI 310 (TTI 5)) may be used to transmit sidelink reference signal(s) during a second TTI 310 (e.g., TTI 1) of the sidelink beam sweep procedure. In this regard, at least one transmit beam 315 of the selected subset of transmit beams 315 may be used in a new time slot within the sidelink beam sweep procedure.

In some cases, utilizing selected transmit beams 315 in new time slots (e.g., new TTIs 310) may reduce a time over which the sidelink beam sweep procedure is performed. For example, by selecting to transmit reference signals using the selected transmit beams 315-b, 315-c during the first and second TTIs 310 (e.g., TTIs 0 and 1), the sidelink beam sweep procedure may be performed in two TTIs 310, thereby reducing a quantity of TTIs 310 across which the sidelink beam sweep procedure is performed.

Continuing with reference to the third resource allocation scheme 305-b, the sidelink beam sweep procedure configured at (e.g., signaled to) the Tx UE 115 and the Rx UE 115 may indicate which TTIs 310 are to be used for the selected transmit beams 315. In some cases, the sidelink beam sweep procedure may cause the Tx UE 115 to perform the sidelink beam sweep procedure in a consecutive set of TTIs 310 (e.g., TTI 0, TTI 1) at the beginning of the set of TTIs 310 configured for the sidelink beam sweep procedure. Additionally, or alternatively, one or more TTIs 310 may separate the TTIs 310 used to transmit the sidelink reference signals using the second transmit beam 315-a and the sixth transmit beam 315-f.

Figure 4:
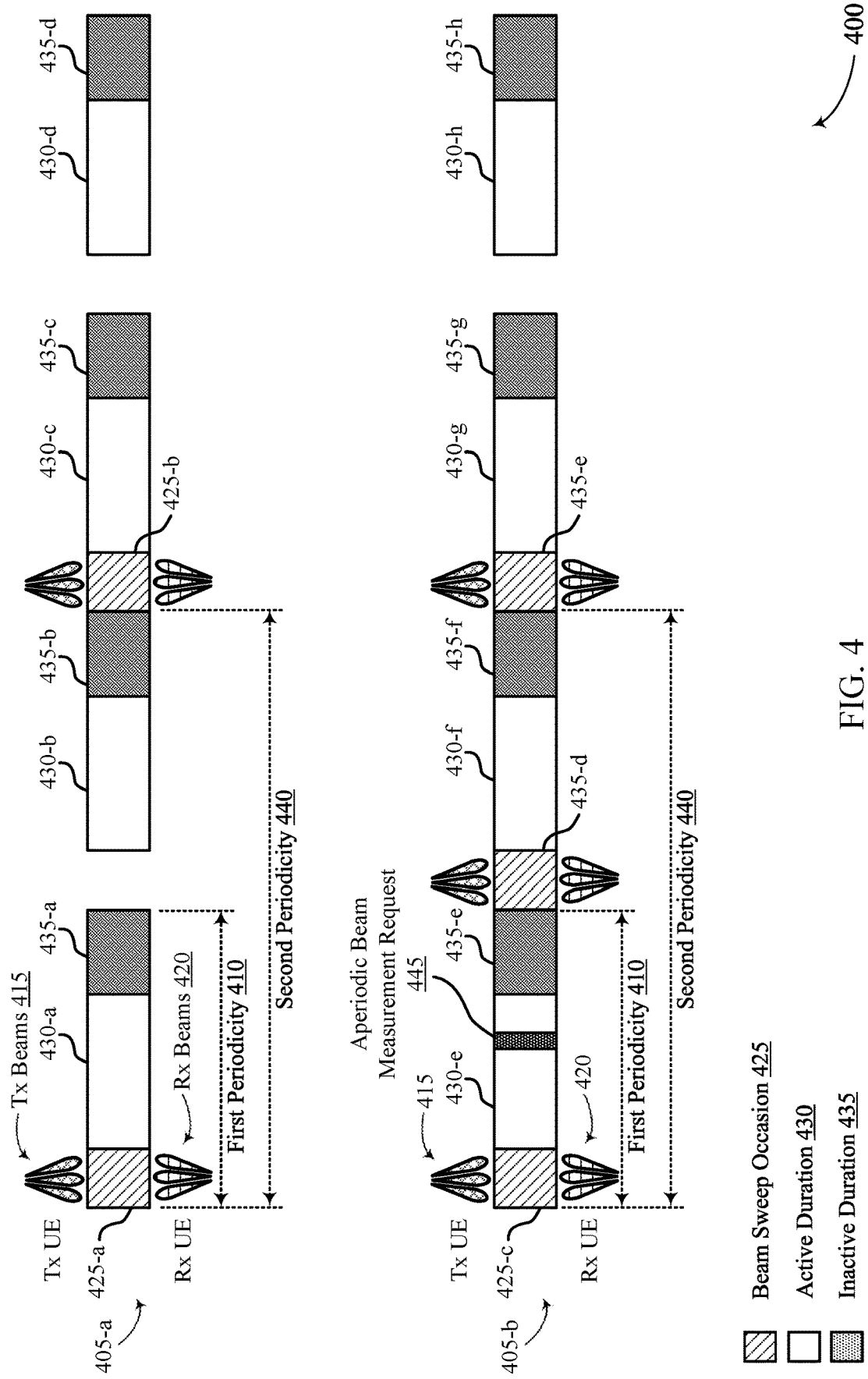
FIG. 4 illustrates an example of a resource configuration that supports techniques for sidelink reference beams in accordance with aspects of the present disclosure.

FIG. 4 illustrates an example of a resource configuration 400 that supports techniques for sidelink reference beams in accordance with aspects of the present disclosure. Aspects of the resource configuration 400 may implement, or be implemented by, aspects of the wireless communications system 100, wireless communications system 200, resource configuration 300, or any combination thereof.

As noted previously herein, a UE 115 (e.g., Rx UE 115, second UE 115-b illustrated in FIG. 1) may be configured with a DRX cycle including a set of active durations 430 (e.g., ON durations) and a set of inactive durations 435 (e.g., OFF durations). The UE 115 may sleep, or enter a lower-power state, during the inactive durations and may therefore be unable to perform communications during the inactive durations 435 in order to conserve power.

In some aspects, a configuration for performing sidelink beam sweep procedures between a Tx UE 115 and an Rx UE 115 may be configured based on a periodicity of active durations 430 at the Rx UE 115. For example, referring to a first resource allocation scheme 405-a illustrated in FIG. 4, a DRX cycle configure at an Rx UE 115 may exhibit a first periodicity 410. The first periodicity 410 may indicate a time duration between a start of consecutive active durations 430 of the DRX cycle. In this example, a configuration for sidelink beam sweep procedures may be based on the first periodicity 410. In particular, a second periodicity 440 of a set of beam sweep occasions 425 may be configured/negotiated based on the first periodicity 410 of the active durations 430.

In some cases, the second periodicity 440 of the sidelink beam sweep occasions 425 may include an integer multiple of active durations 430 of the DRX cycle of the Rx UE 115. In particular, the second periodicity 440 of beam sweep occasions 425 may be an integer multiple of short/long DRX cycles configured at the Rx UE. For instance, as shown in the first resource allocation scheme 405-a, the second periodicity 440 may configure beam sweep occasions 425 (e.g., first beam sweep occasion 425-a, second beam sweep occasion 425-b) every other active duration 430 of the DRX cycle, such that the second periodicity 440 is two times the length of the first periodicity (e.g., second periodicity 440 is two times of the DRX cycle). Additionally, or alternatively, the second periodicity 440 may configure beam sweep occasions 425 every third active duration 430 (e.g., three times the first periodicity 410), every fourth active duration 430, and the like. Moreover, as noted previously herein, the configuration for the sidelink beam sweep procedures (e.g., second periodicity 440 of the sidelink beam sweep procedures) may be configured/or updated via signaling from a base station 105, negotiation between the Tx UE 115 and the Rx UE 115, or both.

In some aspects, as shown in FIG. 4, sidelink beam sweep procedures may be performed within the beam sweep occasions 425 based on the second periodicity 440, the first periodicity 410, or both. During each sidelink beam sweep procedure, the Tx UE 115 may transmit sidelink reference signals while sweeping through at least a subset of transmit beams 415 (e.g., reference beams) at the Tx UE 115 (e.g., periodic reference beams), and the Rx UE 115 may perform measurements on the received sidelink reference signals. Additionally, in some implementations, the Rx UE 115 may receive the sidelink reference signals while sweeping through at least a subset of receive beams 420 of the Rx UE 115. As noted previously herein, the sidelink reference signals transmitted during the sidelink beam sweep procedures may include UE-specific reference signals. Accordingly, the sidelink reference signals transmitted during the sidelink beam sweep procedures may include unicast transmissions, groupcast transmissions, SSB messages, CSI-RSs, or any combination thereof.

In some aspects, the beam sweep occasions 425 may be positioned within the respective active durations 430. For example, in some cases, the first beam sweep occasion 435-a may be positioned within a first active duration 430-a. Additionally, or alternatively, the beam sweep occasions 425 may be positioned just prior to the respective active durations 430. In cases where the beam sweep occasions 425 occur outside of the active durations 430 of the DRX cycle in the time domain, the Rx UE 115 may be configured to "wake up," or may otherwise be configured to perform wireless communications, during each of the beam sweep occasions 425. As such, the Rx UE 115 may be configured to perform wireless communications (e.g., sidelink beam sweep procedures) during the beam sweep occasions 425 despite the beam sweep occasions 425 being positioned outside of the active durations 430 in the time domain.

For example, referring to the first resource allocation scheme 405-a, a first beam sweep occasion 425-a may be positioned just prior to the first active duration 430-a of the DRX cycle at the Rx UE 115. With beam sweep occasions 425 positioned just prior to the respective active durations 430, sidelink beam sweep procedures may be performed prior to the active durations 430. As such, measurements may be performed and reported by the Rx UE 115 prior to the start of the active durations 430, which may facilitate sidelink communications within the active durations 430 using the best transmit beam 415 and receive beam 420 pair(s). Accordingly, the respective active durations 430 (e.g., ON durations) may be used entirely for sidelink data/control transmission, and no portion of the active durations 430 may be lost/wasted for the purpose of sidelink beam sweeping.

In some implementations, aperiodic beam measurement requests 445 may be used to trigger aperiodic beam sweep procedures within beam sweep occasions which do not coincide with the second periodicity 440 of beam sweep occasions 425. For example, referring to a second resource allocation scheme 405-b, the Tx UE 115, the Rx UE 115, a base station 105, or any combination thereof, may transmit an aperiodic beam measurement request 445 in order to trigger an aperiodic beam sweep procedure. For instance, in this example, the aperiodic beam measurement request 445 may trigger a sidelink beam sweep procedure within a second beam sweep occasion 425-d, where the second beam sweep occasion 425-d does not coincide with the second periodicity 440. That is, the relative timing of the second beam sweep occasion 425-d during which the aperiodic beam sweep procedure is performed does is not defined by (e.g., does not coincide with) the second periodicity 440.

As noted previously herein, the Tx UE 115, the Rx UE 115, the base station 105, or any combination thereof, may transmit the aperiodic beam measurement request 445 based on (e.g., in response to) changes in geographical positions of the Tx UE 115 and/or the Rx UE 115, changes in mobility states of the Tx UE 115 and/or the Rx UE 115, or both. Additionally, or alternatively, the Rx UE 115 may transmit the aperiodic beam measurement request 445 based on identifying a change in RSRPs (or other measurements) associated with sidelink communications from the Tx UE 115 satisfies a respective threshold (e.g., based on determining $(RSRP_1 - RSRP_2) \geq RSRP_{Thresh}$).

In some aspects, the aperiodic beam measurement request 445 may indicate a timing (e.g., time resources) for the aperiodic sidelink beam sweep procedure. In other cases, the relative timing of the aperiodic beam sweep procedure may be pre-configured. For example, the UEs 115 may determine that an aperiodic beam sweep procedure is to be performed within/prior to a subsequent active duration 430 (e.g., second active duration 430-f) relative to the active duration 430 (e.g., first active duration 430-e) within which the aperiodic beam measurement request 445 is transmitted/received (e.g., the aperiodic beam sweep procedure is performed within the next ON slot/duration). In some cases, the aperiodic beam measurement request 445 may be indicated via a beam measurement report which indicates a subset of transmit beams 415 which are to be used for the aperiodic beam sweep procedure.

Figure 5:
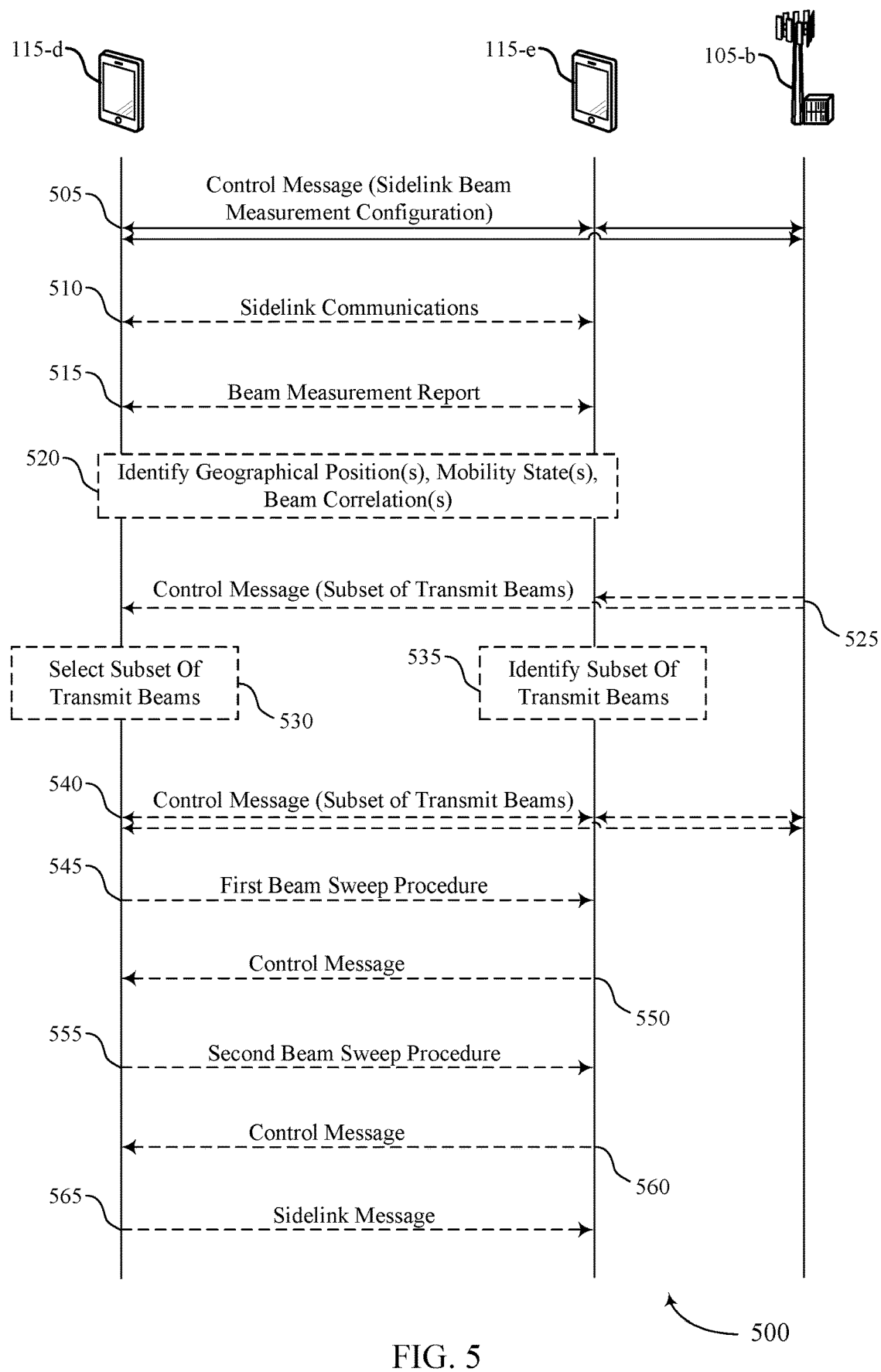
FIG. 5 illustrates an example of a process flow that supports techniques for sidelink reference beams in accordance with aspects of the present disclosure.

FIG. 5 illustrates an example of a process flow 500 that supports techniques for sidelink reference beams in accordance with aspects of the present disclosure. In some examples, process flow 500 may implement, or be implemented by, aspects of wireless communications system 100, wireless communications system 200, resource configuration 300, resource configuration 400, or any combination thereof. For example, the process flow 500 may illustrate a first UE 115-d which is configured to transmit and/or receive a sidelink beam measurement configuration for performing sidelink beam sweep procedures, select a subset of transmit beams, and transmit sidelink reference signals using the selected subset of transmit beams during a sidelink beam sweep procedure, as described with reference to FIGS. 1-4, among other aspects.

In some aspects, the process flow 500 may include a first UE 115-d, a second UE 115-e, and a base station 105-b, described with reference to FIGS. 1-4. For example, the first UE 115-d and the second UE 115-e illustrated in FIG. 5 may be examples of the first UE 115-a and the second UE 115-b, respectively, as illustrated in FIG. 2. Similarly, the base station 105-b illustrated in FIG. 5 may be an example of the base station 105-a, as illustrated in FIG. 2.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the first UE 115-*b* may transmit and/or receive a first control message indicating a sidelink beam measurement configuration for performing sidelink beam sweep procedures using a set of transmit beams at the first UE 115-*a*. The control message may include an RRC message (e.g., L3 signaling), a MAC-CE (e.g., L2 signaling), a DCI message (e.g., L1 signaling), an SCI message, or any combination thereof.

In some aspects, the sidelink beam measurement configuration may indicate, or may be associated with, one or more parameters for selecting/identifying transmit beams of the first UE 115-*d* which will be used for sidelink beam sweep procedures. In this regard, the sidelink beam measurement configuration may indicate a set of parameters or other rules which are to be used select/identify transmit beams which will be used for sidelink beam sweep procedures between the UEs 115-*d*, 115-*e*. Parameters associated with the sidelink beam measurement configuration may include beam measurement reports, geographical positions of the UEs 115-*d*, 115-*e*, mobility states of the UEs 115-*d*, 115-*e*, beam correlations between transmit beams, pre-configured algorithms for selecting transmit beams, or any combination thereof. For example, a first sidelink beam measurement configuration may configure the UEs 115-*d*, 115-*e* with an algorithm for selecting subsets of transmit beams based on latest measurement results (e.g., beam measurement reports) associated with sidelink communications between the respective UEs 115-*d*, 115-*e*. By way of another example, a second sidelink beam measurement configuration may configure the UEs 115-*d*, 115-*e* to select/identify subsets of transmit beams based on geographical positions and mobility states of the respective UEs 115-*d*, 115-*e*.

As described previously herein with reference to FIG. 3, the sidelink beam measurement configuration may indicate a set of TTIs during which respective transmit beams of the set of transmit beams at the first UE 115-*d* are to be used to transmit respective sidelink reference signals during sidelink beam sweep procedures. For example, in cases where the first UE 115-*d* is configured with five transmit beams, the sidelink beam measurement configuration may indicate five TTIs, where the five respective transmit beams are to be used to transmit sidelink reference signals during the five respective TTIs during the sidelink beam sweep procedures. In some cases, the sidelink beam measurement configuration may indicate whether selected subsets of transmit beams are to be used during corresponding TTIs of a sidelink beam sweep procedure, during different TTIs of a sidelink beam sweep procedure, or both.

The control message indicating the sidelink beam measurement configuration may be transmitted to the UEs 115-*d*, 115-*e* from the base station (e.g., configured by the base station 105-*b*), negotiated between the UEs 115-*d*, 115-*e*, determined based on a preconfigured algorithm, or any combination thereof. For example, in some cases, the base station 105-*b* may transmit RRC messages indicating the sidelink beam measurement configuration to the first UE 115-*d* and the second UE 115-*e*. By way of another example, the first UE 115-*d* may be configured (e.g., via the base station 105-*b*) and/or pre-configured with the sidelink beam measurement configuration, and may transmit the control message indicating the sidelink beam measurement configuration to the second UE 115-*e*.

At 510, the first UE 115-*d* and the second UE 115-*e* may perform sidelink communications via a sidelink communication link between the respective UEs 115-*d*, 115-*e*. For example, the first UE 115-*d* may transmit sidelink messages (e.g., sidelink reference signals, sidelink data messages) to the second UE 115-*e* via a sidelink communication link between the first UE 115-*d* and the second UE 115-*e*. In this example, the first UE 115-*d* may transmit the sidelink messages using one or more transmit beams at the first UE 115-*d*, and the second UE 115-*e* may receive the sidelink messages using one or more receive beams at the second UE 115-*e*.

At 515, the first UE 115-*d* may communicate (e.g., transmit and/or receive) beam measurement reports with the second UE 115-*e*. The first UE 115-*d* and the second UE 115-*e* may transmit/receive the beam measurement report at 515 based on performing the sidelink communications at 510. For example, the first UE 115-*d* may transmit sidelink messages (e.g., sidelink reference signals, sidelink data messages) to the second UE 115-*e* using one or more transmit beams at the first UE 115-*d*, and the second UE 115-*e* may transmit a beam measurement report to the first UE 115-*d* based on receiving the sidelink messages. In this example, the beam measurement report may indicate measurements (e.g., RSRP, RSRQ, SNR, SINR, CQI) performed on the received sidelink messages, preferred/non-preferred transmit beams at the first UE 115-*d*, and the like.

At 520, the first UE 115-*d*, the second UE 115-*e*, or both, may identify geographical positions of the respective UEs 115, mobility states of the respective UEs 115, beam correlations between transmit beams at the first UE 115-*d*, or any combination thereof. The UEs 15-*d*, 115-*e* may identify the beam geographical positions, mobility states, and/or beam correlations at 520 based on transmitting/receiving the sidelink beam measurement configuration at 505, performing the sidelink communications at 510, transmitting/receiving the beam measurement report at 515, or any combination thereof.

As will be described herein, geographical positions, mobility states, and/or beam correlations identified at 520 may enable the UEs 115-*d*, 115-*e* to identify and/or select subsets of transmit beams which will be used for a sidelink beam sweep procedure between the respective UEs 115-*d*, 115-*e*. The UEs 115-*d*, 115-*e* may be configured to identify geographical positions, mobility states, and/or beam correlations identified at 520 based on internal GPS modules, signaling from the UEs 115-*e*, 115-*d*, signaling from the base station 105-*b*, the beam measurement report transmitted/received at 515, or any combination thereof.

At 520, the base station 105-*b* may transmit a control message indicating a subset of transmit beams of the set of transmit beams of the first UE 115-*d* which are to be used for a beam sweep procedure between the first UE 115-*d* and the second UE 115-*e*. In this regard, the control message at 520 may dynamically indicate a subset of transmit beams which are to be swept across by the first UE 115-*d* during the sidelink beam sweep procedure.

For example, the base station 105-*b* may configure the first UE 115-*d* with a set of transmit beams (e.g., reference beams) via the sidelink beam measurement configuration at 505 via L3 signaling (e.g., RRC message), and may subsequently dynamically select/indicate a subset of the transmit beams (e.g., subset of reference beams) which are to be used for a sidelink beam sweep procedure at 520 via L1 signaling (e.g., MAC-CE) and/or L2 signaling (e.g., DCI message). In some cases, the first UE 115-*d* and/or the second UE 115-*e* may report parameters determined at 520 to the base station 105-*b* (e.g., report geographical positions, mobility states, beam correlations), and the base station 105-b may dynamically indicate the subset of transmit beams at 525 based on the reported parameters.

At 525, the first UE 115-d may select a subset of transmit beams from the set of transmit beams at the first UE 115-d for a sidelink beam sweep procedure. Similarly, at 530, the second UE 115-e may identify a subset of transmit beams from the set of transmit beams at the first UE 115-d which will be used for a sidelink beam sweep procedure. In this regard, the first UE 115-d and the second UE 115-e may select/identify which transmit beams from a set of transmit beams configured at the first UE 115-d will be swept across during a sidelink beam sweep procedure between the UEs 115-d, 115-e.

The first UE 115-d and the second UE 115-e may select/identify the subset of transmit beams which will be used for the sidelink beam sweep procedure based on transmitting/receiving the sidelink beam measurement configuration at 505, performing the sidelink communications at 510, transmitting/receiving the beam measurement report at 515, identifying the parameters of the sidelink beam measurement configuration at 520, receiving the indication of the subset of transmit beams at 525, or any combination thereof.

For example, the first UE 115-d and the second UE 115-e may select/identify the subset of transmit beams based on a preconfigured algorithm which generates the same subset of transmit beams at each of the first UE 115-d and the second UE 115-e. For instance, the sidelink beam measurement configuration may configure the UEs 115-d, 115-e with a preconfigured algorithm which results in the same subset of transmit beams at the respective UEs 115-d, 115-d based on the beam measurement report transmitted/received at 515. In this regard, in some cases, the UEs 115 may select/identify the subset of transmit beams which will be used based on a latest beam measurement report associated with sidelink communications between the respective UEs 115.

Moreover, the first UE 115-d and the second UE 115-e may be configured to select/identify the subset of transmit beams based on (e.g., using) one or more parameters of the sidelink beam measurement configuration. In particular, geographical positions, mobility states, and/or beam correlations identified at 520 may enable the UEs 115-d, 115-e to identify and/or select subsets of transmit beams which will be used for a sidelink beam sweep procedure between the respective UEs 115-d, 115-e.

For example, depending on a first geographical position (e.g., location) of the first UE 115-d relative to a second geographical position of the second UE 115-e, only a subset of transmit beams of a set of transmit beams configured at the first UE 115-d may be viable candidates for communications between the UEs 115-d, 115-e. For instance, if the first UE 115-a and the second UE 115-b are static (e.g., constant geographical positions), transmit beams with beam directions correlating to the respective geographical positions may be selected/identified for the sidelink beam sweep procedure. As such, identifying geographical positions of the respective UE 115-d, 115-e at 520 may enable the UEs 115-d, 115-e to select/identify a subset of transmit beams which will be swept across during a sidelink beam sweep procedure.

Additionally, mobility states of the respective UEs 115-d, 115-e may affect which transmit beams and/or a quantity of transmit beams which will be swept across during a sidelink beam sweep procedure. In particular, if the first UE 115-d and/or the second UE 115-e exhibits a high mobility state (e.g., fast movement, changing directions), wider transmit beams and/or larger quantities of transmit beams may be selected for the sidelink beam sweep procedure in order to identify the most efficient/reliable transmit beams for sidelink communications. Moreover, beam correlations between transmit beams may be used to select subsets of transmit beams which will be used for the sidelink beam sweep procedure. In particular, if the first UE 115-d is capable of performing multi-beam transmissions and/or full-duplex communications (e.g., transmitting and receiving communications simultaneously), the subset of transmit beams may be selected/identified such that the selected transmit beams do not significantly interference with one another. As such, the subset of transmit beams may be selected/identified based on beam correlations/interferences such that interference at the first UE 115-d which is attributable to communications performed using the selected transmit beams is reduced or eliminated.

At 540, the first UE 115-d and the second UE 115-e may transmit or receive a second control message indicating the subset of transmit beams which are to be used during the sidelink beam sweep procedure. In other words, the UEs 115-d, 115-e may transmit or receive an indication of which transmit beams will be swept across during the sidelink beam sweep procedure. The first UE 115-d and the second UE 115-e may transmit/receive the control message at 540 based on selecting the subset of transmit beams at 530, identifying the subset of transmit beams at 535, or both.

For example, in some cases, the first UE 115-d may select the subset of transmit beams at 530, and may inform the second UE 115-e about the subset of transmit beams via a control message (e.g., SCI) at 540. In other cases, the base station 105-d may transmit a control message (e.g., DCI message, MAC-CE) indicating the selected subset of transmit beams. In such cases, the base station 105-b may transmit the control message at 540 directly to each of the UEs 115-d, 115-e. Additionally, or alternatively, the base station 105-b may transmit the control message to one or more other wireless devices (e.g., relay UEs 115), where the other wireless devices are configured to relay, or forward, the control message to the respective UEs 115-d, 115-e.

While the control message indicating the subset of transmit beams is shown as being transmitted/received after the selecting/identifying performed at 530 and 535, this is solely for illustrative purposes. In particular, the selecting at 530 and/or the identifying at 535 may be performed after transmission/reception of the control message at 540. For example, in some cases, the first UE 115-d may transmit the control message indicating the subset of transmit beams at 540, and the second UE 115-e may subsequently identify the subset of transmit beams based on the control message.

At 545, the first UE 115-d may transmit, to the second UE 115-e, a first set of sidelink reference signals using the selected subset of transmit beams during a first sidelink beam sweep procedure. In other words, the first UE 115-d may transmit the first subset of sidelink reference signals by sweeping across the first set of transmit beams. As such, the first UE 115-d may transmit at least one sidelink reference signal using each transmit beam of the first subset of transmit beams during the sidelink beam sweep procedure.

The first UE 115-d may transmit the sidelink reference signals during the first sidelink beam sweep procedure based on receiving the sidelink beam measurement configuration at 505, receiving the control message at 525, selecting the subset of transmit beams at 530, transmitting/receiving the control message indicating the subset of transmit beams at 540, or any combination thereof.

As noted previously herein with respect to FIG. 3, the first UE 115-d may transmit the first set of sidelink reference signals within original time slots (e.g., original TTIs) which correspond to the selected subset of transmit beams, within new time slots (e.g., new TTIs) which do not correspond to the selected subset of transmit beams, or both. In some cases, the sidelink beam measurement configuration may indicate whether sidelink reference signals are to be transmitted within original time slots or new time slots during the sidelink beam sweep procedure.

At 550, the first UE 115-*d* may receive, from the second UE 115-*b*, control signaling (e.g., control message) including an indication of one or more transmit beams from the first subset of transmit beams. In other words, the second UE 115-*e* may indicate one or more preferred or non-preferred transmit beams which were used during the first sidelink beam sweep procedure at 545. For example, the second UE 115-*d* may indicate one or more transmit beams of the first subset of transmit beams which were used during the first sidelink beam sweep procedure which exhibit the best performance (e.g., highest RSRP, highest RSRQ). In some aspects, the control message may indicate measurements (e.g., RSRP, RSRQ, SNR, SINR, CQI) associated with each of the respective transmit beams used during the first beam sweep procedure.

In some cases, the first UE 115-*d* may perform subsequent sidelink beam sweep procedures based on the control message (e.g., beam measurement report) received from the second UE 115-*e* at 550 following the first sidelink beam sweep procedure. In particular, the first UE 115-*d* may use information included within the control message at 550 to further refine the transmit beams which are used for subsequent sidelink beam sweep procedures at 555.

At 555, the first UE 115-*d* may transmit, to the second UE 115-*e*, a second set of sidelink reference signals using the selected subset of transmit beams during a second sidelink beam sweep procedure. In other words, the first UE 115-*d* may transmit the second set of sidelink reference signals by sweeping across the second set of transmit beams. The first UE 115-*d* may perform the second sidelink beam sweep procedure at 555 based on performing the first sidelink beam sweep procedure at 545, receiving the control message at 550, or both. For example, the first UE 115-*d* may modify the selected subset of transmit beams which will be used for the second sidelink beam sweep procedure based on the control message at 550, and may transmit sidelink reference signals during the second sidelink beam sweep procedure at 555 by sweeping across the modified set of transmit beams.

At 560, the first UE 115-*d* may receive, from the second UE 115-*b*, control signaling (e.g., control message) including an indication of one or more transmit beams from the second subset of transmit beams used during the second sidelink beam sweep procedure. In other words, the second UE 115-*e* may indicate one or more preferred or non-preferred transmit beams which were used during the second sidelink beam sweep procedure at 550. In some aspects, the control message may indicate measurements (e.g., RSRP, RSRQ, SNR, SINR, CQI) associated with each of the respective transmit beams used during the second sidelink beam sweep procedure.

At 565, the first UE 115-*d* may transmit a sidelink message (e.g., sidelink data message) to the second UE 115-*e*. In some aspects, the first UE 115-*d* may transmit the sidelink message at 565 using a transmit beam which was used during the first sidelink beam sweep procedure at 545, the second sidelink beam sweep procedure at 555, or both. In particular, the first UE 115-*d* may transmit the sidelink message using a transmit beam which was indicated via the control signaling received from the second UE 115-*e* at 550 and/or 560. In this regard, the first UE 115-*d* may transmit the sidelink message at 565 using a transmit beam which was indicating as having sufficient performance (e.g., preferred transmit beam at the second UE 115-*e*) for sidelink communications.

Techniques described herein may provide for improved sidelink beam sweep procedures between the UEs 115-*d*, 115-*e* for selecting beams which are to be used for sidelink communications. In particular, techniques described herein may enable the UE 115-*d* to perform sidelink beam sweep procedures using a subset of configured transmit beams, which may expedite sidelink beam sweep procedures, reduce power consumption at the UEs 115-*d*, 115-*e*, and improve resource utilization within a wireless communications system.

Figure 6:
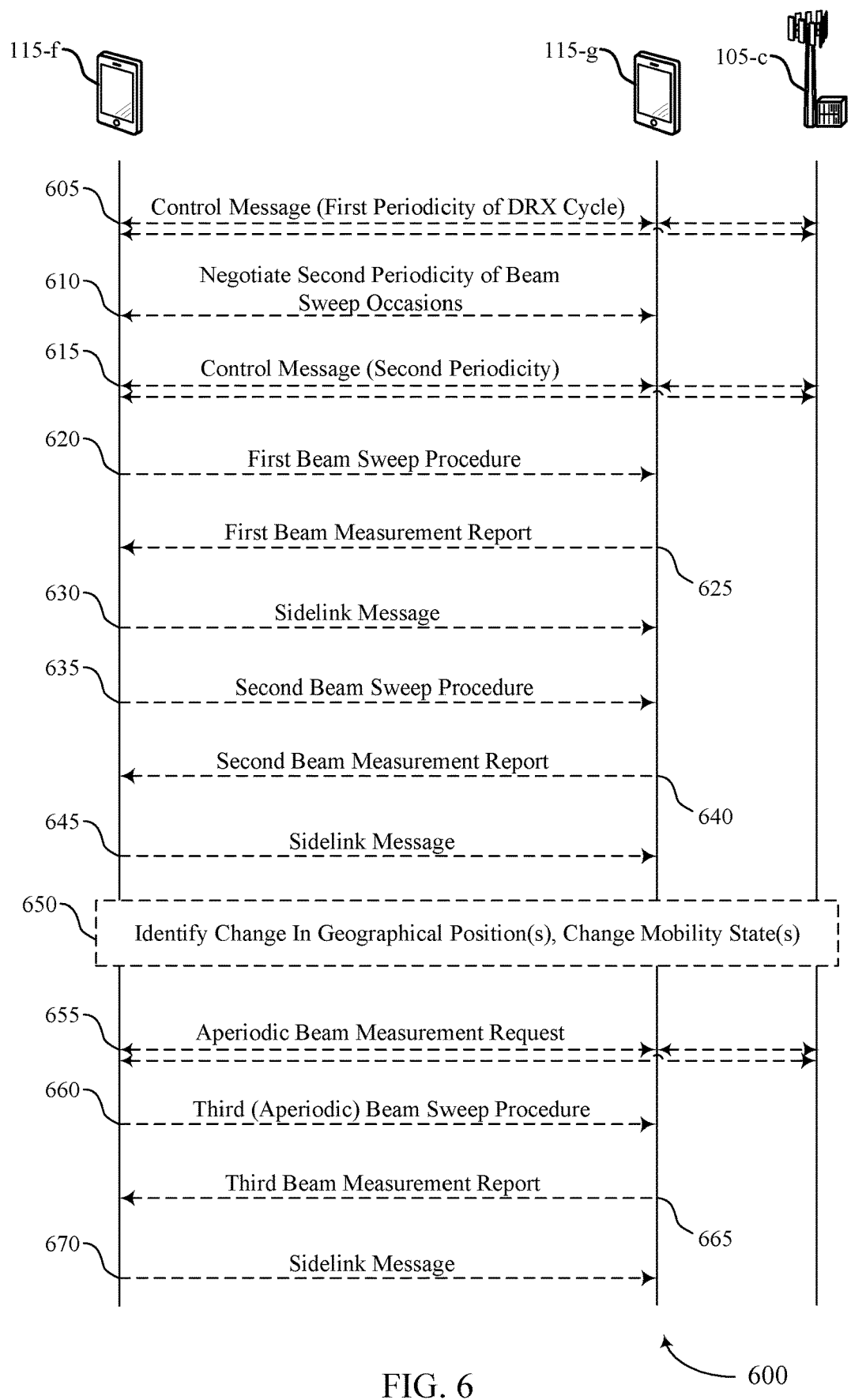
FIG. 6 illustrates an example of a process flow that supports techniques for sidelink reference beams in accordance with aspects of the present disclosure.

FIG. 6 illustrates an example of a process flow 600 that supports techniques for sidelink reference beams in accordance with aspects of the present disclosure. In some examples, process flow 600 may implement, or be implemented by, aspects of wireless communications system 100, wireless communications system 200, resource configuration 300, resource configuration 400, process flow 500, or any combination thereof. For example, the process flow 600 may illustrate a first UE 115-*f* which is configured to transmit and/or receive a control message indicating a second periodicity of sidelink beam sweep occasions for performing sidelink beam sweep procedures based on a DRX cycle at a second UE 115-*g*, and transmit sidelink reference signals during a sidelink beam sweep procedure based on the second periodicity, as described with reference to FIGS. 1-5, among other aspects.

In some aspects, the process flow 600 may include a first UE 115-*f*, a second UE 115-*g*, and a base station 105-*c*, described with reference to FIGS. 1-5. For example, the first UE 115-*f* and the second UE 115-*b* illustrated in FIG. 6 may be examples of the first UE 115-*a* and the second UE 115-*b*, respectively, as illustrated in FIG. 2. Similarly, the base station 105-*c* illustrated in FIG. 6 may be an example of the base station 105-*a*, as illustrated in FIG. 2.

In some examples, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 605, the first UE 115-*f* may receive a control message indicating a first periodicity of a set of active durations of a DRX cycle at a second UE 115-*g*. The first UE 115-*f* may receive the control message indicating the first periodicity from the second UE 115-*g*, via the base station 105-*c*, or both. Additionally, or alternatively, the first UE 115-*f* may be pre-configured with information associated with the DRX cycle at the second UE 115-*g*.

At 610, the first UE 115-*f* and the second UE 115-*g* may negotiate a second periodicity of beam sweep occasions for performing sidelink beam sweep procedures between the first UE 115-*f* and the second UE 115-*g* (e.g., via the PC5 interface). In some cases, the first UE 115-*f* and the second UE 115-*g* may negotiate the second periodicity based on the first periodicity of the DRX cycle at the second UE 115-*g* which was communicated at 605.

For example, the first UE 115-*f* may transmit, to the second UE 115-*g*, control signaling (e.g., L3 signaling, RRC message) indicating a requested periodicity for beam sweep occasions, and may subsequently receive, from the second UE 115-*g*, an indication of the requested periodicity or a different periodicity. Conversely, by way of another example, the first UE 115-*f* may receive, from the second UE 115-*g*, control signaling indicating (e.g., L3 signaling, RRC message) a requested periodicity for beam sweep occasions, and may subsequently transmit, to the second UE 115-*g*, an indication of the requested periodicity or a different periodicity. In this regard, the first UE 115-*f* and the second UE 115-*g* may negotiate the configuration for the sidelink beam sweep procedures (e.g., second periodicity of the beam sweep occasions) via signaling over the PC5 interface.

At 615, the first UE 115-*f* may transmit or receive a control message indicating the second periodicity of the beam sweep occasions for performing sidelink beam sweep procedures using a set of transmit beams (e.g., reference beams) at the first UE 115-*f*. The first UE 115-*f* may transmit/receive the control message indicating the second periodicity based on transmitting/receiving the first periodicity of the DRX cycle at the second UE 115-*g* at 605, negotiating the second periodicity at 610, or both. For example, in some cases, the second periodicity of the sidelink beam sweep occasions may include an integer multiple of active durations of the DRX cycle of the second UE 115-*g*. For instance, the second periodicity may configure beam sweep occasions every other active duration of the DRX cycle, every third active duration, and the like.

The first UE 115-*f* may transmit the control message indicating the second periodicity to the second UE 115-*g* via the PC5 interface, to the base station 105-*c* via a Uu interface, or both. Conversely, the first UE 115-*f* may receive the control message indicating the second periodicity from the second UE 115-*g* via the PC5 interface, from the base station 105-*c* via a Uu interface, or both. For instance, the base station 105-*c* may transmit, to the first UE 115-*f* and/or the second UE 115-*g*, control signaling indicating a configuration for UE-specific beam measurement via sidelink beam sweep procedures (e.g., second periodicity of the beam sweep occasions) between the respective UEs 115-*f*, 115-*g*. The control signaling from the base station which configures the sidelink beam sweep procedures (e.g., second periodicity of the beam sweep occasions) may include L1 signaling (e.g., DCI message), L2 signaling (e.g., MAC-CE), L3 signaling (e.g., RRC message), or any combination thereof.

At 620, the first UE 115-*f* may transmit, to the second UE 115-*g*, a first set of sidelink reference signals using the set of transmit beams of the first UE 115-*f* during a first sidelink beam sweep procedure performed within a first beam sweep occasion. In other words, the first UE 115-*f* may transmit the first subset of sidelink reference signals by sweeping across at least a subset of the set of transmit beams of the first UE 115-*f*. The second UE 115-*g* may be configured to perform measurements on the received reference signals and/or sweep across at least a subset of receive beams at the second UE 115-*g*. In some cases, the first beam sweep occasion may correspond to a first active duration of the set of active durations of the DRX cycle at the second UE 115-*g*. In particular, the first UE 115-*f* may transmit the sidelink reference signals during the first sidelink beam sweep procedure just before the first active duration (e.g., first ON duration) of the second UE 115-*g*.

The first UE 115-*d* may transmit the sidelink reference signals during the first sidelink beam sweep procedure based on the first periodicity of the active durations of the DRX cycle at the second UE 115-*g*, negotiating the second periodicity of beam sweep occasions at 610, transmitting/receiving the indication of the second periodicity at 615, or any combination thereof. As noted previously herein, the sidelink reference signals transmitted during the first sidelink beam sweep procedure may include UE-specific reference signals. Accordingly, the sidelink reference signals transmitted during the first sidelink beam sweep procedure may include unicast transmissions, groupcast transmissions, SSB messages, CSI-RSs, or any combination thereof.

At 625, the first UE 115-*f* may receive, from the second UE 115-*g*, a beam measurement report (e.g., control signaling) indicating one or more transmit beams from the set of transmit beams used during the first sidelink beam sweep procedure. In other words, the second UE 115-*g* may indicate one or more preferred or non-preferred transmit beams which were used during the first sidelink beam sweep procedure at 620. For example, the second UE 115-*g* may indicate one or more transmit beams of the set of transmit beams which were used during the first sidelink beam sweep procedure which exhibit the best performance (e.g., highest RSRP, highest RSRQ). In some aspects, the beam measurement report may indicate measurements (e.g., RSRP, RSRQ, SNR, SINR, CQI) associated with each of the respective transmit beams used during the first sidelink beam sweep procedure.

In some implementations, the beam measurement report may indicate one or more receive beams used by the second UE 115-*g* during the first sidelink beam sweep procedure. In particular, the second beam measurement report may indicate one or more receive beams of the set of receive beams at the second UE 115-*g* which were used during the first sidelink beam sweep procedure which exhibit the best performance (e.g., highest RSRP, highest RSRQ).

At 630, the first UE 115-*f* may transmit, to the second UE 115-*g*, a sidelink message using the one or more transmit beams. In particular, the first UE 115-*f* may transmit sidelink messages within at least the first active duration of the DRX cycle at the second UE 115-*g* using the one or more transmit beams indicated in the beam measurement report at 625.

For example, in cases where the first sidelink beam sweep procedure at 620 is performed during/prior to a first active duration of the DRX cycle at the second UE 115-*g*, the first UE 115-*f* may transmit sidelink messages to the second UE 115-*g* during the first active duration using the one or more beams indicated by the second UE 115-*g* in the beam measurement report at 625. In some cases, the one or more transmit beams indicated in the beam measurement report at 625 may be used for additional active durations at the second UE 115-*g*. For example, in some cases, the second periodicity may configure beam sweep occasions every other active duration (e.g., first active duration, third active duration, fifth active duration). In this example, the first UE 115-*f* may transmit sidelink messages to the second UE 115-*g* using the one or more transmit beams indicated in the beam measurement report at 625 during the second active duration, as the next beam sweep procedure may not be performed until during/just prior to the third active duration.

As noted previously herein, the second periodicity may configure periodic beam sweep occasions (e.g., periodic sidelink beam sweep procedures) between the first UE 115-*f* and the second UE 115-*g*. As such, the first UE 115-*f* and the second UE 115-*g* may perform subsequent sidelink beam sweep procedures in accordance with the second periodicity.

For example, at 635, the first UE 115-*f* and the second UE 115-*g* may perform a second sidelink beam sweep procedure. For instance, in cases where the second periodicity configures sidelink beam sweep procedures every other active duration, the second sidelink beam sweep procedure may be performed to active durations following the active duration associated with the first sidelink beam sweep procedure at 620. In some cases, the set of transmit beams used for the second sidelink beam sweep procedure may be the same as the set of transmit beams used for the first sidelink beam sweep procedure. Additionally, or alternatively, the first UE 115-*g* may modify the set of transmit beams used for the second sidelink beam sweep procedure based on the first beam measurement report received at 625. For instance, the first beam measurement report may indicate a subset of transmit beams which are to be used for the second sidelink beam sweep procedure. Subsequently, the second UE 115-*g* may transmit a second beam measurement report at 640 in response to the second sidelink beam sweep procedure. Moreover, at 645, the first UE 115-*g* may transmit sidelink messages using the transmit beams indicated in the second beam measurement report during at least the active duration in which the second sidelink beam sweep procedure was performed. Accordingly, any discussion associated with the first sidelink beam sweep procedure at steps/operations 620-630 may also be regarded as applying to the second sidelink beam sweep procedure at steps/operations 635-645.

At 650, the first UE 115-*f*, the second UE 115-*g*, the base station 105-*c*, or any combination thereof, may identify changes in geographical positions of the respective UEs 115, changes in mobility states of the respective UEs 115, or any combination thereof. The UEs 115-*f*, 115-*g* may be configured to identify changes in geographical positions and/or changes in mobility states based on internal GPS modules, signaling from the UEs 115-*f*, 115-*g*, signaling from the base station 105-*c*, the beam measurement report transmitted/received at 625 and/or 640, or any combination thereof.

In some aspects, changes in geographical positions of the UEs 115, changes in mobility states of the UEs 115, or both, may be used to trigger aperiodic sidelink beam sweep procedures between the respective UEs 115. In particular, the changes to geographical positions and/or mobility states of the UEs 115 may suggest that new transmit/receive beams at the respective UEs 115 may be required to maintain efficient and reliable sidelink communications, and may thereby be used to trigger aperiodic sidelink beam sweep procedures.

Additionally, or alternatively, significant changes in measurements performed at the second UE 115-*g* may be used to trigger aperiodic sidelink beam sweep procedures. In particular, changes in RSRPs, RSRQs, SNRs, SINRs, CQIs, or other measurements which satisfy a threshold (e.g., are larger than a threshold) may be used to trigger aperiodic sidelink beam sweep procedures within beam sweep occasions which do not coincide with the second periodicity of beam sweep occasions. For example, the second UE 115-*g* may determine a first RSRP ($RSRP_1$) associated with the sidelink message received during the first active duration at 630, and may determine a second RSRP ($RSRP_2$) associated with the second sidelink message received during the second active duration at 645. In this example, the second UE 115-*g* may determine that a change in RSRPs between the first and second sidelink messages satisfies a threshold RSRP (e.g., ($RSRP_1 - RSRP_2) \geq RSRP_{Thresh}$). In this example, the change in RSRPs satisfying the threshold may indicate that the transmit/receive beams used for the respective sidelink messages exhibit degrading performance, which may indicate that a new sidelink beam sweep procedure (e.g., aperiodic sidelink beam sweep procedure) may be beneficial.

At 655, the first UE 115-*f*, the second UE 115-*g*, the base station, or any combination thereof, may transmit and/or receive an aperiodic beam measurement request (e.g., request for an aperiodic sidelink beam sweep procedure). In some aspects, the UEs 115-*f*, 115-*g* and/or the base station 105-*c* may transmit/receive the aperiodic beam measurement request based on identifying the change in a geographical position of the first UE 115-*f* and/or second UE 115-*g* at 650, identifying the change in a mobility state of the first UE 115-*f* and/or second UE 115-*g* at 650, or both. Additionally, or alternatively, the second UE 115-*g* may transmit the aperiodic beam measurement request based on identifying a change in measurements associated with sidelink communications received from the first UE 115-*f* (e.g., based on identifying that a change in RSRP satisfies a threshold).

In some aspects, the aperiodic beam measurement request may be transmitted/received via a beam measurement report. For example, in some cases, the second beam measurement report at 640 may include an aperiodic beam measurement request. In this regard, the beam measurement report may trigger an aperiodic sidelink beam sweep procedure, and may additionally or alternatively indicate a subset of transmit beams which are to be used for the aperiodic sidelink beam sweep procedure.

The aperiodic sidelink beam measurement request may be transmitted/received between the UEs 115-*f*, 115-*g* via a PC5 interface between the respective UEs 115-*f*, 115-*g*. Moreover, in some cases, the base station 105-*c* or another wireless device (e.g., relay UE 115, third UE 115-*c* illustrated in FIG. 1) may relay the aperiodic beam measurement request between the respective UEs 115. For example, the second UE 115-*g* may transmit the aperiodic beam measurement request to the base station 105-*c*, and the base station 105-*c* may forward, or relay, the aperiodic beam measurement request to the first UE 115-*f*. Additionally, or alternatively, the base station 105-*c* may transmit the aperiodic beam measurement request to the first UE 115-*f* and/or the second UE 115-*g* via Uu interfaces with the respective UEs 115-*f*, 115-*g*.

Subsequently, the first UE 115-*f* and the second UE 115-*g* may perform an aperiodic sidelink beam seep procedure based on (e.g., in response to) the aperiodic beam measurement request.

For example, continuing with reference to process flow 600, at 665, the first UE 115-*f* and the second UE 115-*g* may perform a third sidelink beam sweep procedure (e.g., aperiodic sidelink beam sweep procedure) in response to the aperiodic beam measurement request. In some cases, the aperiodic sidelink beam sweep procedure may be performed within/just prior to an active duration of the DRX cycle at the second UE 115-*g* which immediately follows an active duration during which the aperiodic beam measurement request was transmitted. For instance, if the aperiodic beam measurement request was transmitted/received during a fourth active duration of the DRX cycle at the second UE 115-*g*, the aperiodic beam sweep procedure may be performed before, or just prior to, a fifth active duration of the DRX cycle. In cases where the aperiodic beam measurement request is included within a beam measurement report which indicates a subset of transmit beams, the first UE 115-*f* may transmit the sidelink reference signals during the aperiodic beam sweep procedure using the indicated subset of transmit beams. Subsequently, the second UE 115-*g* may transmit a third beam measurement report at 665 in response to the third (aperiodic) sidelink beam sweep procedure. Moreover, at 670, the first UE 115-*g* may transmit sidelink messages using the transmit beams indicated in the second beam measurement report during at least the active duration in which the aperiodic sidelink beam sweep procedure was performed. Accordingly, any discussion associated with the first sidelink beam sweep procedure at steps/operations 620-630 and/or the second sidelink beam sweep procedure at 635-645 may also be regarded as applying to the aperiodic sidelink beam sweep procedure at steps/operations 660-670.

Techniques described herein may provide for improved sidelink beam sweep procedures between UEs 115 for selecting beams which are to be used for sidelink communications. In particular, techniques described herein may enable sidelink beam sweep procedure to be performed in accordance with DRX cycles at the second UE 115-*g*, 115, which may improve an efficiency of DRX cycles at the UEs 115-*f*, 115-*g*, improve power savings at the UEs 115-*f*, 115-*g*, and result in more efficient beam selection for sidelink communications.

Figure 7:
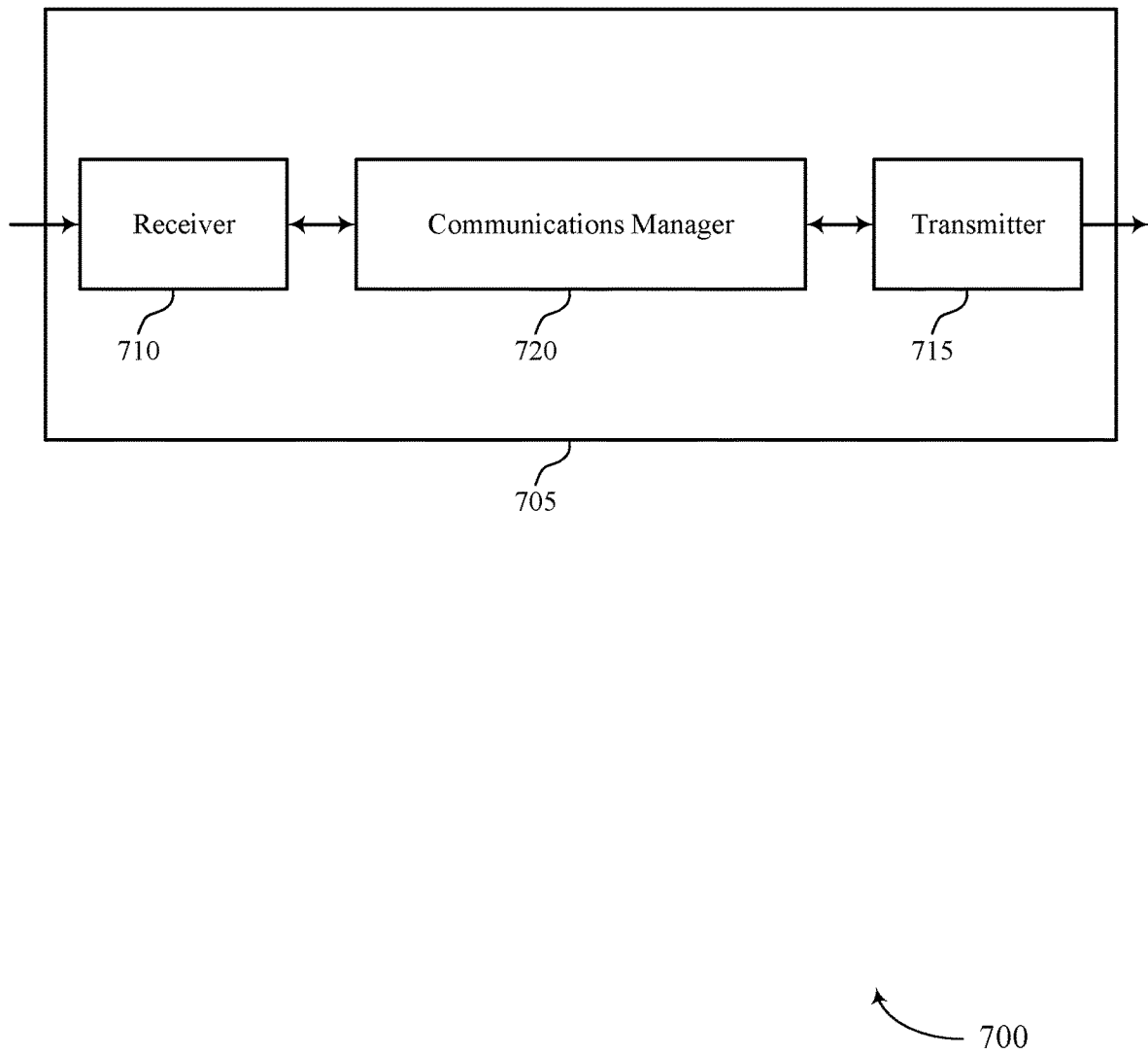
FIGS. 7 and 8 show block diagrams of devices that support techniques for sidelink reference beams in accordance with aspects of the present disclosure.

FIG. 7 shows a block diagram 700 of a device 705 that supports techniques for sidelink reference beams in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for sidelink reference beams). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for sidelink reference beams). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for sidelink reference beams as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for transmitting or receiving a first control message indicating a sidelink beam measurement configuration for performing a sidelink beam sweep procedure using a set of multiple transmit beams. The communications manager 720 may be configured as or otherwise support a means for selecting a subset of transmit beams from the set of multiple transmit beams for the sidelink beam sweep procedure based on one or more parameters associated with the sidelink beam measurement configuration. The communications manager 720 may be configured as or otherwise support a means for transmitting, to a second UE during the sidelink beam sweep procedure, a set of multiple sidelink reference signals using respective transmit beams of the subset of transmit beams.

Additionally or alternatively, the communications manager 720 may support wireless communication at a second UE in accordance with examples as disclosed herein. For example, the communications manager 720 may be configured as or otherwise support a means for transmitting or receiving a first control message indicating a sidelink beam measurement configuration for performing a sidelink beam sweep procedure using a set of multiple transmit beams. The communications manager 720 may be configured as or otherwise support a means for identifying a subset of transmit beams from the set of multiple transmit beams for the sidelink beam sweep procedure based on one or more parameters associated with the sidelink beam measurement configuration. The communications manager 720 may be configured as or otherwise support a means for receiving, from a first UE during the sidelink beam sweep procedure, a set of multiple sidelink reference signals associated with respective transmit beams of the subset of transmit beams.

Additionally or alternatively, the communications manager 720 may support wireless communication at a first UE in accordance with examples as disclosed herein. For example, the communications manager 720 may be configured as or otherwise support a means for transmitting or receiving, based on a first periodicity of a set of multiple active durations of a DRX cycle of a second UE, a first control message indicating a second periodicity of sidelink beam sweep occasions for performing sidelink beam sweep procedures using a set of multiple transmit beams. The communications manager 720 may be configured as or otherwise support a means for transmitting, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity.

Additionally or alternatively, the communications manager 720 may support wireless communication at a second UE in accordance with examples as disclosed herein. For example, the communications manager 720 may be configured as or otherwise support a means for transmitting or receiving, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE. The communications manager 720 may be configured as or otherwise support a means for receiving, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for improved sidelink beam sweep procedures between UEs 115 for selecting beams which are to be used for sidelink communications. In particular, techniques described herein may enable UEs 115 to perform sidelink beam sweep procedures using a subset of configured transmit beams, which may expedite sidelink beam sweep procedures, reduce power consumption at the UEs 115, and improve resource utilization within the wireless communications system 100. Additionally, techniques described herein may enable sidelink beam sweep procedure to be performed in accordance with DRX cycles at the respective UEs 115, which may improve an efficiency of DRX cycles at the UEs 115, improve power savings at the UEs 115, and result in more efficient beam selection for sidelink communications.

Figure 8:
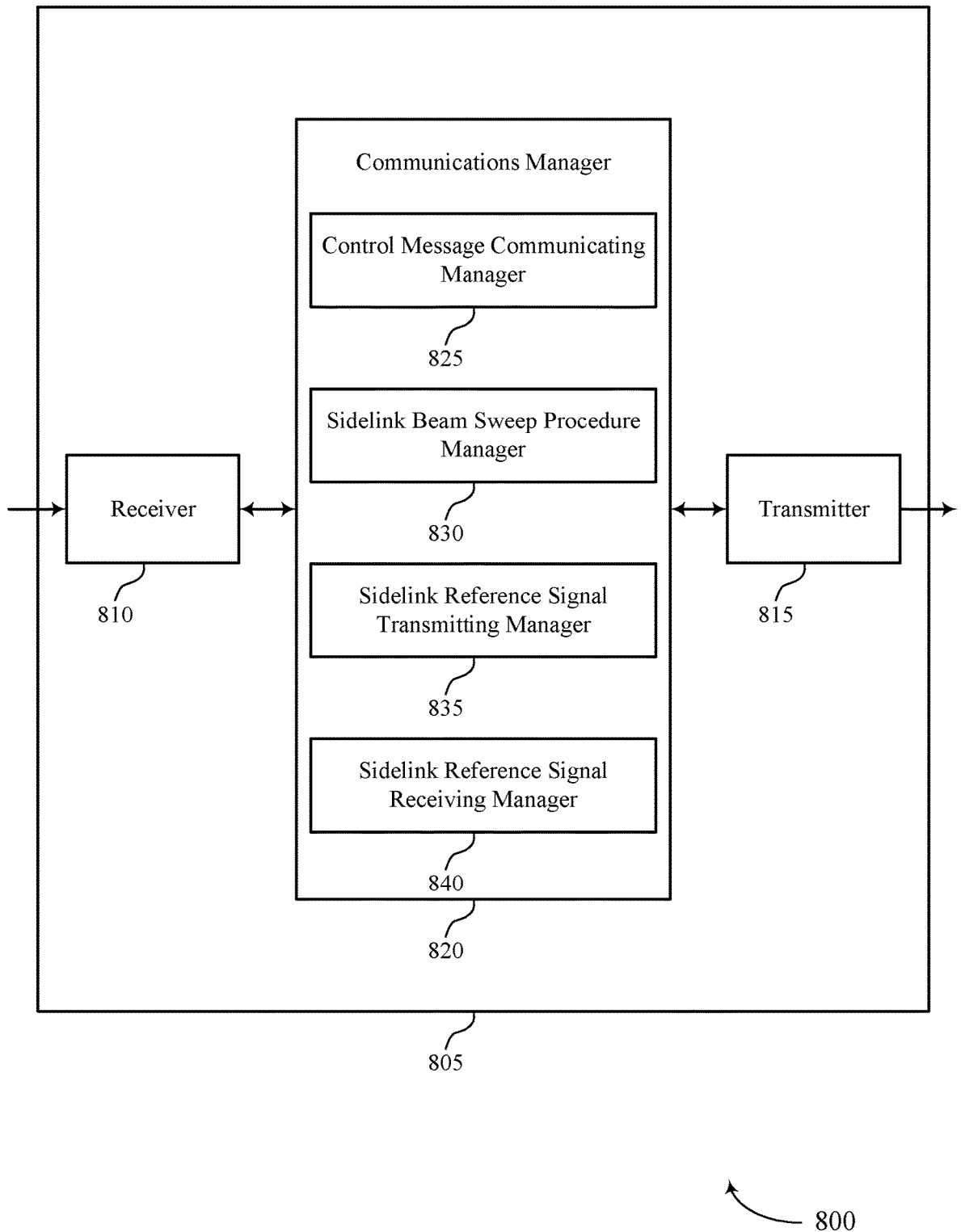

FIG. 8 shows a block diagram 800 of a device 805 that supports techniques for sidelink reference beams in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for sidelink reference beams). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for sidelink reference beams). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for sidelink reference beams as described herein. For example, the communications manager 820 may include a control message communicating manager 825, a sidelink beam sweep procedure manager 830, a sidelink reference signal transmitting manager 835, a sidelink reference signal receiving manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The control message communicating manager 825 may be configured as or otherwise support a means for transmitting or receiving a first control message indicating a sidelink beam measurement configuration for performing a sidelink beam sweep procedure using a set of multiple transmit beams. The sidelink beam sweep procedure manager 830 may be configured as or otherwise support a means for selecting a subset of transmit beams from the set of multiple transmit beams for the sidelink beam sweep procedure based on one or more parameters associated with the sidelink beam measurement configuration. The sidelink reference signal transmitting manager 835 may be configured as or otherwise support a means for transmitting, to a second UE during the sidelink beam sweep procedure, a set of multiple sidelink reference signals using respective transmit beams of the subset of transmit beams.

Additionally or alternatively, the communications manager 820 may support wireless communication at a second UE in accordance with examples as disclosed herein. The control message communicating manager 825 may be configured as or otherwise support a means for transmitting or receiving a first control message indicating a sidelink beam measurement configuration for performing a sidelink beam sweep procedure using a set of multiple transmit beams. The sidelink beam sweep procedure manager 830 may be configured as or otherwise support a means for identifying a subset of transmit beams from the set of multiple transmit beams for the sidelink beam sweep procedure based on one or more parameters associated with the sidelink beam measurement configuration. The sidelink reference signal receiving manager 840 may be configured as or otherwise support a means for receiving, from a first UE during the sidelink beam sweep procedure, a set of multiple sidelink reference signals associated with respective transmit beams of the subset of transmit beams.

Additionally or alternatively, the communications manager 820 may support wireless communication at a first UE in accordance with examples as disclosed herein. The control message communicating manager 825 may be configured as or otherwise support a means for transmitting or receiving, based on a first periodicity of a set of multiple active durations of a DRX cycle of a second UE, a first control message indicating a second periodicity of sidelink beam sweep occasions for performing sidelink beam sweep procedures using a set of multiple transmit beams. The sidelink reference signal transmitting manager 835 may be configured as or otherwise support a means for transmitting, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity.

Additionally or alternatively, the communications manager 820 may support wireless communication at a second UE in accordance with examples as disclosed herein. The control message communicating manager 825 may be configured as or otherwise support a means for transmitting or receiving, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE. The sidelink reference signal receiving manager 840 may be configured as or otherwise support a means for receiving, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity.

Figure 9:
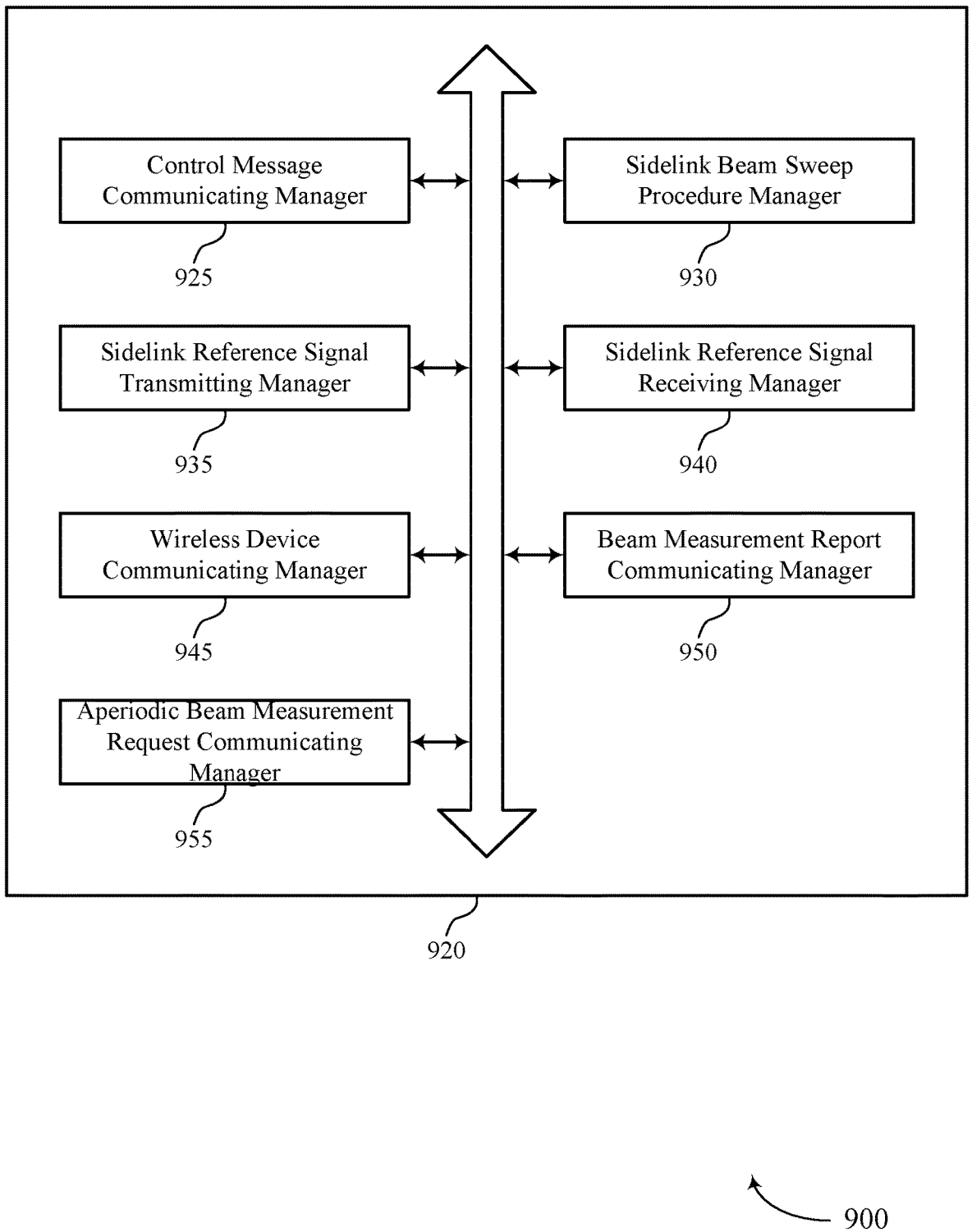
FIG. 9 shows a block diagram of a communications manager that supports techniques for sidelink reference beams in accordance with aspects of the present disclosure.

FIG. 9 shows a block diagram 900 of a communications manager 920 that supports techniques for sidelink reference beams in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for sidelink reference beams as described herein. For example, the communications manager 920 may include a control message communicating manager 925, a sidelink beam sweep procedure manager 930, a sidelink reference signal transmitting manager 935, a sidelink reference signal receiving manager 940, a wireless device communicating manager 945, a beam measurement report communicating manager 950, an aperiodic beam measurement request communicating manager 955, or any combination thereof. Each of these components may communicate, directly or indirectly, with one another (e.g., via one or more buses).

The communications manager 920 may support wireless communication at a first UE in accordance with examples as disclosed herein. The control message communicating manager 925 may be configured as or otherwise support a means for transmitting or receiving a first control message indicating a sidelink beam measurement configuration for performing a sidelink beam sweep procedure using a set of multiple transmit beams. The sidelink beam sweep procedure manager 930 may be configured as or otherwise support a means for selecting a subset of transmit beams from the set of multiple transmit beams for the sidelink beam sweep procedure based on one or more parameters associated with the sidelink beam measurement configuration. The sidelink reference signal transmitting manager 935 may be configured as or otherwise support a means for transmitting, to a second UE during the sidelink beam sweep procedure, a set of multiple sidelink reference signals using respective transmit beams of the subset of transmit beams.

In some examples, to support selecting the subset of transmit beams, the control message communicating manager 925 may be configured as or otherwise support a means for transmitting or receiving a second control message indicating the subset of transmit beams which are to be used during the sidelink beam sweep procedure, where transmitting the set of multiple sidelink reference signals is based on the second control message.

In some examples, to support transmitting the set of multiple sidelink reference signals using the respective transmit beams of the subset of transmit beams, the sidelink reference signal transmitting manager 935 may be configured as or otherwise support a means for transmitting the set of multiple sidelink reference signals using the respective transmit beams of the subset of transmit beams during a subset of TTIs of the set of multiple TTIs which correspond to the subset of transmit beams.

In some examples, to support transmitting the set of multiple sidelink reference signals, the sidelink reference signal transmitting manager 935 may be configured as or otherwise support a means for transmitting a first sidelink reference signal of the set of multiple sidelink reference signals using a first transmit beam of the subset of transmit beams in a first TTI that differs from a second transmission time internal configured by the sidelink beam measurement configuration for reference signal transmission using the first transmit beam.

In some examples, to support transmitting the set of multiple sidelink reference signals, the sidelink reference signal transmitting manager 935 may be configured as or otherwise support a means for transmitting a second sidelink reference signal of the set of multiple sidelink reference signals using a second transmit beam of the subset of transmit beams in a second TTI that occurs immediately after the first TTI.

In some examples, to support transmitting the set of multiple sidelink reference signals, the sidelink reference signal transmitting manager 935 may be configured as or otherwise support a means for transmitting a first sidelink reference signal of the set of multiple sidelink reference signals using a first transmit beam of the subset of transmit beams in a first TTI of the set of multiple TTIs configured by the sidelink beam measurement configuration for reference signal transmission using the first transmit beam.

In some examples, to support transmitting the set of multiple sidelink reference signals, the sidelink reference signal transmitting manager 935 may be configured as or otherwise support a means for transmitting a second sidelink reference signal of the set of multiple sidelink reference signals using a second transmit beam of the subset of transmit beams in a second TTI of the set of multiple TTIs configured by the sidelink beam measurement configuration for reference signal transmission using the first transmit beam.

In some examples, the sidelink beam measurement configuration indicates a set of multiple TTIs during which a respective transmit beam of the set of multiple transmit beams is to be used to transmit a respective sidelink reference signal during the sidelink beam sweep procedure, and the sidelink beam sweep procedure manager 930 may be configured as or otherwise support a means for transmitting or receiving one or more messages during at least one TTI of the remaining subset of TTIs, refraining from transmitting sidelink reference signals during at least one TTI of the remaining subset of TTIs, or both.

In some examples, to support selecting the subset of transmit beams, the sidelink beam sweep procedure manager 930 may be configured as or otherwise support a means for selecting the subset of transmit beams from the set of multiple transmit beams based on a beam measurement report associated with communications between the first UE and the second UE.

In some examples, the one or more parameters include a beam measurement report associated with communications between the first UE and the second UE, a geographical position of the first UE, the second UE, or both, a mobility state of the first UE, the second UE, or both, a beam correlation between two or more transmit beams of the set of multiple transmit beams, or any combination thereof.

In some examples, to support selecting the subset of transmit beams, the sidelink beam sweep procedure manager 930 may be configured as or otherwise support a means for selecting the subset of transmit beams from the set of multiple transmit beams based on a first geographical position of the first UE, a second geographical position of the second UE, a first mobility state of the first UE, a second mobility state of the second UE, or any combination thereof.

In some examples, to support selecting the subset of transmit beams, the sidelink beam sweep procedure manager 930 may be configured as or otherwise support a means for selecting the subset of transmit beams from the set of multiple transmit beams based on a beam correlation between a first transmit beam of the subset of transmit beams and a second transmit beam of the subset of transmit beams, where transmitting the set of multiple sidelink reference signals using the respective transmit beams of the subset of transmit beams includes transmitting a first sidelink reference signal using the first transmit beam concurrently with transmitting a second sidelink reference signal using the second transmit beam.

In some examples, the control message communicating manager 925 may be configured as or otherwise support a means for receiving, from the second UE based on transmitting the first set of multiple sidelink reference signals, control signaling including an indication of one or more transmit beams of the subset of transmit beams. In some examples, the wireless device communicating manager 945 may be configured as or otherwise support a means for transmitting, to the second UE, a sidelink message to the second UE using the one or more transmit beams based on the control signaling.

In some examples, to support transmitting or receiving the first control message indicating the sidelink beam measurement configuration, the wireless device communicating manager 945 may be configured as or otherwise support a means for communicating the first control message indicating the sidelink beam measurement configuration with the second UE, a base station, or both.

Additionally or alternatively, the communications manager 920 may support wireless communication at a second UE in accordance with examples as disclosed herein. In some examples, the control message communicating manager 925 may be configured as or otherwise support a means for transmitting or receiving a first control message indicating a sidelink beam measurement configuration for performing a sidelink beam sweep procedure using a set of multiple transmit beams. In some examples, the sidelink beam sweep procedure manager 930 may be configured as or otherwise support a means for identifying a subset of transmit beams from the set of multiple transmit beams for the sidelink beam sweep procedure based on one or more parameters associated with the sidelink beam measurement configuration. The sidelink reference signal receiving manager 940 may be configured as or otherwise support a means for receiving, from a first UE during the sidelink beam sweep procedure, a set of multiple sidelink reference signals associated with respective transmit beams of the subset of transmit beams.

In some examples, to support identifying the subset of transmit beams, the control message communicating manager 925 may be configured as or otherwise support a means for transmitting or receiving a second control message indicating the subset of transmit beams which are to be used during the sidelink beam sweep procedure, where receiving the set of multiple sidelink reference signals is based on the second control message.

In some examples, to support receiving the set of multiple sidelink reference signals associated with the respective transmit beams of the subset of transmit beams, the sidelink reference signal receiving manager 940 may be configured as or otherwise support a means for receiving the set of multiple sidelink reference signals associated with the respective transmit beams of the subset of transmit beams during a subset of TTIs of the set of multiple TTIs which correspond to the subset of transmit beams.

Additionally or alternatively, the communications manager 920 may support wireless communication at a first UE in accordance with examples as disclosed herein. In some examples, the control message communicating manager 925 may be configured as or otherwise support a means for transmitting or receiving, based on a first periodicity of a set of multiple active durations of a DRX cycle of a second UE, a first control message indicating a second periodicity of sidelink beam sweep occasions for performing sidelink beam sweep procedures using a set of multiple transmit beams. In some examples, the sidelink reference signal transmitting manager 935 may be configured as or otherwise support a means for transmitting, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity.

In some examples, the beam measurement report communicating manager 950 may be configured as or otherwise support a means for receiving, from the second UE based on transmitting the set of multiple sidelink reference signals, a beam measurement report indicating one or more transmit beams of the set of multiple transmit beams. In some examples, the wireless device communicating manager 945 may be configured as or otherwise support a means for transmitting, to the second UE using the one or more transmit beams, a sidelink message during at least the first active duration of the set of multiple active durations.

In some examples, the control message communicating manager 925 may be configured as or otherwise support a means for receiving a second control message indicating the first periodicity of the set of multiple active durations of the DRX cycle of the second UE.

In some examples, the aperiodic beam measurement request communicating manager 955 may be configured as or otherwise support a means for transmitting or receiving an aperiodic beam measurement request. In some examples, the sidelink reference signal transmitting manager 935 may be configured as or otherwise support a means for transmitting, to the second UE using the set of multiple transmit beams and based on the aperiodic beam measurement request, a second set of multiple sidelink reference signals during a second sidelink beam sweep procedure performed within a second beam sweep occasion that does not coincide with the second periodicity of beam sweep occasions.

In some examples, to support transmitting or receiving the aperiodic beam measurement request, the beam measurement report communicating manager 950 may be configured as or otherwise support a means for transmitting or receiving a beam measurement reporting including the aperiodic beam measurement request and indicating a subset of transmit beams of the set of multiple transmit beams, where transmitting the second set of multiple sidelink reference signals includes. In some examples, to support transmitting or receiving the aperiodic beam measurement request, the sidelink reference signal transmitting manager 935 may be configured as or otherwise support a means for transmitting, to the second UE using the subset of transmit beams, the second set of multiple sidelink reference signals during the second sidelink beam sweep procedure.

In some examples, to support transmitting or receiving the aperiodic beam measurement request, the aperiodic beam measurement request communicating manager 955 may be configured as or otherwise support a means for transmitting or receiving the aperiodic beam measurement request based on a first change in a first mobility state of the first UE, a second change in a second mobility state of the second UE, a third change in a first geographical position of the first UE, a fourth change in a second geographical position of the second UE, or any combination thereof.

In some examples, the control message communicating manager 925 may be configured as or otherwise support a means for transmitting or receiving control signaling indicating a requested periodicity for the second periodicity of beam sweep occasions, where the periodicity indicated in the first control message includes the requested periodicity or a different periodicity.

In some examples, the second periodicity of the sidelink beam sweep occasions includes an integer multiple of active durations of the DRX cycle of the second UE.

In some examples, to support transmitting or receiving the first control message indicating the second periodicity, the control message communicating manager 925 may be configured as or otherwise support a means for communicating the first control message indicating of the second periodicity with the second UE, a base station, or both.

In some examples, the first set of multiple sidelink reference signals include unicast transmissions, groupcast transmissions, or both. In some examples, the first set of multiple sidelink reference signals include synchronization signal block messages, channel state information reference signals, or both.

Additionally or alternatively, the communications manager 920 may support wireless communication at a second UE in accordance with examples as disclosed herein. In some examples, the control message communicating manager 925 may be configured as or otherwise support a means for transmitting or receiving, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE. In some examples, the sidelink reference signal receiving manager 940 may be configured as or otherwise support a means for receiving, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity.

In some examples, the beam measurement report communicating manager 950 may be configured as or otherwise support a means for transmitting, to the first UE based on receiving the set of multiple sidelink reference signals, a beam measurement report indicating one or more transmit beams of the set of multiple transmit beams. In some examples, the wireless device communicating manager 945 may be configured as or otherwise support a means for receiving, from the first UE using the one or more transmit beams, a sidelink message during at least the first active duration of the set of multiple active durations.

In some examples, the aperiodic beam measurement request communicating manager 955 may be configured as or otherwise support a means for transmitting, to the first UE, an aperiodic beam measurement request based on a change in between a first reference signal received power of the set of multiple sidelink reference signals received during the first beam sweep occasion and a second reference signal received power of a second set of multiple sidelink reference signals received during a second beam sweep occasion satisfying a threshold. In some examples, the sidelink reference signal receiving manager 940 may be configured as or otherwise support a means for receiving, from the first UE and based on the aperiodic beam measurement request, a third set of multiple sidelink reference signals during a third sidelink beam sweep procedure performed within a third beam sweep occasion that does not coincide with the second periodicity of beam sweep occasions.

Figure 10:
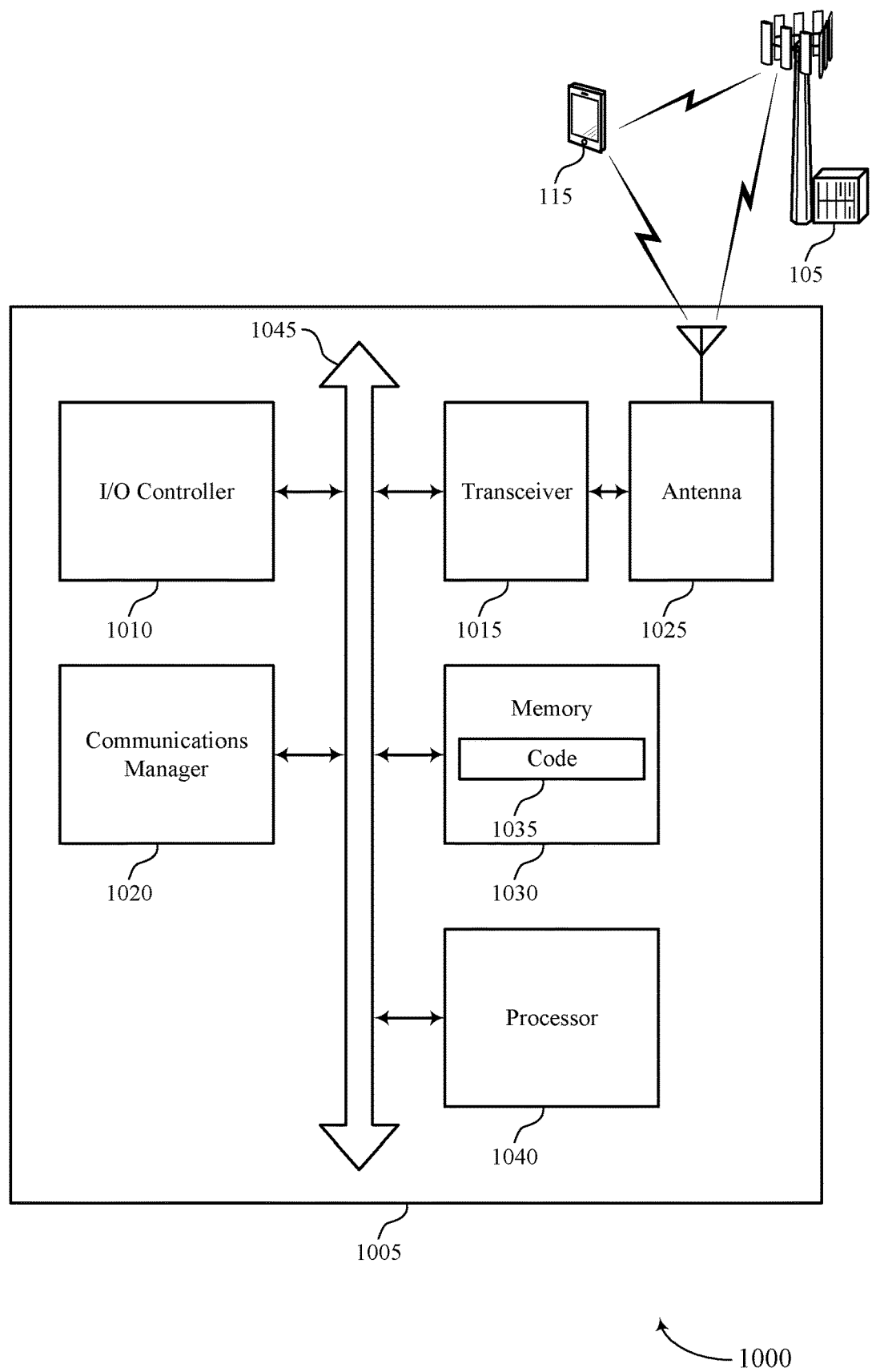
FIG. 10 shows a diagram of a system including a device that supports techniques for sidelink reference beams in accordance with aspects of the present disclosure.

FIG. 10 shows a diagram of a system 1000 including a device 1005 that supports techniques for sidelink reference beams in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for sidelink reference beams). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for transmitting or receiving a first control message indicating a sidelink beam measurement configuration for performing a sidelink beam sweep procedure using a set of multiple transmit beams. The communications manager 1020 may be configured as or otherwise support a means for selecting a subset of transmit beams from the set of multiple transmit beams for the sidelink beam sweep procedure based on one or more parameters associated with the sidelink beam measurement configuration. The communications manager 1020 may be configured as or otherwise support a means for transmitting, to a second UE during the sidelink beam sweep procedure, a set of multiple sidelink reference signals using respective transmit beams of the subset of transmit beams.

Additionally or alternatively, the communications manager 1020 may support wireless communication at a second UE in accordance with examples as disclosed herein. For example, the communications manager 1020 may be configured as or otherwise support a means for transmitting or receiving a first control message indicating a sidelink beam measurement configuration for performing a sidelink beam sweep procedure using a set of multiple transmit beams. The communications manager 1020 may be configured as or otherwise support a means for identifying a subset of transmit beams from the set of multiple transmit beams for the sidelink beam sweep procedure based on one or more parameters associated with the sidelink beam measurement configuration. The communications manager 1020 may be configured as or otherwise support a means for receiving, from a first UE during the sidelink beam sweep procedure, a set of multiple sidelink reference signals associated with respective transmit beams of the subset of transmit beams.

Additionally or alternatively, the communications manager 1020 may support wireless communication at a first UE in accordance with examples as disclosed herein. For example, the communications manager 1020 may be configured as or otherwise support a means for transmitting or receiving, based on a first periodicity of a set of multiple active durations of a DRX cycle of a second UE, a first control message indicating a second periodicity of sidelink beam sweep occasions for performing sidelink beam sweep procedures using a set of multiple transmit beams. The communications manager 1020 may be configured as or otherwise support a means for transmitting, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity.

Additionally or alternatively, the communications manager 1020 may support wireless communication at a second UE in accordance with examples as disclosed herein. For example, the communications manager 1020 may be configured as or otherwise support a means for transmitting or receiving, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE. The communications manager 1020 may be configured as or otherwise support a means for receiving, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity.

By including or configuring the communications manager 1020 in accordance with examples as described herein, the device 1005 may support techniques for improved sidelink beam sweep procedures between UEs 115 for selecting beams which are to be used for sidelink communications. In particular, techniques described herein may enable UEs 115 to perform sidelink beam sweep procedures using a subset of configured transmit beams, which may expedite sidelink beam sweep procedures, reduce power consumption at the UEs 115, and improve resource utilization within the wireless communications system 100. Additionally, techniques described herein may enable sidelink beam sweep procedure to be performed in accordance with DRX cycles at the respective UEs 115, which may improve an efficiency of DRX cycles at the UEs 115, improve power savings at the UEs 115, and result in more efficient beam selection for sidelink communications.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for sidelink reference beams as described herein, or the processor 1040 and the memory 1030 may be otherwise configured to perform or support such operations.

Figure 11:
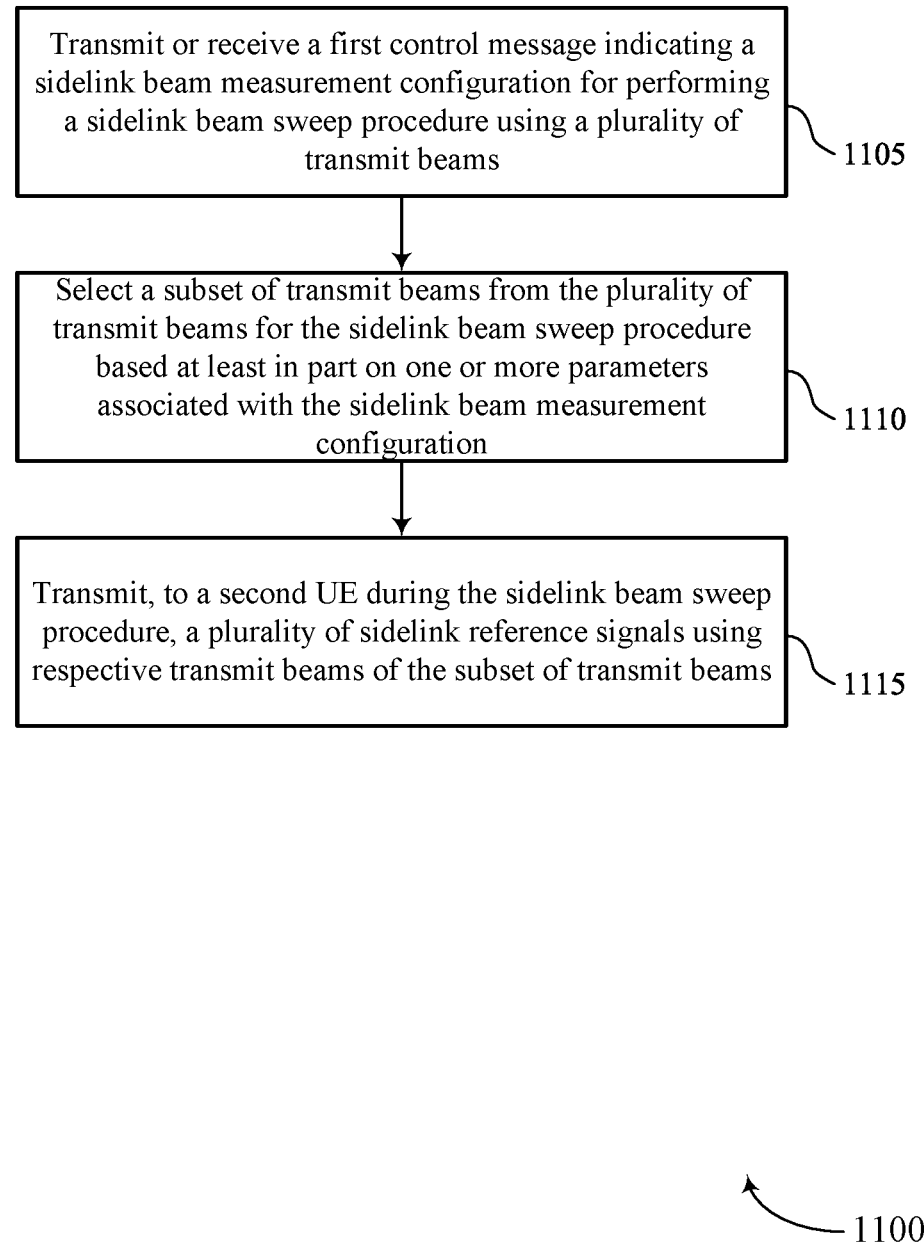
FIGS. 11 through 14 show flowcharts illustrating methods that support techniques for sidelink reference beams in accordance with aspects of the present disclosure.

FIG. 11 shows a flowchart illustrating a method 1100 that supports techniques for sidelink reference beams in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include transmitting or receiving a first control message indicating a sidelink beam measurement configuration for performing a sidelink beam sweep procedure using a set of multiple transmit beams. The operations of 1105 may be performed in accordance with examples as disclosed herein. In some examples, aspects of the operations of 1105 may be performed by a control message communicating manager 925 as described with reference to FIG. 9.

At 1110, the method may include selecting a subset of transmit beams from the set of multiple transmit beams for the sidelink beam sweep procedure based on one or more parameters associated with the sidelink beam measurement configuration. The operations of 1110 may be performed in accordance with examples as disclosed herein. In some examples, aspects of the operations of 1110 may be performed by a sidelink beam sweep procedure manager 930 as described with reference to FIG. 9.

At 1115, the method may include transmitting, to a second UE during the sidelink beam sweep procedure, a set of multiple sidelink reference signals using respective transmit beams of the subset of transmit beams. The operations of 1115 may be performed in accordance with examples as disclosed herein. In some examples, aspects of the operations of 1115 may be performed by a sidelink reference signal transmitting manager 935 as described with reference to FIG. 9.

Figure 12:
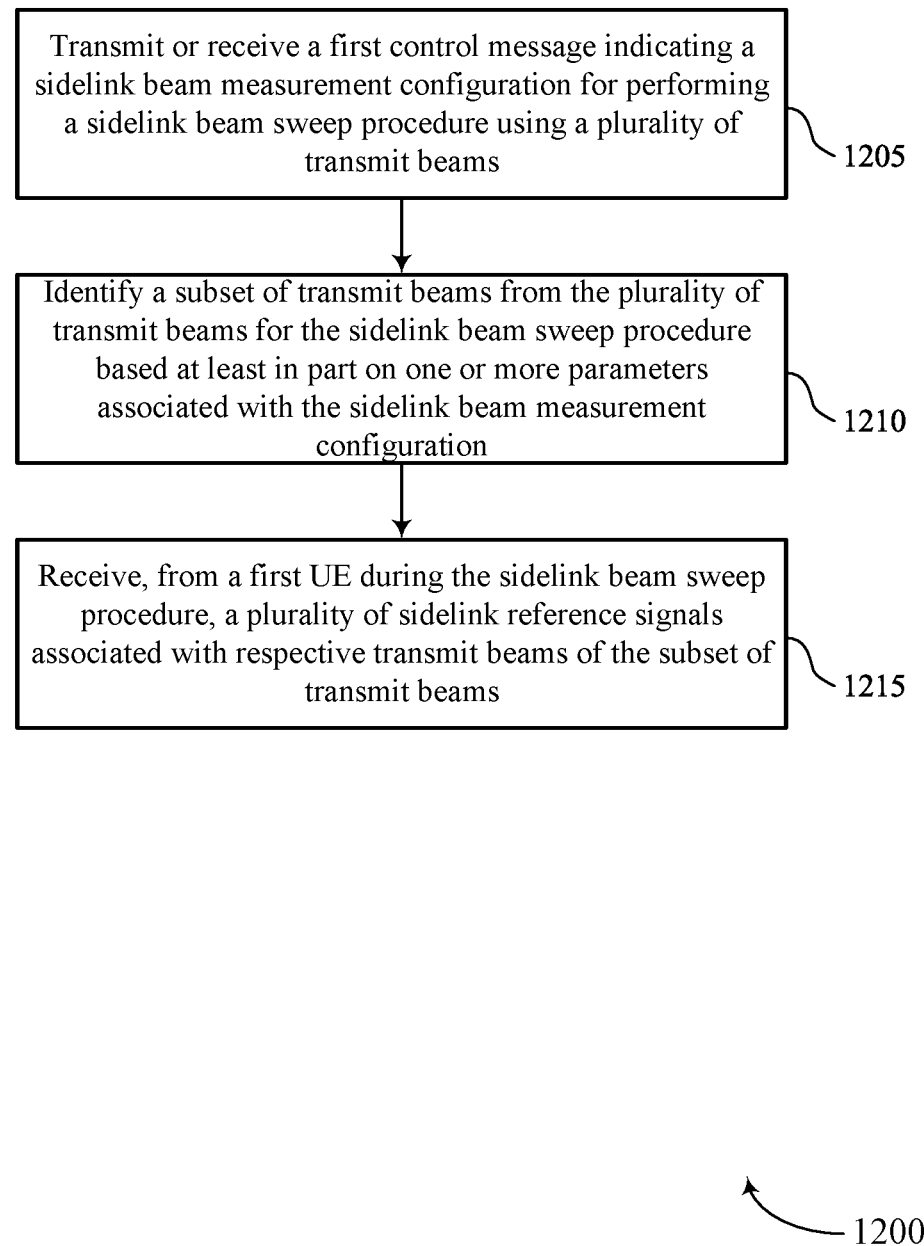

FIG. 12 shows a flowchart illustrating a method 1200 that supports techniques for sidelink reference beams in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include transmitting or receiving a first control message indicating a sidelink beam measurement configuration for performing a sidelink beam sweep procedure using a set of multiple transmit beams. The operations of 1205 may be performed in accordance with examples as disclosed herein. In some examples, aspects of the operations of 1205 may be performed by a control message communicating manager 925 as described with reference to FIG. 9.

At 1210, the method may include identifying a subset of transmit beams from the set of multiple transmit beams for the sidelink beam sweep procedure based on one or more parameters associated with the sidelink beam measurement configuration. The operations of 1210 may be performed in accordance with examples as disclosed herein. In some examples, aspects of the operations of 1210 may be performed by a sidelink beam sweep procedure manager 930 as described with reference to FIG. 9.

At 1215, the method may include receiving, from a first UE during the sidelink beam sweep procedure, a set of multiple sidelink reference signals associated with respective transmit beams of the subset of transmit beams. The operations of 1215 may be performed in accordance with examples as disclosed herein. In some examples, aspects of the operations of 1215 may be performed by a sidelink reference signal receiving manager 940 as described with reference to FIG. 9.

Figure 13:
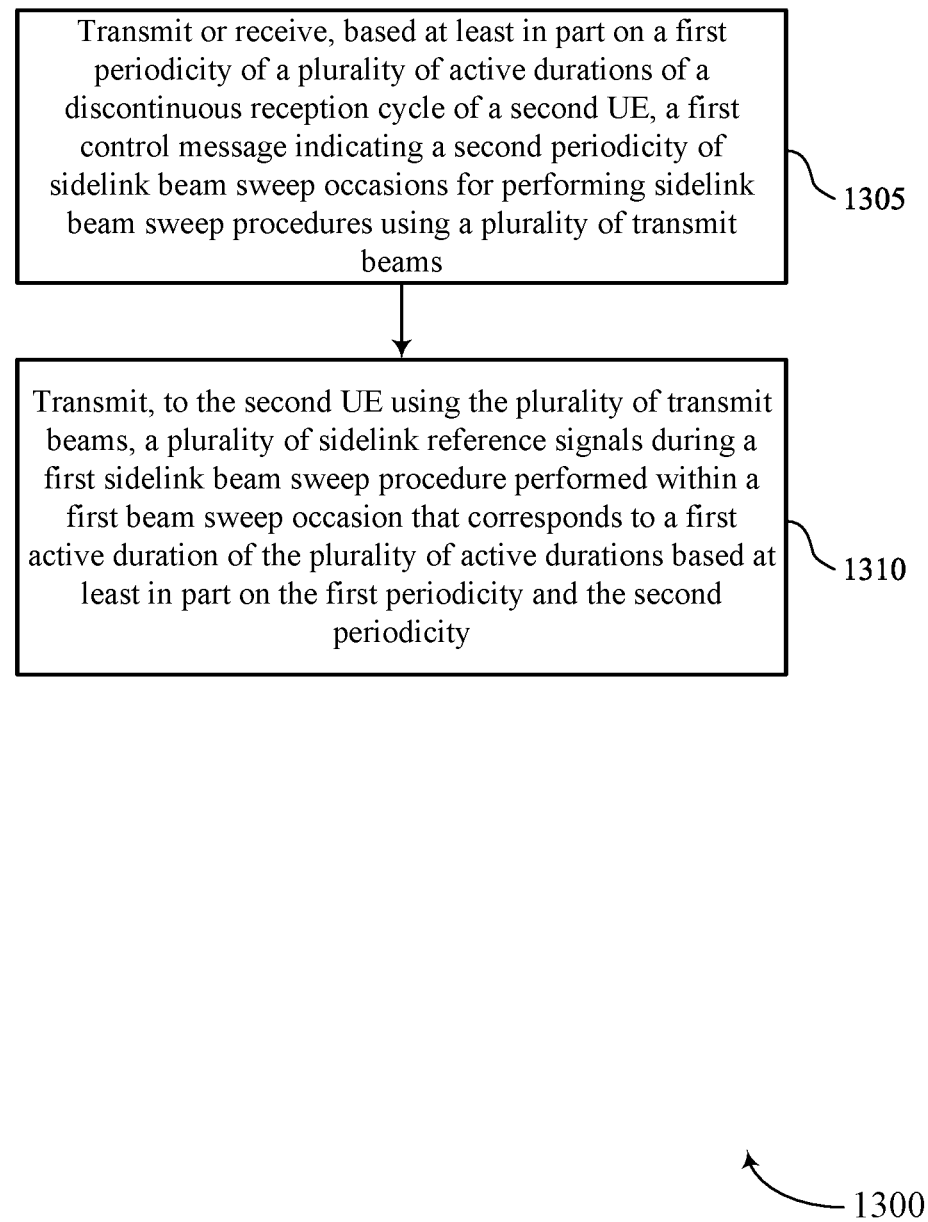

FIG. 13 shows a flowchart illustrating a method 1300 that supports techniques for sidelink reference beams in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include transmitting or receiving, based on a first periodicity of a set of multiple active durations of a DRX cycle of a second UE, a first control message indicating a second periodicity of sidelink beam sweep occasions for performing sidelink beam sweep procedures using a set of multiple transmit beams. The operations of 1305 may be performed in accordance with examples as disclosed herein. In some examples, aspects of the operations of 1305 may be performed by a control message communicating manager 925 as described with reference to FIG. 9.

At 1310, the method may include transmitting, to the second UE using the set of multiple transmit beams, a set of multiple sidelink reference signals during a first sidelink beam sweep procedure performed within a first beam sweep occasion that corresponds to a first active duration of the set of multiple active durations based on the first periodicity and the second periodicity. The operations of 1310 may be performed in accordance with examples as disclosed herein. In some examples, aspects of the operations of 1310 may be performed by a sidelink reference signal transmitting manager 935 as described with reference to FIG. 9.

Figure 14:
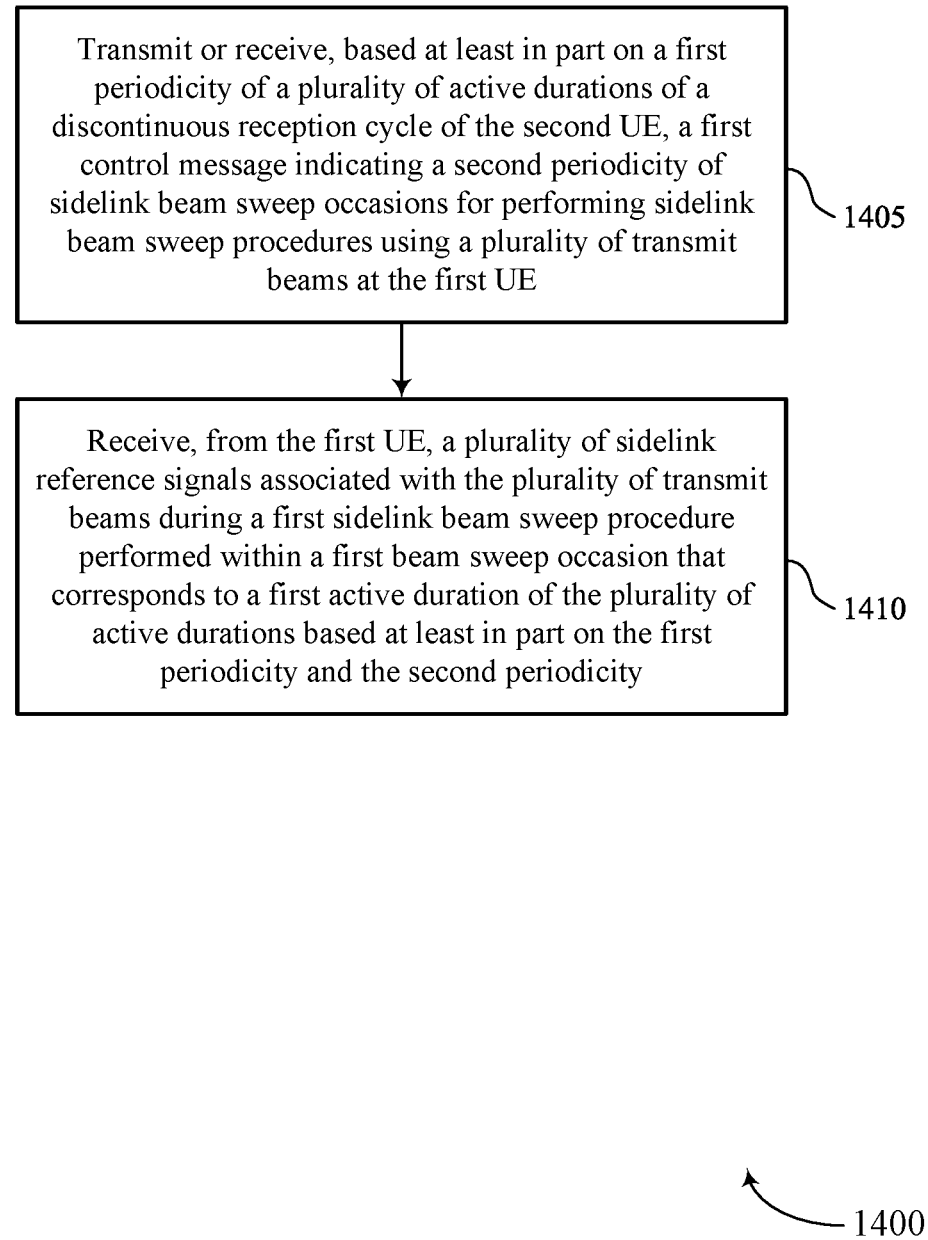

FIG. 14 shows a flowchart illustrating a method 1400 that supports techniques for sidelink reference beams in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include transmitting or receiving, based on a first periodicity of a set of multiple active durations of a DRX cycle of the second UE, a first control message indicating a second periodicity of sidelink beam sweep occasions for performing sidelink beam sweep procedures using a set of multiple transmit beams at the first UE. The operations of 1405 may be performed in accordance with examples as disclosed herein. In some examples, aspects of the operations of 1405 may be performed by a control message communicating manager 925 as described with reference to FIG. 9.

At 1410, the method may include receiving, from the first UE, a set of multiple sidelink reference signals associated with the set of multiple transmit beams during a first sidelink beam sweep procedure performed within a first beam sweep occasion that corresponds to a first active duration of the set of multiple active durations based on the first periodicity and the second periodicity. The operations of 1410 may be performed in accordance with examples as disclosed herein. In some examples, aspects of the operations of 1410 may be performed by a sidelink reference signal receiving manager 940 as described with reference to FIG. 9.

The following provides an overview of aspects of the present disclosure:

Aspect 1: A method for wireless communication at a first UE, comprising: transmitting or receiving a first control message indicating a sidelink beam measurement configuration for performing a sidelink beam sweep procedure using a plurality of transmit beams; selecting a subset of transmit beams from the plurality of transmit beams for the sidelink beam sweep procedure based at least in part on one or more parameters associated with the sidelink beam measurement configuration; and transmitting, to a second UE during the sidelink beam sweep procedure, a plurality of sidelink reference signals using respective transmit beams of the subset of transmit beams.

Aspect 2: The method of aspect 1, wherein selecting the subset of transmit beams comprises: transmitting or receiving a second control message indicating the subset of transmit beams which are to be used during the sidelink beam sweep procedure, wherein transmitting the plurality of sidelink reference signals is based at least in part on the second control message.

Aspect 3: The method of any of aspects 1 through 2, wherein the sidelink beam measurement configuration indicates a plurality of TTIs during which a respective transmit beam of the plurality of transmit beams is to be used to transmit a respective sidelink reference signal during the sidelink beam sweep procedure, wherein transmitting the plurality of sidelink reference signals using the respective transmit beams of the subset of transmit beams comprises: transmitting the plurality of sidelink reference signals using the respective transmit beams of the subset of transmit beams during a subset of TTIs of the plurality of TTIs which correspond to the subset of transmit beams.

Aspect 4: The method of any of aspects 1 through 3, wherein the sidelink beam measurement configuration indicates a plurality of TTIs during which each transmit beam of the plurality of transmit beams is to be used to transmit sidelink reference signals during the sidelink beam sweep procedure, wherein transmitting the plurality of sidelink reference signals comprises: transmitting a first sidelink reference signal of the plurality of sidelink reference signals using a first transmit beam of the subset of transmit beams in a first TTI that differs from a second transmission time internal configured by the sidelink beam measurement configuration for reference signal transmission using the first transmit beam.

Aspect 5: The method of aspect 4, wherein transmitting the plurality of sidelink reference signals comprises: transmitting a second sidelink reference signal of the plurality of sidelink reference signals using a second transmit beam of the subset of transmit beams in a second TTI that occurs immediately after the first TTI.

Aspect 6: The method of any of aspects 1 through 5, wherein the sidelink beam measurement configuration indicates a plurality of TTIs during which each transmit beam of the plurality of transmit beams is to be used to transmit sidelink reference signals during the sidelink beam sweep procedure, wherein transmitting the plurality of sidelink reference signals comprises: transmitting a first sidelink reference signal of the plurality of sidelink reference signals using a first transmit beam of the subset of transmit beams in a first TTI of the plurality of TTIs configured by the sidelink beam measurement configuration for reference signal transmission using the first transmit beam.

Aspect 7: The method of aspect 6, wherein transmitting the plurality of sidelink reference signals comprises: transmitting a second sidelink reference signal of the plurality of sidelink reference signals using a second transmit beam of the subset of transmit beams in a second TTI of the plurality of TTIs configured by the sidelink beam measurement configuration for reference signal transmission using the first transmit beam.

Aspect 8: The method of any of aspects 1 through 7, wherein the sidelink beam measurement configuration indicates a plurality of TTIs during which a respective transmit beam of the plurality of transmit beams is to be used to transmit a respective sidelink reference signal during the sidelink beam sweep procedure, wherein the plurality of TTIs comprise a subset of TTIs which correspond to the subset of transmit beams and a remaining subset of TTIs, the method further comprising: transmitting or receiving one or more messages during at least one TTI of the remaining subset of TTIs, refraining from transmitting sidelink reference signals during at least one TTI of the remaining subset of TTIs, or both.

Aspect 9: The method of any of aspects 1 through 8, wherein selecting the subset of transmit beams comprises: selecting the subset of transmit beams from the plurality of transmit beams based at least in part on a beam measurement report associated with communications between the first UE and the second UE.

Aspect 10: The method of any of aspects 1 through 9, wherein the one or more parameters comprise a beam measurement report associated with communications between the first UE and the second UE, a geographical position of the first UE, the second UE, or both, a mobility state of the first UE, the second UE, or both, a beam correlation between two or more transmit beams of the plurality of transmit beams, or any combination thereof.

Aspect 11: The method of any of aspects 1 through 10, wherein selecting the subset of transmit beams comprises: selecting the subset of transmit beams from the plurality of transmit beams based at least in part on a first geographical position of the first UE, a second geographical position of the second UE, a first mobility state of the first UE, a second mobility state of the second UE, or any combination thereof.

Aspect 12: The method of any of aspects 1 through 11, wherein selecting the subset of transmit beams comprises: selecting the subset of transmit beams from the plurality of transmit beams based at least in part on a beam correlation between a first transmit beam of the subset of transmit beams and a second transmit beam of the subset of transmit beams, wherein transmitting the plurality of sidelink reference signals using the respective transmit beams of the subset of transmit beams comprises transmitting a first sidelink reference signal using the first transmit beam concurrently with transmitting a second sidelink reference signal using the second transmit beam.

Aspect 13: The method of any of aspects 1 through 12, further comprising: receiving, from the second UE based at least in part on transmitting the first plurality of sidelink reference signals, control signaling comprising an indication of one or more transmit beams of the subset of transmit beams; and transmitting, to the second UE, a sidelink message to the second UE using the one or more transmit beams based at least in part on the control signaling.

Aspect 14: The method of any of aspects 1 through 13, wherein transmitting or receiving the first control message indicating the sidelink beam measurement configuration comprises: communicating the first control message indicating the sidelink beam measurement configuration with the second UE, a base station, or both.

Aspect 15: A method for wireless communication at a second UE, comprising: transmitting or receiving a first control message indicating a sidelink beam measurement configuration for performing a sidelink beam sweep procedure using a plurality of transmit beams; identifying a subset of transmit beams from the plurality of transmit beams for the sidelink beam sweep procedure based at least in part on one or more parameters associated with the sidelink beam measurement configuration; and receiving, from a first UE during the sidelink beam sweep procedure, a plurality of sidelink reference signals associated with respective transmit beams of the subset of transmit beams.

Aspect 16: The method of aspect 15, wherein identifying the subset of transmit beams comprises: transmitting or receiving a second control message indicating the subset of transmit beams which are to be used during the sidelink beam sweep procedure, wherein receiving the plurality of sidelink reference signals is based at least in part on the second control message.

Aspect 17: The method of any of aspects 15 through 16, wherein the sidelink beam measurement configuration indicates a plurality of TTIs during which a respective transmit beam of the plurality of transmit beams is to be used to transmit a respective sidelink reference signal during the sidelink beam sweep procedure, wherein receiving the plurality of sidelink reference signals associated with the respective transmit beams of the subset of transmit beams comprises: receiving the plurality of sidelink reference signals associated with the respective transmit beams of the subset of transmit beams during a subset of TTIs of the plurality of TTIs which correspond to the subset of transmit beams.

Aspect 18: A method for wireless communication at a first UE, comprising: transmitting or receiving, based at least in part on a first periodicity of a plurality of active durations of a DRX cycle of a second UE, a first control message indicating a second periodicity of sidelink beam sweep occasions for performing sidelink beam sweep procedures using a plurality of transmit beams; and transmitting, to the second UE using the plurality of transmit beams, a plurality of sidelink reference signals during a first sidelink beam sweep procedure performed within a first beam sweep occasion that corresponds to a first active duration of the plurality of active durations based at least in part on the first periodicity and the second periodicity.

Aspect 19: The method of aspect 18, further comprising: receiving, from the second UE based at least in part on transmitting the plurality of sidelink reference signals, a beam measurement report indicating one or more transmit beams of the plurality of transmit beams; and transmitting, to the second UE using the one or more transmit beams, a sidelink message during at least the first active duration of the plurality of active durations.

Aspect 20: The method of any of aspects 18 through 19, further comprising: receiving a second control message indicating the first periodicity of the plurality of active durations of the DRX cycle of the second UE.

Aspect 21: The method of any of aspects 18 through 20, further comprising: transmitting or receiving an aperiodic beam measurement request; and transmitting, to the second UE using the plurality of transmit beams and based at least in part on the aperiodic beam measurement request, a second plurality of sidelink reference signals during a second sidelink beam sweep procedure performed within a second beam sweep occasion that does not coincide with the second periodicity of beam sweep occasions.

Aspect 22: The method of aspect 21, wherein transmitting or receiving the aperiodic beam measurement request comprises: transmitting or receiving a beam measurement reporting comprising the aperiodic beam measurement request and indicating a subset of transmit beams of the plurality of transmit beams, wherein transmitting the second plurality of sidelink reference signals comprises: transmitting, to the second UE using the subset of transmit beams, the second plurality of sidelink reference signals during the second sidelink beam sweep procedure.

Aspect 23: The method of any of aspects 21 through 22, wherein transmitting or receiving the aperiodic beam measurement request comprises: transmitting or receiving the aperiodic beam measurement request based at least in part on a first change in a first mobility state of the first UE, a second change in a second mobility state of the second UE, a third change in a first geographical position of the first UE, a fourth change in a second geographical position of the second UE, or any combination thereof.

Aspect 24: The method of any of aspects 18 through 23, further comprising: transmitting or receiving control signaling indicating a requested periodicity for the second periodicity of beam sweep occasions, wherein the periodicity indicated in the first control message comprises the requested periodicity or a different periodicity.

Aspect 25: The method of any of aspects 18 through 24, wherein the second periodicity of the sidelink beam sweep occasions comprises an integer multiple of active durations of the DRX cycle of the second UE.

Aspect 26: The method of any of aspects 18 through 25, wherein transmitting or receiving the first control message indicating the second periodicity comprises: communicating the first control message indicating of the second periodicity with the second UE, a base station, or both.

Aspect 27: The method of any of aspects 18 through 26, wherein the first plurality of sidelink reference signals comprise unicast transmissions, groupcast transmissions, or both, and the first plurality of sidelink reference signals comprise synchronization signal block messages, channel state information reference signals, or both.

Aspect 28: A method for wireless communication at a second UE, comprising: transmitting or receiving, based at least in part on a first periodicity of a plurality of active durations of a DRX cycle of the second UE, a first control message indicating a second periodicity of sidelink beam sweep occasions for performing sidelink beam sweep procedures using a plurality of transmit beams at the first UE; and receiving, from the first UE, a plurality of sidelink reference signals associated with the plurality of transmit beams during a first sidelink beam sweep procedure performed within a first beam sweep occasion that corresponds to a first active duration of the plurality of active durations based at least in part on the first periodicity and the second periodicity.

Aspect 29: The method of aspect 28, further comprising: transmitting, to the first UE based at least in part on receiving the plurality of sidelink reference signals, a beam measurement report indicating one or more transmit beams of the plurality of transmit beams; and receiving, from the first UE using the one or more transmit beams, a sidelink message during at least the first active duration of the plurality of active durations.

Aspect 30: The method of any of aspects 28 through 29, further comprising: transmitting, to the first UE, an aperiodic beam measurement request based at least in part on a change in between a first reference signal received power of the plurality of sidelink reference signals received during the first beam sweep occasion and a second reference signal received power of a second plurality of sidelink reference signals received during a second beam sweep occasion satisfying a threshold; and receiving, from the first UE and based at least in part on the aperiodic beam measurement request, a third plurality of sidelink reference signals during a third sidelink beam sweep procedure performed within a third beam sweep occasion that does not coincide with the second periodicity of beam sweep occasions.

Aspect 31: An apparatus for wireless communication at a first UE, comprising a processor; memory coupled with the processor; and instructions stored in the memory and executable by the processor to cause the apparatus to perform a method of any of aspects 1 through 14.

Aspect 32: An apparatus for wireless communication at a first UE, comprising at least one means for performing a method of any of aspects 1 through 14.

Aspect 33: A non-transitory computer-readable medium storing code for wireless communication at a first UE, the code comprising instructions executable by a processor to perform a method of any of aspects 1 through 14.

Aspect 34: An apparatus for wireless communication at a second UE, comprising a processor; memory coupled with the processor; and instructions stored in the memory and executable by the processor to cause the apparatus to perform a method of any of aspects 15 through 17.

Aspect 35: An apparatus for wireless communication at a second UE, comprising at least one means for performing a method of any of aspects 15 through 17.

Aspect 36: A non-transitory computer-readable medium storing code for wireless communication at a second UE, the code comprising instructions executable by a processor to perform a method of any of aspects 15 through 17.

Aspect 37: An apparatus for wireless communication at a first UE, comprising a processor; memory coupled with the processor; and instructions stored in the memory and executable by the processor to cause the apparatus to perform a method of any of aspects 18 through 27.

Aspect 38: An apparatus for wireless communication at a first UE, comprising at least one means for performing a method of any of aspects 18 through 27.

Aspect 39: A non-transitory computer-readable medium storing code for wireless communication at a first UE, the code comprising instructions executable by a processor to perform a method of any of aspects 18 through 27.

Aspect 40: An apparatus for wireless communication at a second UE, comprising a processor; memory coupled with the processor; and instructions stored in the memory and executable by the processor to cause the apparatus to perform a method of any of aspects 28 through 30.

Aspect 41: An apparatus for wireless communication at a second UE, comprising at least one means for performing a method of any of aspects 28 through 30.

Aspect 42: A non-transitory computer-readable medium storing code for wireless communication at a second UE, the code comprising instructions executable by a processor to perform a method of any of aspects 28 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    transmitting or receiving a first control message indicating a sidelink beam measurement configuration for performing a sidelink beam sweep procedure using a plurality of transmit beams;
    transmitting or receiving a second control message indicating a subset of transmit beams from the plurality of transmit beams for the sidelink beam sweep procedure based at least in part on one or more parameters associated with the sidelink beam measurement configuration; and
    transmitting, to a second UE during the sidelink beam sweep procedure, a plurality of sidelink reference signals using respective transmit beams of the subset of transmit beams based at least in part on the second control message.

2. The method of claim 1, wherein the sidelink beam measurement configuration indicates a plurality of transmission time intervals during which a respective transmit beam of the plurality of transmit beams is to be used to transmit a respective sidelink reference signal during the sidelink beam sweep procedure, wherein transmitting the plurality of sidelink reference signals using the respective transmit beams of the subset of transmit beams comprises:
    transmitting the plurality of sidelink reference signals using the respective transmitting the plurality of sidelink reference signals using the respective transmit beams of the subset of transmit beams during a subset of transmission time intervals of the plurality of transmission time intervals which correspond to the subset of transmit beams.

3. The method of claim 1, wherein the sidelink beam measurement configuration indicates a plurality of transmission time intervals during which each transmit beam of the plurality of transmit beams is to be used to transmit sidelink reference signals during the sidelink beam sweep procedure, wherein transmitting the plurality of sidelink reference signals comprises:

transmitting a first sidelink reference signal of the plurality of sidelink reference signals using a first transmit beam of the subset of transmit beams in a first transmission time interval that differs from a second transmission time internal configured by the sidelink beam measurement configuration for reference signal transmission using the first transmit beam.

4. The method of claim 3, wherein transmitting the plurality of sidelink reference signals comprises:

transmitting a second sidelink reference signal of the plurality of sidelink reference signals using a second transmit beam of the subset of transmit beams in a second transmission time interval that occurs immediately after the first transmission time interval.

5. The method of claim 1, wherein the sidelink beam measurement configuration indicates a plurality of transmission time intervals during which each transmit beam of the plurality of transmit beams is to be used to transmit sidelink reference signals during the sidelink beam sweep procedure, wherein transmitting the plurality of sidelink reference signals comprises:

transmitting a first sidelink reference signal of the plurality of sidelink reference signals using a first transmit beam of the subset of transmit beams in a first transmission time interval of the plurality of transmission time intervals configured by the sidelink beam measurement configuration for reference signal transmission using the first transmit beam.

6. The method of claim 5, wherein transmitting the plurality of sidelink reference signals comprises:

transmitting a second sidelink reference signal of the plurality of sidelink reference signals using a second transmit beam of the subset of transmit beams in a second transmission time interval of the plurality of transmission time intervals configured by the sidelink beam measurement configuration for reference signal transmission using the first transmit beam.

7. The method of claim 1, wherein the sidelink beam measurement configuration indicates a plurality of transmission time intervals during which a respective transmit beam of the plurality of transmit beams is to be used to transmit a respective sidelink reference signal during the sidelink beam sweep procedure, wherein the plurality of transmission time intervals comprise a subset of transmission time intervals which correspond to the subset of transmit beams and a remaining subset of transmission time intervals, the method further comprising:

transmitting or receiving one or more messages during at least one transmission time interval of the remaining subset of transmission time intervals, refraining from transmitting sidelink reference signals during at least one transmission time interval of the remaining subset of transmission time intervals, or both.

8. The method of claim 1, further comprising:

selecting the subset of transmit beams from the plurality of transmit beams based at least in part on a beam measurement report associated with communications between the first UE and the second UE.

9. The method of claim 1, wherein the one or more parameters comprise a beam measurement report associated with communications between the first UE and the second UE, a geographical position of the first UE, the second UE, or both, a mobility state of the first UE, the second UE, or both, a beam correlation between two or more transmit beams of the plurality of transmit beams, or any combination thereof.

10. The method of claim 1, further comprising:

selecting the subset of transmit beams from the plurality of transmit beams based at least in part on a first geographical position of the first UE, a second geographical position of the second UE, a first mobility state of the first UE, a second mobility state of the second UE, or any combination thereof.

11. The method of claim 1, further comprising:

selecting the subset of transmit beams from the plurality of transmit beams based at least in part on a beam correlation between a first transmit beam of the subset of transmit beams and a second transmit beam of the subset of transmit beams, wherein transmitting the plurality of sidelink reference signals using the respective transmit beams of the subset of transmit beams comprises transmitting a first sidelink reference signal using the first transmit beam concurrently with transmitting a second sidelink reference signal using the second transmit beam.

12. The method of claim 1, further comprising:

receiving, from the second UE based at least in part on transmitting the plurality of sidelink reference signals, control signaling comprising an indication of one or more transmit beams of the subset of transmit beams; and transmitting, to the second UE, a sidelink message to the second UE using the one or more transmit beams based at least in part on the control signaling.

13. The method of claim 1, wherein transmitting or receiving the first control message indicating the sidelink beam measurement configuration comprises:

communicating the first control message indicating the sidelink beam measurement configuration with the second UE, a base station, or both.

14. A method for wireless communication at a second user equipment (UE), comprising:

transmitting or receiving a first control message indicating a sidelink beam measurement configuration for performing a sidelink beam sweep procedure using a plurality of transmit beams;

transmitting or receiving a second control message indicating a subset of transmit beams from the plurality of transmit beams for the sidelink beam sweep procedure based at least in part on one or more parameters associated with the sidelink beam measurement configuration; and receiving, from a first UE during the sidelink beam sweep procedure, a plurality of sidelink reference signals associated with respective transmit beams of the subset of transmit beams based at least in part on the second control message.

15. The method of claim 14, wherein the sidelink beam measurement configuration indicates a plurality of transmission time intervals during which a respective transmit beam of the plurality of transmit beams is to be used to transmit a respective sidelink reference signal during the sidelink beam sweep procedure, wherein receiving the plurality of sidelink reference signals associated with the respective transmit beams of the subset of transmit beams comprises:

receiving the plurality of sidelink reference signals associated with the respective transmit beams of the subset of transmit beams during a subset of transmission time intervals of the plurality of transmission time intervals which correspond to the subset of transmit beams.

16. A method for wireless communication at a first user equipment (UE), comprising:
- transmitting or receiving, based at least in part on a first periodicity of a plurality of active durations of a discontinuous reception cycle of a second UE, a first control message indicating a second periodicity of sidelink beam sweep occasions for performing sidelink beam sweep procedures using a plurality of transmit beams; and
- transmitting, to the second UE using the plurality of transmit beams, a plurality of sidelink reference signals during a first sidelink beam sweep procedure performed within a first beam sweep occasion that corresponds to a first active duration of the plurality of active durations based at least in part on the first periodicity and the second periodicity.

17. The method of claim 16, further comprising:
- receiving, from the second UE based at least in part on transmitting the plurality of sidelink reference signals, a beam measurement report indicating one or more transmit beams of the plurality of transmit beams; and
- transmitting, to the second UE using the one or more transmit beams, a sidelink message during at least the first active duration of the plurality of active durations.

18. The method of claim 16, further comprising:
- receiving a second control message indicating the first periodicity of the plurality of active durations of the discontinuous reception cycle of the second UE.

19. The method of claim 16, further comprising:
- transmitting or receiving an aperiodic beam measurement request; and
- transmitting, to the second UE using the plurality of transmit beams and based at least in part on the aperiodic beam measurement request, a second plurality of sidelink reference signals during a second sidelink beam sweep procedure performed within a second beam sweep occasion that does not coincide with the second periodicity of beam sweep occasions.

20. The method of claim 19, wherein transmitting or receiving the aperiodic beam measurement request comprises:
- transmitting or receiving a beam measurement reporting comprising the aperiodic beam measurement request and indicating a subset of transmit beams of the plurality of transmit beams, wherein transmitting the second plurality of sidelink reference signals comprises:
- transmitting, to the second UE using the subset of transmit beams, the second plurality of sidelink reference signals during the second sidelink beam sweep procedure.

21. The method of claim 19, wherein transmitting or receiving the aperiodic beam measurement request comprises:
- transmitting or receiving the aperiodic beam measurement request based at least in part on a first change in a first mobility state of the first UE, a second change in a second mobility state of the second UE, a third change in a first geographical position of the first UE, a fourth change in a second geographical position of the second UE, or any combination thereof.

22. The method of claim 16, further comprising:
- transmitting or receiving control signaling indicating a requested periodicity for the second periodicity of beam sweep occasions, wherein the second periodicity indicated in the first control message comprises the requested periodicity or a different periodicity.

23. The method of claim 18, wherein the second periodicity of the sidelink beam sweep occasions comprises an integer multiple of active durations of the discontinuous reception cycle of the second UE.

24. The method of claim 16, wherein transmitting or receiving the first control message indicating the second periodicity comprises:
- communicating the first control message indicating of the second periodicity with the second UE, a base station, or both.

25. The method of claim 16, wherein the plurality of sidelink reference signals comprise unicast transmissions, groupcast transmissions, or both, and wherein the plurality of sidelink reference signals comprise synchronization signal block messages, channel state information reference signals, or both.

26. A method for wireless communication at a second user equipment (UE), comprising:
- transmitting or receiving, based at least in part on a first periodicity of a plurality of active durations of a discontinuous reception cycle of the second UE, a first control message indicating a second periodicity of sidelink beam sweep occasions for performing sidelink beam sweep procedures using a plurality of transmit beams at a first UE; and
- receiving, from the first UE, a plurality of sidelink reference signals associated with the plurality of transmit beams during a first sidelink beam sweep procedure performed within a first beam sweep occasion that corresponds to a first active duration of the plurality of active durations based at least in part on the first periodicity and the second periodicity.

27. The method of claim 26, further comprising:
- transmitting, to the first UE based at least in part on receiving the plurality of sidelink reference signals, a beam measurement report indicating one or more transmit beams of the plurality of transmit beams; and
- receiving, from the first UE using the one or more transmit beams, a sidelink message during at least the first active duration of the plurality of active durations.

28. The method of claim 26, further comprising:
- transmitting, to the first UE, an aperiodic beam measurement request based at least in part on a change in between a first reference signal received power of the plurality of sidelink reference signals received during the first beam sweep occasion and a second reference signal received power of a second plurality of sidelink reference signals received during a second beam sweep occasion satisfying a threshold; and
- receiving, from the first UE and based at least in part on the aperiodic beam measurement request, a third plurality of sidelink reference signals during a third sidelink beam sweep procedure performed within a third beam sweep occasion that does not coincide with the second periodicity of beam sweep occasions.

* * * * *